United States Patent
Yasunaga et al.

(10) Patent No.: US 11,977,293 B1
(45) Date of Patent: May 7, 2024

(54) ILLUMINATION DEVICE THAT SUPPRESSES UNEVEN BRIGHTNESS AND DISPLAY DEVICE THEREOF

(71) Applicant: Sharp Display Technology Corporation, Kameyama (JP)

(72) Inventors: Hirotoshi Yasunaga, Kameyama (JP); Hisashi Watanabe, Kameyama (JP); Takeshi Masuda, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/370,026

(22) Filed: Sep. 19, 2023

(30) Foreign Application Priority Data

Oct. 31, 2022 (JP) ................................ 2022-174238

(51) Int. Cl.
  *G02F 1/1335* (2006.01)
  *F21V 8/00* (2006.01)
  *G02F 1/13357* (2006.01)

(52) U.S. Cl.
  CPC .. *G02F 1/133603* (2013.01); *G02F 1/133605* (2013.01); *G02F 1/133628* (2021.01)

(58) Field of Classification Search
  CPC ......... G02F 1/133603; G02F 1/133605; G02F 1/133628
  See application file for complete search history.

(56) References Cited

U.S. PATENT DOCUMENTS

| 10,962,828 | B2* | 3/2021 | Kyoukane | G02F 1/133603 |
| 2012/0127395 | A1* | 5/2012 | Yokota | G02F 1/133611 |
| | | | | 349/61 |
| 2020/0166803 | A1* | 5/2020 | Kyoukane | G02F 1/133608 |
| 2022/0308399 | A1* | 9/2022 | Masuda | G02B 6/0055 |

FOREIGN PATENT DOCUMENTS

WO 2014/006696 A1 1/2014

OTHER PUBLICATIONS

Ogi et al, WO2014006696A1, machine translation Jan. 2014 (Year: 2014).*

* cited by examiner

*Primary Examiner* — Tracie Y Green
(74) *Attorney, Agent, or Firm* — ScienBiziP, P.C.

(57) ABSTRACT

An illumination device includes a light source, a first optical member, and a fixing portion. The first optical member includes a light reflection portion configured to reflect light, at least a part of the light reflection portion overlapping with the light source, and a light transmitting portion configured to transmit light, the light transmitting portion not overlapping the light reflection portion. A center of the light source in a plan view is defined as a first center, and a center of the light reflection portion in a plan view is defined as a second center. In the light reflection portion, the second center is located between the fixing portion and the first center at a first temperature, and at a second temperature higher than the first temperature, a position of the second center is closer to the first center than a position of the second center at the first temperature.

15 Claims, 31 Drawing Sheets

ILLUMINATION DEVICE THAT SUPPRESSES UNEVEN BRIGHTNESS AND DISPLAY DEVICE THEREOF

CROSS-REFERENCE TO RELATED APPLICATIONS

This application claims the benefit of priority to Japanese Patent Application Number 2022-174238 filed on Oct. 31, 2022. The entire contents of the above-identified application are hereby incorporated by reference.

BACKGROUND

Technical Field

The techniques disclosed in the present specification relate to illumination devices and display devices.

As an example of an illumination device included in a liquid crystal display device in the related art, an illumination device described in WO 2014/006696 is known. The illumination device described in WO 2014/006696 is configured such that light is emitted in a direction parallel to a light emitting surface of the illumination device from a light emitting diode (LED) row in which a plurality of LEDs are arrayed in a row in a space between a reflective sheet and a corresponding one of light distribution adjustment members arranged at a predetermined distance from the reflective sheet. In the above-described LED row, a plurality of LED rows are arrayed along a light emission direction of the LEDs, and each of the light distribution adjustment members is arranged corresponding to a corresponding one of the LED rows. A first gap is provided between the light distribution adjustment members. The first gap is provided at a position located Py/2 or more from the LED rows in the light emission direction of the LEDs, where Py is an array interval of the LED rows in the light emission direction of the LEDs.

SUMMARY

According to the illumination device described in WO 2014/006696 mentioned above, by arranging a plurality of the light distribution adjustment members along the light emission direction of the LEDs, brightness unevenness due to thermal expansion of the light distribution adjustment members can be suppressed. However, the first gap is provided between the light distribution adjustment members, so that a part of the light emitted from the LEDs is emitted without passing through a corresponding one of the light distribution adjustment members due to the first gap. Thus, there is a problem in that brightness unevenness is likely to occur in the emission light. Furthermore, when the light distribution adjustment members thermally expand, a printed pattern provided on the light distribution adjustment members is still displaced with respect to the LEDs. Thus, when the light distribution adjustment members thermally expand, the light distribution adjustment function by the printed pattern is not appropriately exhibited, and brightness unevenness may occur.

The techniques described herein have been made based on the circumstances described above, and an object thereof is to suppress the occurrence of brightness unevenness.

(1) An illumination device according to the technology of the present specification described above includes a light source including a light-emitting face, a first optical member including a first main surface facing the light-emitting face of the light source, and a fixing portion fixed to a part of the first optical member, in which the first optical member includes a light reflection portion configured to reflect light, at least a part of the light reflection portion overlapping with the light source, and a light transmitting portion configured to transmit light, the light transmitting portion not overlapping the light reflection portion, a center of the light source in a plan view is defined as a first center, and a center of the light reflection portion in a plan view is defined as a second center, in the light reflection portion, the second center is located between the fixing portion and the first center at a first temperature, and at a second temperature higher than the first temperature, a position of the second center is closer to the first center than a position of the second center at the first temperature.

(2) Furthermore, in addition to the aspects described in (1) above, in the illumination device described above, in the light reflection portion, the second center may overlap a straight line connecting a position of the fixing portion closest to the light source and the first center, and a distance between the first center and the second center at the first temperature may be "A$\alpha$d", where "d" is a shortest distance from the fixing portion to the first center, "$\alpha$" is a linear expansion coefficient of the first optical member, and "A" is a difference between the first temperature and the second temperature.

(3) Furthermore, in addition to the aspects described in (1) or (2) above, in the illumination device described above, the light reflection portion may have an elongated planar shape in which the second center overlaps a straight line connecting a position of the fixing portion closest to the light source and the first center, and the elongated planar shape may include a major axis or a long side parallel to the straight line.

(4) Furthermore, in addition to the aspects described in (3) above, in the illumination device described above, a plurality of the light sources and a plurality of the light reflection portions may be disposed side by side in a plane of the first main surface at different distances from the fixing portion, and a ratio of a length of the major axis or the long side to a length of a minor axis or a short side orthogonal to the major axis or the long side may increase as a distance of the plurality of light reflection portions from the fixing portion increases.

(5) Furthermore, in addition to the aspects described in (3) or (4) above, in the illumination device described above, in the light reflection portion, the second center may coincide with the first center at the second temperature, and a length L1 of a minor axis or a short side and a length L2 of the major axis or the long side may satisfy Expression (1) and Equation (2) below $$L1 > L3 \tag{1}$$

$$L2 = L1 + 2B\alpha d \tag{2},$$

where "d" is a shortest distance from the fixing portion to the first center, "$\alpha$" is a linear expansion coefficient of the first optical member, "B" is a difference between a third temperature higher than the second temperature and the second temperature, "L1" is a length of the minor axis or the short side orthogonal to the major axis or the long side in the light reflection portion, "L2" is a length of the major axis or the long side, and "L3" is a maximum length of a line segment passing through the first center and intersecting an outer end of the light source in a plan view.

(6) Furthermore, in addition to any one of the aspects described in (1) to (5) above, the illumination device described above may further include a control unit configured to control the light source and a timer configured to measure an elapsed time after a power source is turned on, in which the control unit may increase a light emission amount of the light source until the elapsed time measured by the timer is at or higher than a threshold value, compared to a case where the elapsed time exceeds the threshold value.

(7) Furthermore, in addition to any one of the aspects described in (1) to (5) above, the illumination device described above may further include a control unit configured to control the light source and a temperature sensor configured to detect a temperature of the first optical member or a temperature near the first optical member, in which the control unit may increase a light emission amount of the light source when the temperature detected by the temperature sensor is equal to or lower than a threshold value, compared to a case where the temperature exceeds the threshold value.

(8) Furthermore, in addition to any one of the aspects described in (1) to (7) above, the illumination device described above may further include a second optical member interposed between the light source and the first optical member and including a second main surface facing the first main surface of the first optical member, in which at least one of the first main surface and the second main surface may include a plurality of protruding portions.

(9) An illumination device according to the technology of the present specification described above includes a light source including a light-emitting face, a first optical member including a first main surface facing the light-emitting face of the light source, and a fixing portion fixed to a part of the first optical member, in which the first optical member includes a light reflection portion configured to reflect light, at least a part of the light reflection portion overlapping with the light source, and a light transmitting portion configured to transmit light, the light transmitting portion not overlapping the light reflection portion, a center of the light source in a plan view is defined as a first center, and a center of the light reflection portion in a plan view is defined as a second center, the light reflection portion overlaps a straight line connecting a position of the fixing portion closest to the light source and the first center, and has an elongated planar shape including a major axis or a long side parallel to the straight line.

(10) Furthermore, in addition to the aspects described in (9) above, in the illumination device described above, in the light reflection portion, the second center may overlap the straight line.

(11) Furthermore, in addition to the aspects described in (10) above, in the illumination device described above, in the light reflection portion, a length L1 of a minor axis or a short side and a length L2 of the major axis or the long side may satisfy Expression (3) and Equation (4) below $$L1 > L3 \qquad (3)$$

$$L2 = L1 + 2A\alpha d \qquad (4),$$

where "d" is a shortest distance from the fixing portion to the first center, "α" is a linear expansion coefficient of the first optical member, "A" is a difference between a first temperature and a second temperature, "L1" is a length of the minor axis or the short side orthogonal to the major axis or the long side in the light reflection portion, "L2" is a length of the major axis or the long side, and "L3" is a maximum length of a line segment passing through the first center and intersecting an outer end of the light source in a plan view.

(12) Furthermore, in addition to the aspects described in (10) or (11) above, in the illumination device described above, in the light reflection portion, the second center may coincide with the first center at a first temperature, and the second center may be located farther from the fixing portion than the first center, at a second temperature higher than the first temperature.

(13) A display device according to the technology of the present specification described above includes the illumination device according to any one of aspects (1) to (12) described above, and a display panel configured to display an image by utilizing light emitted from the illumination device.

(14) Furthermore, in addition to the aspects described in (13) above, the display device described above may further include a control unit configured to control the light source and the display panel, in which a plurality of the light sources are disposed side by side in a plane of the first main surface, and the control unit may write an image based on an image signal to the display panel, control the plurality of light sources, based on the image signal, and cause a light source among the plurality of light sources that is in a relationship of irradiating a minimum gray scale region with light, to emit light, when the minimum gray scale region having a minimum gray scale is included in the image.

(15) Furthermore, in addition to the aspects described in (13) or (14) above, the display device described above may further include a control unit configured to control the light source and the display panel, and a timer configured to measure an elapsed time after a power source is turned on, in which, until the elapsed time measured by the timer is at or higher than a threshold value, the control unit may increase a light emission amount of the light source, as compared with a case where the elapsed time exceeds the threshold value, correct an image signal to generate a correction signal having a lower gray scale than the image signal, and write an image based on the correction signal to the display panel.

According to the techniques described herein, the occurrence of brightness unevenness can be suppressed.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 2:
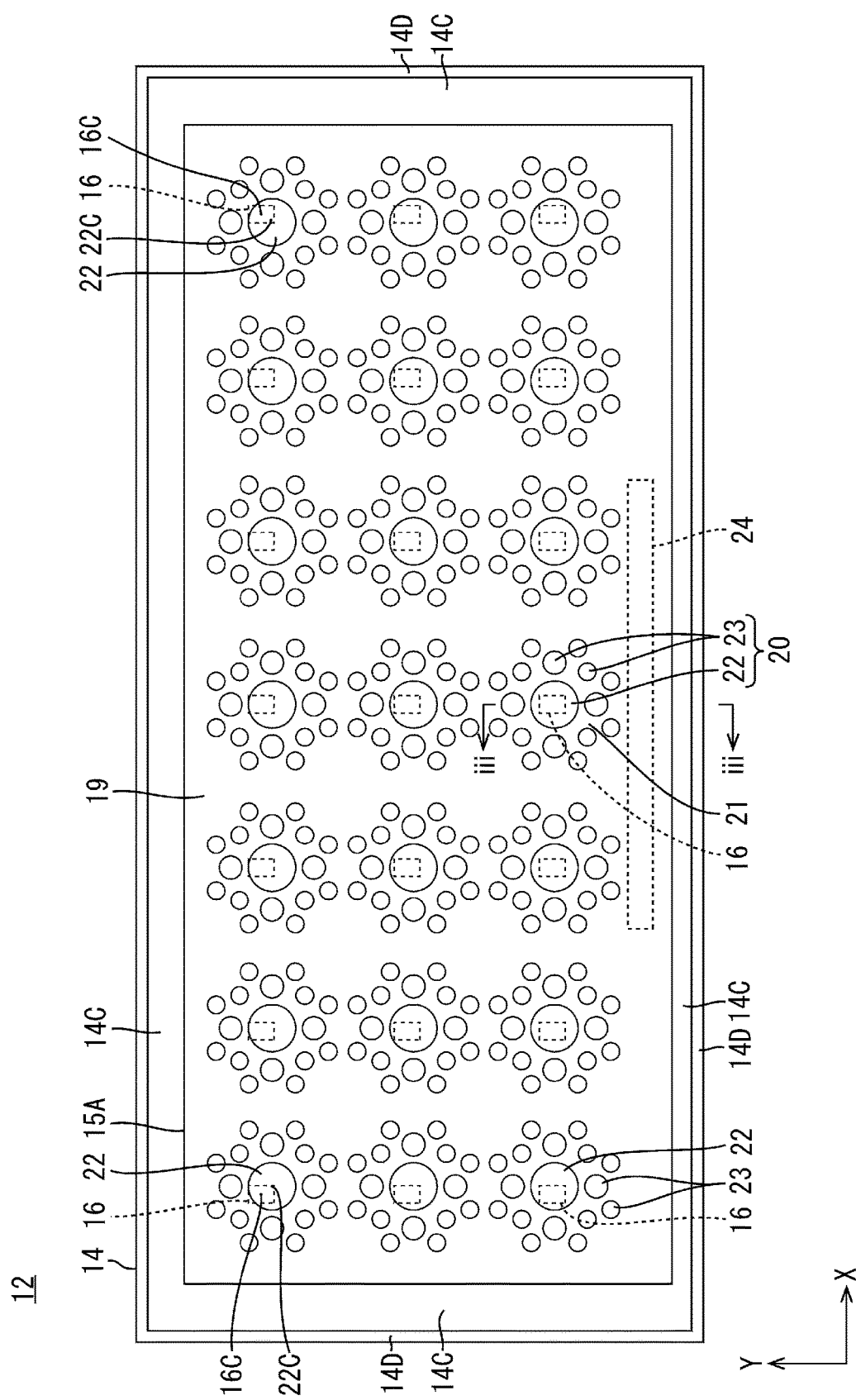
FIG. 2 is a plan view illustrating a chassis, a light control sheet, LEDs, and the like constituting a backlight device according to the first embodiment.
Figure 3:
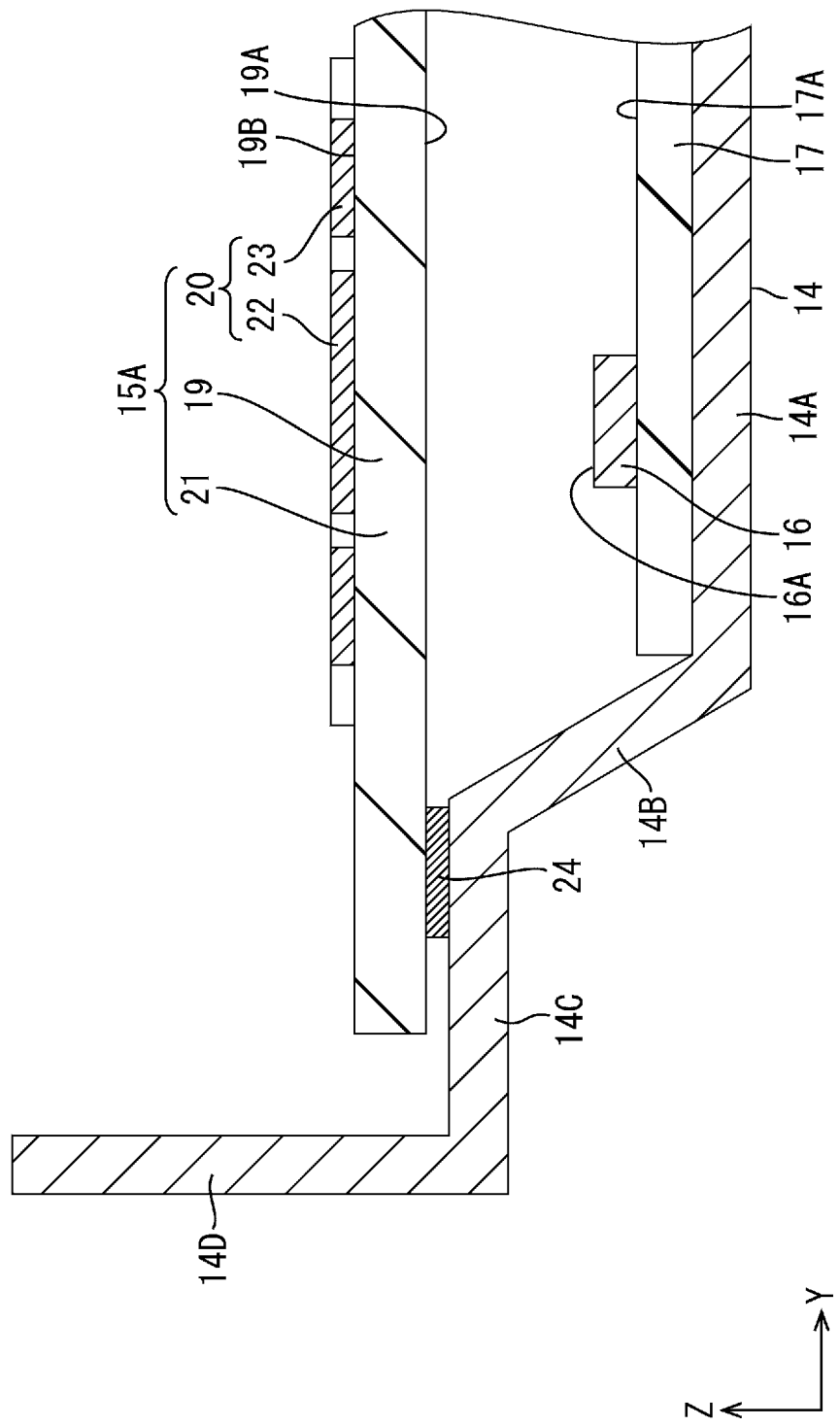
FIG. 3 is a cross-sectional view taken along line iii-iii in FIG. 2, illustrating the chassis, the light control sheet, one of the LEDs, an LED substrate, and the like according to the first embodiment.

A first embodiment will be described with reference to FIGS. 1 to 12. In the present embodiment, a liquid crystal display device (a display device) 10 is described. Note that some drawings illustrate an X-axis, a Y-axis, and a Z-axis, and these axes are drawn so that each axial direction corresponds to a direction illustrated in each drawing. Moreover, an upper side in FIGS. 1 and 3 is defined as a front side and a lower side in FIGS. 1 and 3 is defined as a back side.

A schematic configuration of the liquid crystal display device 10 will described with reference to FIG. 1. As illustrated in FIG. 1, the liquid crystal display device 10 includes at least a liquid crystal panel (a display panel) 11 that displays an image, a backlight device (an illumination device) 12 that supplies display light to the liquid crystal panel 11, and a first panel support member (bezel) 13 that can support the liquid crystal panel 11 from the front side.

Figure 1:
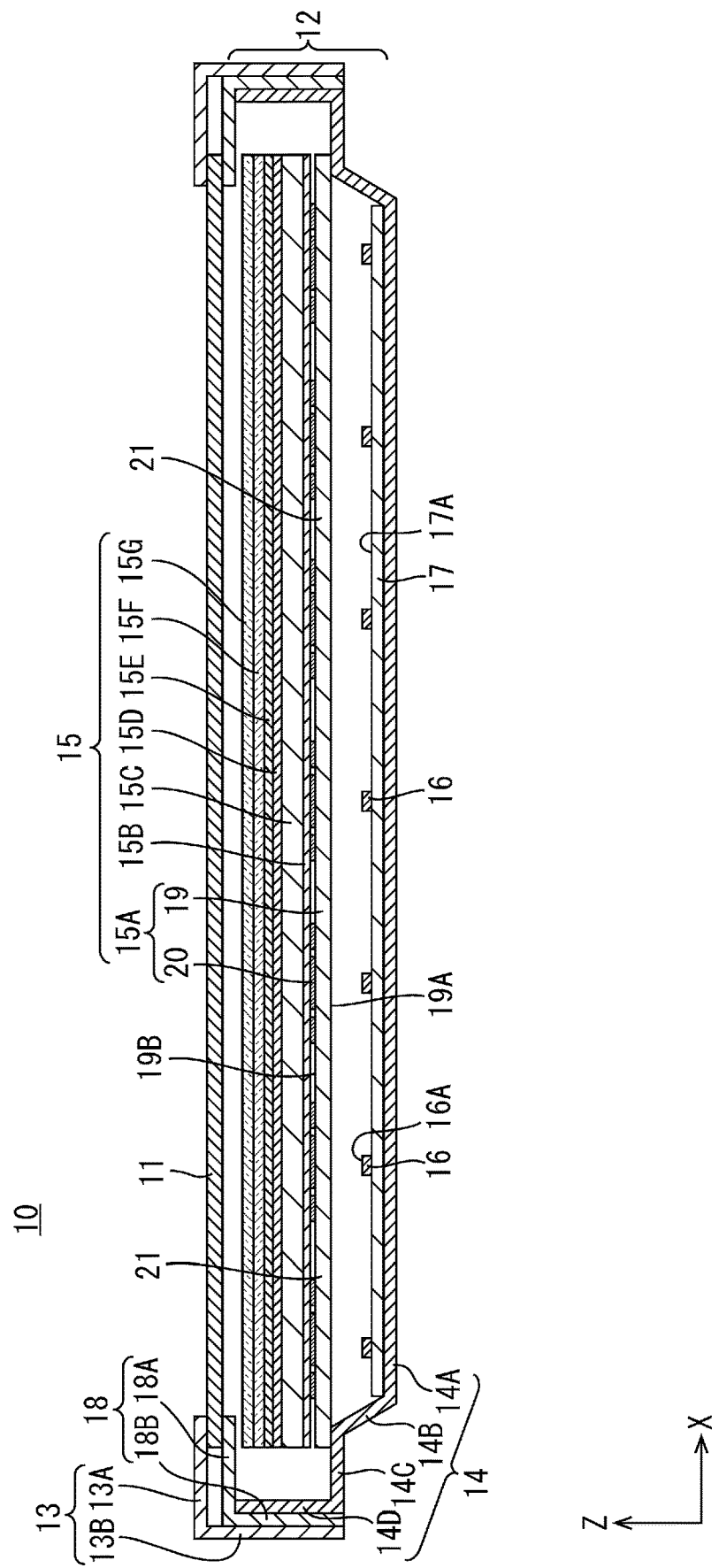
FIG. 1 is a cross-sectional view of a liquid crystal display device according to a first embodiment.

As illustrated in FIG. 1, the liquid crystal panel 11 has a plate shape in which main surfaces are parallel to an X-axis direction and a Y-axis direction, and a normal direction (a thickness direction) of the pair of main surfaces coincides with a Z-axis direction. Among the pair of main surfaces of the liquid crystal panel 11, a main surface on the back side faces the backlight device 12 and is irradiated with light from the backlight device 12. In the liquid crystal panel 11, a central side portion of each of the main surfaces is a display region that can display an image, and an outer circumferential end portion surrounding the display region and having a frame shape is a non-display region. The liquid crystal panel 11 includes a pair of substrates and a liquid crystal layer sealed between the pair of substrates. In the pair of substrates constituting the liquid crystal panel 11, a counter substrate is disposed on the front side, and an array substrate (a TFT substrate) is disposed on the back side. Color filters that exhibit red (R), green (G), blue (B), and the like, a light blocking portion (a black matrix) that partitions adjacent color filters, and the like are provided at the counter substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Note that an alignment film is provided on an inner face of each of the array substrate and the counter substrate constituting the liquid crystal panel 11. Furthermore, a polarizer is attached to an outer face of each of the array substrate and the counter substrate constituting the liquid crystal panel 11.

The first panel support member 13 is formed of a metal (for example, stainless steel and aluminum), extends along an outer circumferential edge of the liquid crystal panel 11 as illustrated in FIG. 1, and has a frame-like shape as a whole. The first panel support member 13 includes a first panel support portion 13A disposed so as to face the front side in the Z-axis direction with respect to an outer circumferential end portion which is the non-display region of the liquid crystal panel 11, and a first outer frame portion 13B disposed so as to protrude from an outer edge of the first panel support portion 13A toward the back side and surround the backlight device 12. The first panel support portion 13A can support substantially the entire circumference of the outer circumferential end portion of the liquid crystal panel 11 from the front side.

A configuration of the backlight device 12 will be described with reference to FIGS. 1 and 2. FIG. 2 is a plan view of the backlight device 12. However, an optical member 15 (a dichroic filter 15B, a wavelength conversion sheet 15C, diffuser sheets 15D and 15E, and prism sheets 15F and 15G) other than a light control sheet 15A described later, and a second panel support member 18 are removed. As illustrated in FIG. 1, the backlight device 12 is of a so-called direct-lit type. Specifically, the backlight device 12 includes at least a chassis 14 that has substantially a box shape and includes an opening toward the front side, the optical member 15 disposed so as to cover the opening of the chassis 14, light emitting diodes (LEDs) 16 that are accommodated in the chassis 14 and form a light source, an LED substrate 17 that forms a light source substrate and to which a plurality of the LEDs 16 are mounted, and the second panel support member (frame) 18 that can support the liquid crystal panel 11 from the back side. As illustrated in FIG. 2, the backlight device 12 has a laterally long substantially rectangular shape as a whole in a plan view. A long side direction of the backlight device 12 coincides with the X-axis direction in the drawings, a short side direction coincides with the Y-axis direction in the drawings, and a thickness direction coincides with the Z-axis direction in the drawings. A planar shape of the liquid crystal panel 11 also has a laterally long substantially rectangular shape in a plan view, similarly to the backlight device 12 described above.

The chassis 14 is formed of a synthetic resin such as a polycarbonate and a front surface of the chassis 14 exhibits white color with excellent light reflectivity. As illustrated in FIG. 2, the chassis 14 has a laterally long substantially rectangular shape as a whole in a plan view. As illustrated in FIG. 1, the chassis 14 includes a bottom portion 14A, first side portions 14B, receiving portions 14C, and second side portions 14D. The bottom portion 14A has a plate shape including main surfaces parallel to the main surfaces of the liquid crystal panel 11, and has a laterally long substantially rectangular shape in a plan view. The main surface on the front side of the bottom portion 14A is in contact with the main surface on the back side of the LED substrate 17 described later, and supports the LED substrate 17 from the back side. Each of the first side portions 14B rises from an outer circumferential edge of the bottom portion 14A toward the front side. As illustrated in FIGS. 1 and 2, the first side portion 14B is provided for each of the two long sides and the two short sides constituting an outer circumferential edge of the bottom portion 14A, and has a short tubular shape as a whole. The receiving portions 14C each protrude outward from an outer edge of a corresponding one of the first side portions 14B, and main surfaces of the receiving portions 14C are parallel to the X-axis direction and the Y-axis direction. The four receiving portions 14C include two receiving portions 14C on a short side and two receiving portions 14C on a long side of the outer circumferential edges of the bottom portion 14A. A main surface on the front side of each of the receiving portions 14C is in contact with a main surface on the back side of the outer circumferential end portion of the optical member 15 to be described later, and the receiving portions 14C support the optical member 15 from the back side. Each of the receiving portions 14C is maintained at a position separated from the LEDs 16 on the front side by each of the first side portions 14B, thereby supporting the optical member 15 at a position spaced apart from the LEDs 16 on the front side. The second side portions 14D each rise from an outer edge of a corresponding one of the receiving portions 14C toward the front side, and main surfaces of the second side portions 14D are parallel to the Z-axis direction. In each of the second side portions 14D, a main surface facing an inner side faces an outer circumferential end face of the optical member 15. By providing a gap between the main surface facing the inner side of each of the second side portions 14D and the outer circumferential end face of the optical member 15, the outer circumferential end face is less likely to interfere with the main surface facing the inner side of the second side portion 14D, even if the optical member 15 thermally expands. Thus, deformation such as deflection and wrinkling is less likely to occur in the optical member 15 that thermally expands.

As illustrated in FIG. 1, each of the LEDs 16 is a so-called top emission type LED mounted on a front surface of the LED substrate 17 and including a light-emitting face 16A facing a side (front side) opposite to the side of the LED substrate 17. An optical axis of the LED 16 coincides with the Z-axis direction. The term "optical axis" as used herein refers to an axis that coincides with a traveling direction of light having the highest light emission intensity (forming a peak) among the emitted light of the LED 16. The LED 16 has a configuration in which an LED chip is sealed with a sealing material on a substrate portion mounted on the LED substrate 17. In addition, the LED 16 may be a so-called chip scale package (CSP). A mini LED may be used as the LED 16. A blue LED that emits monochromatic blue light may also be used as the LED 16. The blue LED includes an LED chip that emits monochromatic blue light, and the blue LED has a configuration in which the sealing material does not contain a phosphor.

The LED substrate 17 is formed of a synthetic resin (for example, a glass epoxy resin) or a metal (aluminum), and may be flexible or rigid. As illustrated in FIGS. 1 and 2, the LED substrate 17 has a plate shape including main surfaces parallel to the main surfaces of the bottom portion 14A of the chassis 14, and has a laterally long substantially rectangular shape in a plan view. The LED substrate 17 is accommodated in the chassis 14 and supported from the back side by the bottom portion 14A. Among plate surfaces of the LED substrate 17, a plate surface facing the front side is mounted with a plurality of the LEDs 16 on a front surface, and this plate surface serves as a mounting surface 17A. In the mounting surface 17A of the LED substrate 17, a plurality of the LEDs 16 are arrayed side by side in a matrix shape at positions spaced apart from each other in the X-axis direction and the Y-axis direction. A reflective layer having excellent light reflectivity may be provided on the mounting surface 17A of the LED substrate 17. The usage efficiency of light can be improved by reflecting the light from the LEDs 16 by the reflective layer. The reflective layer may be formed of a synthetic resin exhibiting white color (for example, polyethylene terephthalate (PET)) or may be formed of a multilayer film reflective sheet such as an enhanced specular reflector (ESR). Drive power is supplied to the LED substrate 17 from an external power source (such as an LED drive substrate).

The second panel support member 18 is formed of a synthetic resin (polycarbonate (PC)) having a surface exhibiting white color with excellent light reflectivity, and as a whole forms a frame shape that extends along outer circumferential edges of the liquid crystal panel 11 and the optical member 15, as illustrated in FIG. 1. The second panel support member 18 includes a second panel support portion 18A disposed so as to face the back side in the Z-axis direction with respect to the outer circumferential end portion which is the non-display region of the liquid crystal panel 11, and a second outer frame portion 18B disposed so as to protrude from an outer edge of the second panel support portion 18A toward the back side and surround the chassis 14. The second panel support portion 18A can support substantially the entire circumference of the outer circumferential end portion of the liquid crystal panel 11 from the back side. The second panel support portion 18A is disposed so as to face the front side in the Z-axis direction with respect to the outer circumferential end portion of the optical member 15, and can support substantially the entire circumference of the outer circumferential end portion of the optical member 15 from the front side. A gap is provided between the second panel support portion 18A and the optical member 15 located closest to the front side (the prism sheet 15G described later). By securing this gap, the outer circumferential end portion of the optical member 15 is not restrained, and thus, the optical member 15 may expand and contract in accordance with thermal expansion and thermal contraction. Thus, deformation such as deflection and wrinkling is less likely to occur when the optical member 15 thermally expands or thermally contracts. The second outer frame portion 18B is sandwiched between the second side portion 14D of the chassis 14 and the first outer frame portion 13B of the first panel support member 13.

As illustrated in FIG. 1, the optical member 15 includes seven optical members 15 layered on each other in the Z-axis direction. The seven optical members 15 include the light control sheet (lighting curtain, first optical member) 15A, the dichroic filter 15B, the wavelength conversion sheet 15C, the two diffuser sheets 15D and 15E, and the two prism sheets 15F and 15G in this order from the back side. A detailed configuration of the light control sheet 15A will be described later. The dichroic filter 15B is a dielectric multilayer film formed by multilayer coating of dielectric thin films having different refractive indices, and can transmit light of a specific wavelength and reflect light of other wavelengths by utilizing interference of light. The dichroic filter 15B according to the present embodiment is a "blue optical filter", transmits blue light (primary light) which is emitted light of each of the LEDs 16, and reflects visible light other than the blue light (such as green light and red light (secondary light)).

The wavelength conversion sheet 15C contains a phosphor that emits secondary light when excited by blue light (primary light) as excitation light from the LED 16, which is a blue LED. The phosphor includes a green phosphor that emits green light as secondary light and a red phosphor that emits red light as secondary light. The green phosphor and the red phosphor are down-conversion type (down-shifting type) phosphors in which excitation wavelengths are shorter than fluorescence wavelengths, and may be, for example, a quantum dot phosphor, an inorganic phosphor, or an organic phosphor. The emission light of the wavelength conversion sheet 15C includes the blue light from the LED 16 and the green light and the red light that are wavelength-converted by the green phosphor and the red phosphor, and thus, the emission light of the wavelength conversion sheet 15C is substantially white by additive color mixing. The green light and the red light that is wavelength-converted by the wavelength conversion sheet 15C is not completely emitted toward the front side. A part of the green light and the red light travels toward the back side, but is reflected by the dichroic filter 15B and travels toward the front side.

The two diffuser sheets 15D and 15E each have a configuration in which a large number of small recessed portions are provided on a main surface on a back side of a substantially transparent base material. The recessed portions each have a quadrangular pyramid shape (pyramid shape), and a plurality of the recessed portions are filled in a tessellation pattern in a matrix shape along the X-axis direction and the Y-axis direction in the main surface on the back side of each of the diffuser sheets 15D and 15E. The emission light of the wavelength conversion sheet 15C is refracted by an inclined surface of each of the recessed portions in each of the diffuser sheets 15D and 15E, and is emitted toward the front side while being diffused. The two prism sheets 15F and 15G respectively have prisms orthogonal to each other. One of the two prism sheets 15F and 15G has a configuration in which a large number of prisms extending along the X-axis direction are arranged side by side along the Y-axis direction. One of the two prism sheets 15F and 15G can selectively provide a light condensing effect in the Y-axis direction, which is the direction in which the prisms are arranged. The other one of the two prism sheets 15F and 15G has a configuration in which a large number of prisms extending along the Y-axis direction are arranged side by side along the X-axis direction. The other one of the two prism sheets 15F and 15G can selectively provide a light condensing effect in the X-axis direction, which is the direction in which the prisms are arranged. The two prism sheets 15F and 15G may be attached to each other.

Here, a detailed configuration of the light control sheet 15A will be described. As illustrated in FIG. 1, the light control sheet 15A includes a transmission substrate 19 and a light reflection pattern 20 that is provided on the transmission substrate 19 and reflects light. In the transmission substrate 19, a portion where the light reflection pattern 20 is not formed constitutes a light transmitting portion 21 that transmits light. In the transmission substrate 19, a main surface (first main surface) 19A on the back side directly faces the light-emitting face 16A of the LED 16 without another member being interposed therebetween, and a predetermined gap is provided between the light-emitting face 16A and the transmission substrate 19. The transmission substrate 19 is formed of a substantially transparent synthetic resin (for example, an acrylic resin) and transmits light. The main surface 19A on the back side of the transmission substrate 19 may be flat, or the main surface 19A on the back side of the transmission substrate 19 may have a large number of small recessed portions. When the recessed portions are provided in the transmission substrate 19, each of the recessed portions has, similarly to the recessed portions provided in the diffuser sheets 15D and 15E described above, a quadrangular pyramid shape (pyramid shape), and a plurality of the recessed portions are filled in a tessellation pattern in a matrix shape along the X-axis direction and the Y-axis direction in the main surface 19A on the back side. Furthermore, instead of the recessed portions described above, a plurality of prisms extending along the X-axis direction or the Y-axis direction may be provided in the main surface 19A on the back side of the transmission substrate 19. The transmission substrate 19 may contain diffusion particles that diffuse light, or may not contain diffusion particles.

The light reflection pattern 20 is formed of ink (white paint) exhibiting white color with excellent light reflectivity. For example, the light reflection pattern 20 is formed by printing a pattern on a main surface (light emission surface) 19B on the front side of the transmission substrate 19 by screen printing, printing using an ink-jet device or a dispenser device, or gravure printing. In addition, the light reflection pattern 20 may be formed by using a metal material (such as aluminum and silver) as the material of the light reflection pattern 20 and vapor-depositing a metal thin film on the main surface 19B on the front side of the transmission substrate 19 by vapor deposition (mask vapor deposition).

As illustrated in FIG. 2, the light reflection pattern 20 includes a large number of dots dispersedly arranged in a predetermined distribution in the plane of the main surface 19B on the front side of the transmission substrate 19. In the present embodiment, a planar shape of each dot included in the large number of dots constituting the light reflection pattern 20 is a circular shape. The large number of dots constituting the light reflection pattern 20 include a first light reflection portion (a light reflection portion) 22 and second light reflection portions 23. Among the large number of dots constituting the light reflection pattern 20, the first light reflection portion 22 has the largest diameter dimension and area. At least a part of the first light reflection portion 22 overlaps the LED 16 in a plan view and the first light reflection portion 22 is located immediately above or nearly immediately above the LED 16. Similarly to the LEDs 16, a plurality of the first light reflection portions 22 are arrayed side by side in a matrix shape at positions spaced apart from each other in the X-axis direction and the Y-axis direction. The number of the first light reflection portions 22 being provided is the same as the number of the LEDs 16 being provided. The plurality of first light reflection portions 22 have the same diameter dimension and area.

Each of the second light reflection portions 23 has a smaller diameter dimension and area than each of the first light reflection portions 22. A plurality of the second light reflection portions 23 are disposed in a predetermined array in the periphery of the first light reflection portion 22. The plurality of second light reflection portions 23 are arranged spaced apart from the first light reflection portion 22. The plurality of second light reflection portions 23 include a plurality of types of the second light reflection portions 23 having different diameter dimensions and areas. The plurality of second light reflection portions 23 include a plurality of the second light reflection portions 23 belonging to the same type and having the same diameter dimension and area. The plurality of second light reflection portions 23 have different diameter dimensions and areas depending on the distance from the first light reflection portion 22. Specifically, among the plurality of second light reflection portions 23, the second light reflection portion 23 closer to the first light reflection portion 22 tends to have a larger diameter dimension and a larger area, and the second light reflection portion 23 farther from the first light reflection portion 22 tends to have a smaller diameter dimension and a smaller area. The plurality of second light reflection portions 23 are disposed so as to be substantially point-symmetrical with respect to a center of the first light reflection portion 22 (a second center 22C described later).

One of the first light reflection portions 22 and a plurality of the second light reflection portions 23 arrayed in the periphery of the one first light reflection portion 22 constitute a unit light reflection pattern associated with one of the LEDs 16. The light reflection pattern 20 includes the same number of unit light reflection patterns as the number of the LEDs 16 being provided. The plurality of second light reflection portions 23 included in the unit light reflection pattern have a distribution in which the diameter dimension and the area decrease with increasing distance from the first light reflection portion 22, while the diameter dimension and the area increase with decreasing distance from the first light reflection portion 22. Therefore, the area of the light transmitting portion 21, which is a portion of the transmission substrate 19 where the light reflection pattern 20 is not formed, decreases with decreasing distance from the first light reflection portion 22 and increases with increasing distance from the first light reflection portion 22. That is, the distribution related to the pattern of the light transmitting portion 21 is a distribution having an inverse correlation with the light reflection pattern 20. Here, the amount of light that is emitted from the LEDs 16 and with which the light control sheet 15A is irradiated tends to increase at a shorter distance from the first light reflection portion 22 and to decrease at a longer distance from the first light reflection portion 22 in a plan view. Therefore, according to the light reflection pattern 20 and the light transmitting portion 21 having the above-described distribution, the amount of light reflected by the light reflection pattern 20 increases with decreasing distance from the LEDs 16 and decreases with increasing distance from the LEDs 16. Thus, the amount of light transmitted through the light transmitting portion 21, that is, the emission light amount from the light control sheet 15A is made to be uniform, regardless of the distance from the LEDs 16 in a plan view. Accordingly, the light reflection pattern 20 and the light transmitting portion 21 control the emission light amount so that the distribution of the emission light amount is uniform. In particular, at least a part of the first light reflection portion 22 overlaps a corresponding one of the LEDs 16, and thus, the LED 16 is less likely to be directly visually recognized from the front side (brightness unevenness referred to as "eyeball unevenness").

As illustrated in FIGS. 2 and 3, the light control sheet 15A having such a configuration is fixed to one of the receiving portions 14C of the chassis 14 by a fixing portion 24. The fixing portion 24 is fixed in contact with the main surface 19A on the back side of the transmission substrate 19 of the light control sheet 15A and a main surface on the front side of the receiving portion 14C of the chassis 14. The fixing portion 24 is formed of a double-sided tape, for example. In addition to the double-sided tape, the fixing portion 24 may be formed of an adhesive. The fixing portion 24 is selectively attached to only one receiving portion 14C on the long side among the four receiving portions 14C. The fixing portion 24 is disposed at a substantially central position in a length direction (X-axis direction) of the receiving portion 14C to which the fixing portion 24 is to be attached. The fixing portion 24 is disposed near the center in the length direction (X-axis direction) of an outer end portion on one long side of the outer circumferential end portion of the light control sheet 15A. The dimension of the fixing portion 24 in the X-axis direction is about one third or less of the length dimension of the outer end portion on the long side of the light control sheet 15A. The distance between the fixing portion 24 and the LEDs 16 in such an arrangement varies depending on the arrangement of the LEDs 16 in the chassis 14. Specifically, the distance between the fixing portion 24 and the LEDs 16 increases for LEDs 16 closer to the end in the X-axis direction of the chassis 14, and increases for LEDs 16 closer to the receiving portion 14C on the long side where the fixing portion 24 is not provided in the Y-axis direction of the chassis 14. The fixing portion 24 is disposed near the center of the outer end portion on the long side of the light control sheet 15A, and thus, the distances from the fixing portion 24 to the LEDs 16 located at both ends in the X-axis direction are equal to each other. The maximum value of the distance between the LEDs 16 and the fixing portion 24 can be reduced as compared with a case where a fixing portion is positioned to one side in the X-axis direction. As described above, it can be said that a plurality of the LEDs 16 and a plurality of the first light reflection portions 22 are disposed side by side so as to have different distances from the fixing portion 24 in a plan view. When the light control sheet 15A thermally expands or thermally contracts due to a change in the temperature environment, the light control sheet 15A expands or contracts with a site fixed by the fixing portion 24 as a starting point (reference point).

As described above, when the light control sheet 15A expands and contracts by thermal expansion or thermal contraction, the light reflection pattern 20 is displaced in a direction away from the fixing portion 24, and the positional relationship of the light reflection pattern 20 with respect to the LEDs 16 changes. In the related art, a printed pattern provided in a light distribution adjustment member is displaced with respect to the LEDs, and thus, the light distribution adjustment function by the printed pattern is not appropriately exhibited, and brightness unevenness may occur. Furthermore, in the related art, a first gap is provided between the light distribution adjustment members, so that a part of the light emitted from the LEDs is emitted without passing through the light distribution adjustment members due to the first gap. Thus, there is a problem in that brightness unevenness is likely to occur in the emission light.

Figure 4:
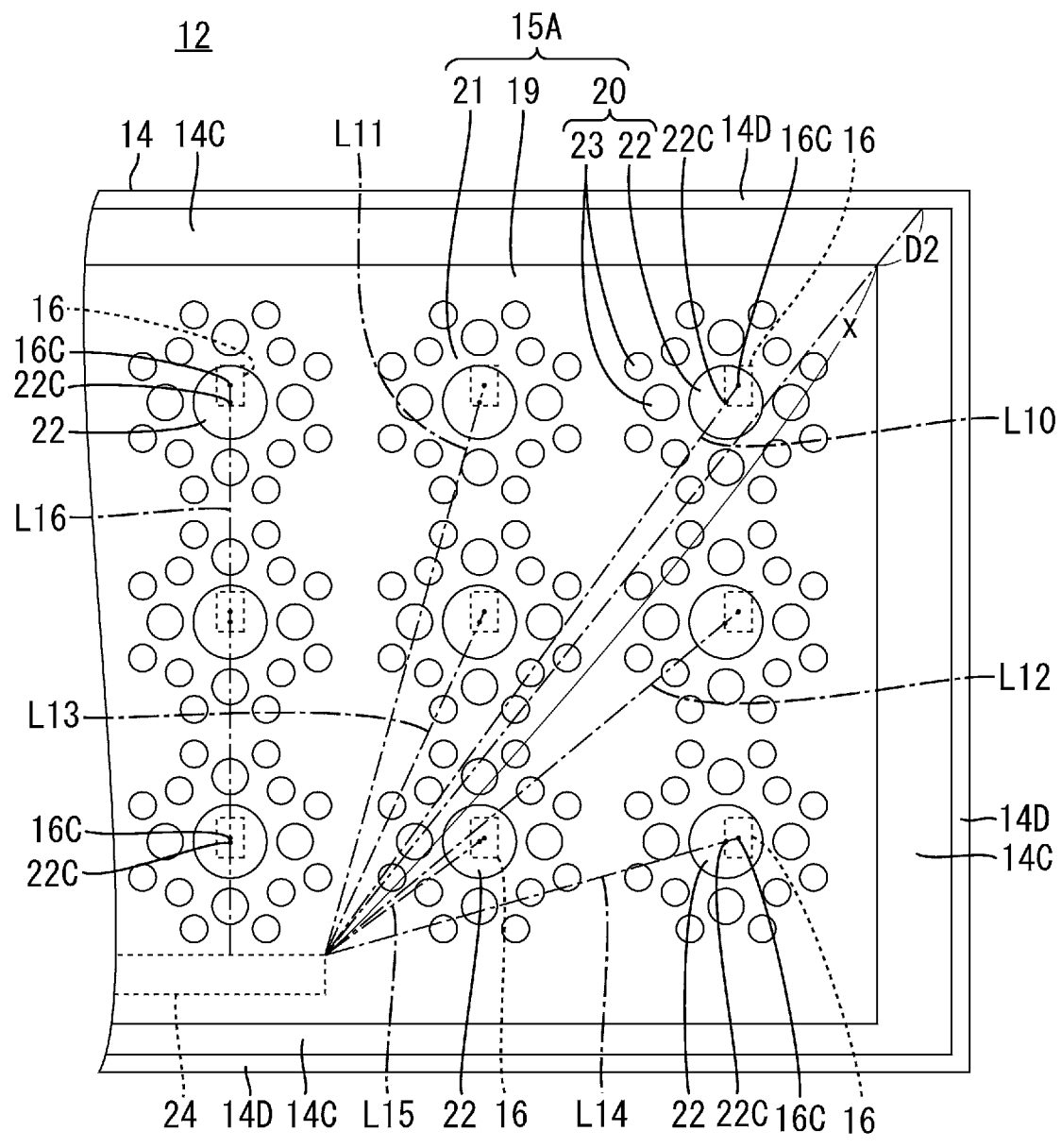
FIG. 4 is a plan view illustrating a positional relationship between a light reflection pattern and the LEDs at a first temperature according to the first embodiment.
Figure 5:
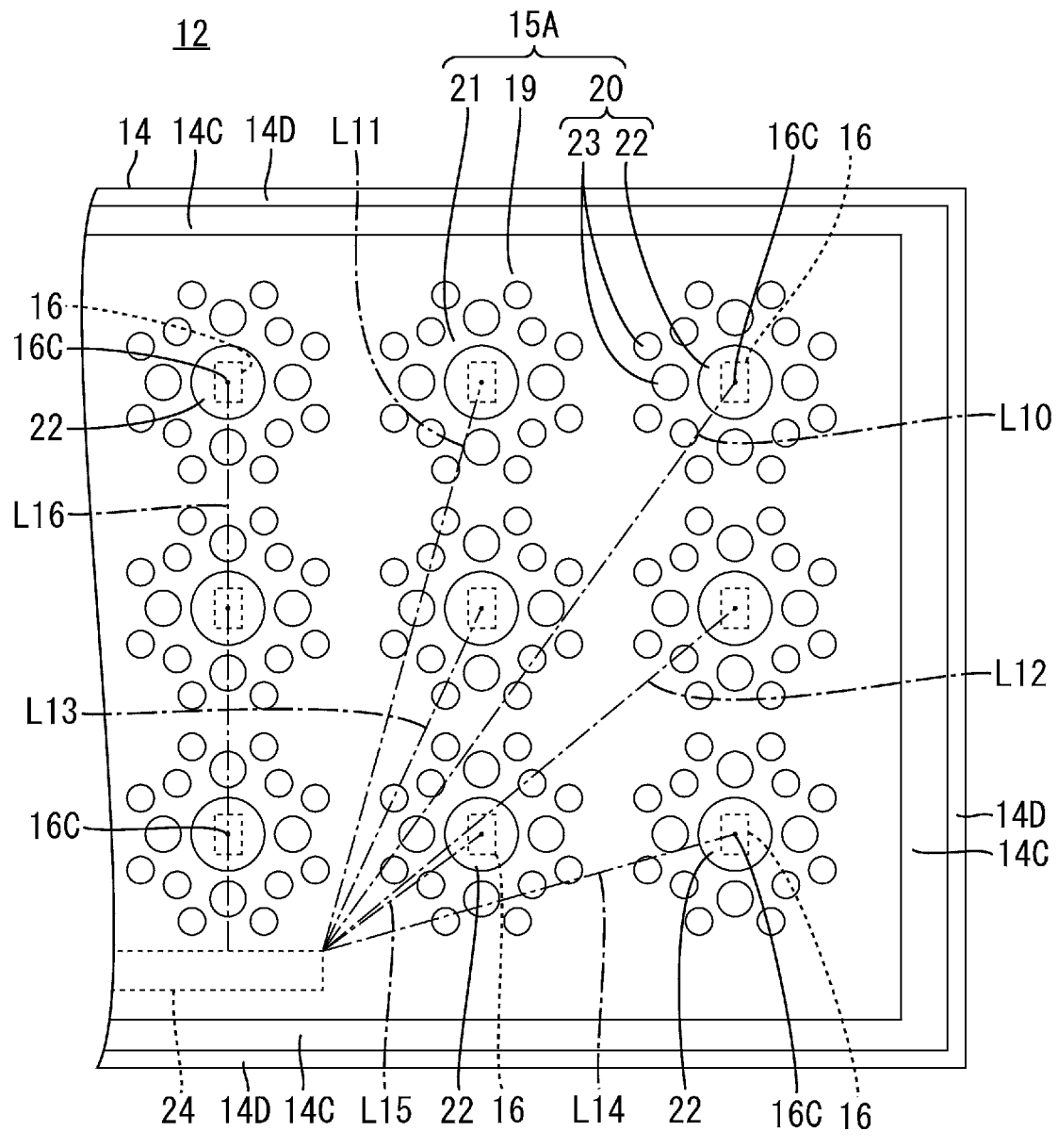
FIG. 5 is a plan view illustrating a positional relationship between a light reflection pattern and the LEDs at a second temperature according to the first embodiment.

Therefore, in the first light reflection portion 22 included in the light reflection pattern 20 according to the present embodiment, as illustrated in FIG. 4, at a first temperature, the second center 22C which is the center of the first light reflection portion 22 in a plan view, is positioned between the fixing portion 24 and a first center 16C which is the center of each of the LEDs 16 in a plan view. FIG. 4 is a plan view illustrating a positional relationship between the light reflection pattern 20 and the LEDs 16 at the first temperature. As illustrated in FIG. 5, in the first light reflection portion 22, at a second temperature higher than the first temperature, the position of the second center 22C of the first light reflection portion 22 is closer to the first center 16C of the LED 16 than the position of the second center 22C at the first temperature. FIG. 5 is a plan view illustrating a positional relationship between the light reflection pattern 20 and the LEDs 16 at the second temperature. Note that the "first center 16C" as referred to in the present embodiment is a position of an arithmetic average calculated from all points belonging to an outer shape of the LEDs 16 in a plan view, and is synonymous with a geometric center. Similarly, the "second center 22C" as referred to in the present embodiment is a position of an arithmetic average calculated from all points belonging to an outer shape of the first light reflection portion 22 in a plan view, and is synonymous with a geometric center. Accordingly, for example, when the temperature increases from the first temperature to the second temperature as the LEDs 16 are illuminated, the first light reflection portion 22 is displaced such that the second center 22C approaches the first center 16C from a position between the fixing portion 24 and the first center 16C of a corresponding one of the LEDs 16. As compared with a case where the second center of the first light reflection portion is arranged to coincide with the first center 16C of the LED 16 at the first temperature, the second center 22C of the first light reflection portion 22 is closer to the first center 16C of the LED 16 at the second temperature, and a large overlapping area of the first light reflection portion 22 with respect to the LED 16 can be ensured. Thus, even if the light control sheet 15A thermally expands as the temperature increases and the first light reflection portion 22 is displaced in a direction away from the fixing portion 24, the positional relationship of the first light reflection portion 22 with respect to the LED 16 can be maintained in an appropriate state. Therefore, the LED 16 is less likely to be directly visually recognized from the light emitting side, and thus, the occurrence of brightness unevenness can be suppressed.

The light reflection pattern 20 includes the plurality of second light reflection portions 23 disposed so as to be substantially point symmetrical with respect to the second center 22C of the first light reflection portion 22 described above. Thus, even if the light control sheet 15A thermally expands as the temperature increases and the plurality of second light reflection portions 23 are displaced in a direction away from the fixing portion 24, the positional relationship of the plurality of second light reflection portions 23 with respect to the LED 16 can be maintained in an appropriate state. Therefore, the distribution of the emission light amount from the light control sheet 15A is less likely to be uneven, and the occurrence of brightness unevenness can be suppressed.

Furthermore, in the light control sheet 15A, the main surface 19A on the back side faces the light-emitting faces 16A of all LEDs 16, and the plurality of light distribution adjustment members are not arranged separated by the first gap as in the related art. Therefore, it is possible to prevent light leakage through the first gap as it occurs in the related art. Thus, brightness unevenness is less likely to occur in the emission light from the light control sheet 15A.

In the present embodiment, the first temperature is set to 25° C., for example, corresponding to a general room temperature, and the second temperature is set to 55° C., for example, corresponding to an average temperature during actual use. The reason for setting the second temperature to 55° C. will be described. A numerical value when the temperature of the backlight device 12 increases to a maximum value is assumed to be about 80° C. The average temperature during actual use is assumed to be about an intermediate temperature between the room temperature of 25° C. and the assumed maximum temperature of 80° C. Based thereon, in the present embodiment, the second temperature is set to 55° C. corresponding about to an intermediate temperature between 25° C. and 80° C. In the present embodiment, the difference (temperature difference) between the first temperature and the second temperature is 30° C. That is, in the present embodiment, a temperature increase of about 30° C. is assumed from when the power source of the backlight device 12 is turned on until the internal temperature of the backlight device 12 reaches the average temperature during actual use.

As illustrated in FIGS. 4 and 5, the first light reflection portions 22 according to the present embodiment are disposed such that the second centers 22C overlap with straight lines L10 to L16 connecting a position of the fixing portion 24 closest to the LEDs 16 and the first centers 16C of the LEDs 16. In FIGS. 4 and 5, the straight lines L10 to L16 connecting the position of the fixing portion 24 closest to each of the LEDs 16 and the first center 16C of each of the LEDs 16 are illustrated as auxiliary lines (imaginary lines). The straight line L16 connecting the first centers 16C of the plurality of LEDs 16 aligned along the Y-axis direction with respect to the fixing portion 24 and a position of the fixing portion 24 closest to the LEDs 16 is parallel to the Y-axis direction. On the other hand, all of the other straight lines L10 to L15 are inclined with respect to both the X-axis direction and the Y-axis direction. In FIGS. 4 and 5, about half of the light reflection patterns 20 provided in the backlight device 12 on the right side illustrated in FIG. 2 are representatively illustrated, but the same applies to about half of the light reflection patterns 20 on the left side illustrated in FIG. 2. According to this configuration, when the first light reflection portions 22 are displaced as the light control sheet 15A thermally expands or thermally contracts, the second centers 22C move on the straight lines L10 to L16.

Figure 6:
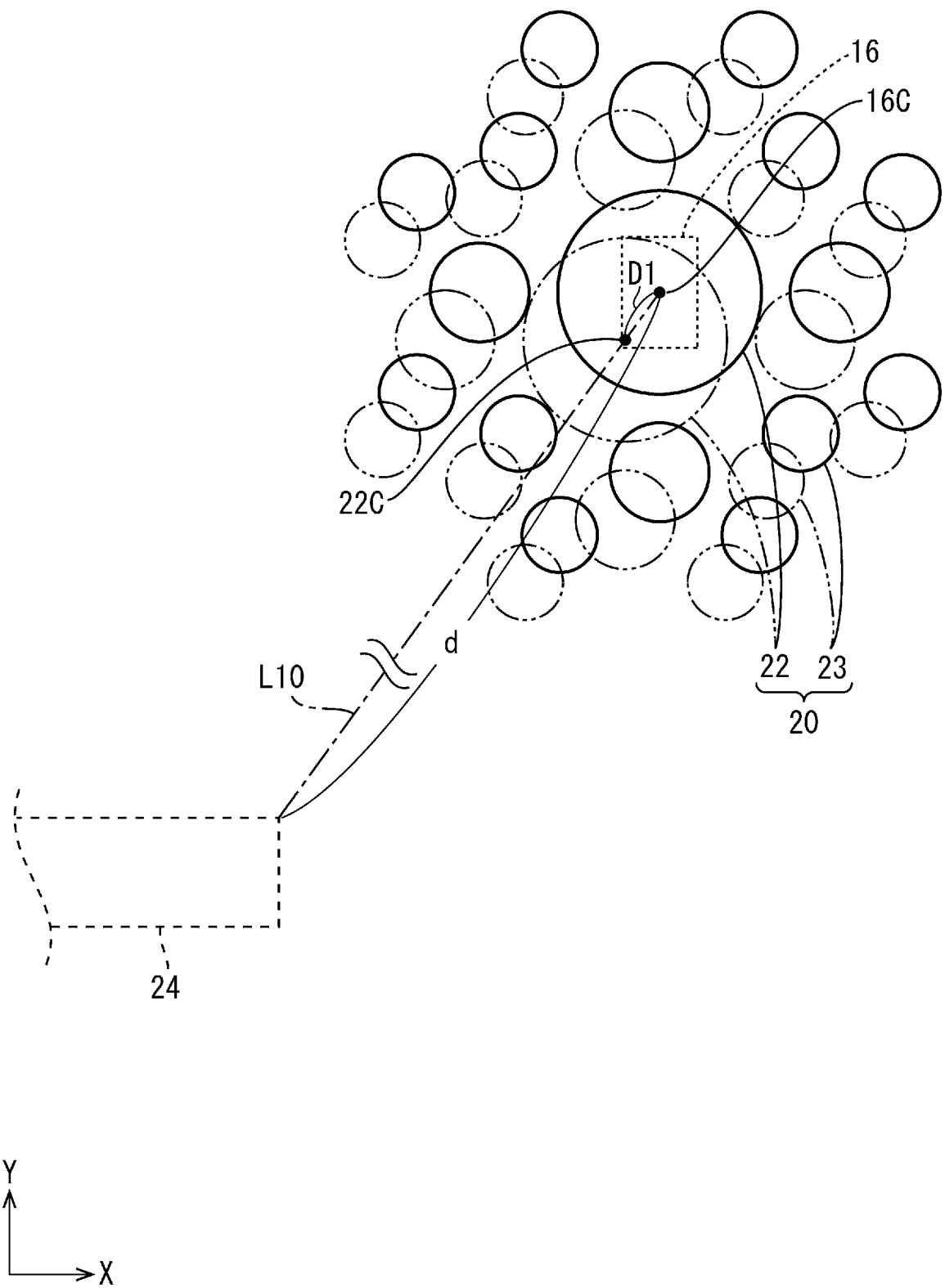
FIG. 6 is a plan view illustrating a positional relationship among a fixing portion, an LED farthest from the fixing portion, and a first light reflection portion overlapping the LED according to the first embodiment.

In addition, as illustrated in FIG. 5, the first light reflection portions 22 are disposed such that the second centers 22C coincide with the first centers 16C of the LEDs 16 at the second temperature. That is, the arrangement of the first light reflection portions 22 at the first temperature is set to positions closer to the fixing portion 24 than the first centers 16C corresponding to the displacement amount of the first light reflection portions 22 by the temperature increase from the first temperature to the second temperature. Specifically, as illustrated in FIG. 6, "D1=Aαd" is satisfied, where "d" is the shortest distance from the fixing portion 24 to the first center 16C of a corresponding one of the LEDs 16 is, "α" is the linear expansion coefficient of the light control sheet 15A, "A" is the difference between the first temperature and the second temperature, and "D1" is the distance between the second center 22C of the first light reflection portion 22 and the first center 16C of the LED 16 at the first temperature. Note that the distance D1 mentioned above does not need to exactly coincide with "Aαd", and may be a value obtained by adding, for example, a dimensional tolerance of the light reflection pattern 20 or an assembly tolerance of each component to "Aαd". For example, the numerical values of the dimensional tolerance and the assembly tolerance added to "Aαd" are about 0.15 mm. FIG. 6 is a plan view illustrating a positional relationship among the fixing portion 24, the LED 16 farthest from the fixing portion 24, and the first light reflection portion 22 overlapping the LED 16. In FIG. 6, the first light reflection portion 22 at the first temperature is illustrated by a two-dot-dashed line, and the first light reflection portion 22 at the second temperature is illustrated by a solid line. FIG. 6 illustrates the second center 22C of the first light reflection portion 22 at the first temperature. The second center 22C at the second temperature overlaps with the first center 16C.

The above-described shortest distance d from the fixing portion 24 to the first center 16C of the LED 16 is the length of a line segment from the fixing portion 24 to the first center 16C among the straight lines L10 to L16 connecting a position of the fixing portion 24 closest to the LEDs 16 and the first center 16C of each of the LEDs 16. The shortest distance d from the fixing portion 24 to the first center 16C of each of the LEDs 16 varies depending on the positional relationship of the LEDs 16 with respect to the fixing portion 24. The linear expansion coefficient α of the light control sheet 15A varies depending on the material used for the transmission substrate 19. For example, when the material of the transmission substrate 19 is PET, the linear expansion coefficient α is about "$1.5*10^{-5}/°$ C.". When the material of the transmission substrate 19 is PC, the linear expansion coefficient α is about "$6.8*10^{-5}/°$ C.". When polystyrene (PS) is used as the material of the transmission substrate 19, the linear expansion coefficient α is about "$6$ to $8*10^{-5}/°$ C.". When the material of the transmission substrate 19 is an acrylic resin, the linear expansion coefficient α is about "$6*10^{-5}/°$ C.". The difference A between the first temperature and the second temperature is 30° C. in the present embodiment, as described above. The numerical value of "Aα" obtained by multiplying the difference A between the first temperature and the second temperature by the linear expansion coefficient α of the light control sheet 15A is about "$4.5*10^{-4}$" when the material of the transmission substrate 19 is PET. When the material of the transmission substrate 19 is PC, the numerical value of "Aα" is about "$2.04*10^{-3}$". When the material of the transmission substrate 19 is PS, the numerical value of "Aα" is about "$1.8$ to $2.4*10^{-3}$". When the material of the transmission substrate 19 is an acrylic resin, the numerical value of "Aα" is about "$1.8*10^{-3}$".

The displacement amount of the first light reflection portion 22 when the light control sheet 15A thermally expands as the temperature increases from the first temperature to the second temperature is "Aαd", which is obtained by multiplying the shortest distance d from the fixing portion 24 to the first center 16C of the LED 16, the linear expansion coefficient α of the light control sheet 15A, and the difference A between the first temperature and the second temperature. On the other hand, as described above, the distance D1 between the first center 16C of the LED 16 and the second center 22C of the first light reflection portion 22 at the first temperature is set to "Aαd". Therefore, as the temperature increases from the first temperature to the second temperature, the first light reflection portion 22 is displaced until the second center 22C reaches a position where the second center 22C coincides with the first center 16C of the LED 16. Accordingly, the LED 16 is even more unlikely to be directly visually recognized from the light emitting side at the second temperature.

The distance D1 between the second center 22C of the first light reflection portion 22 and the first center 16C of the LED 16 at the first temperature is set to "Aαd", and thus varies depending on the positional relationship of the first light reflection portion 22 with respect to the fixing portion 24. Specifically, the distance between the second center 22C of the first light reflection portion 22 and the first center 16C of the LED 16 at the first temperature increases as the first light reflection portion 22 is farther from the fixing portion 24, and decreases as the first light reflection portion 22 is closer to the fixing portion 24. According to such a configuration, even if the displacement amounts of the plurality of first light reflection portions 22 due to the thermal expansion of the light control sheet 15A are different from each other, it is easy to sufficiently secure the overlapping area of each of the first light reflection portions 22 with respect to each of the LEDs 16. Accordingly, the positional relationship of each of the first light reflection portions 22 with respect to a corresponding one of the LEDs 16 can be maintained in an appropriate state. Note that the plurality of first light reflection portions 22 include the first light reflection portion 22 overlapping the entire region of the LED 16 at the first temperature and the first light reflection portion 22 overlapping a large portion (half or more) of the LED 16 but not overlapping a part of the LED 16 at the first temperature. The plurality of second light reflection portions 23 include the second light reflection portion 23 not overlapping the LED 16 at the first temperature and the second light reflection portion 23 overlapping a portion of the LED 16 at the first temperature. Most of the second light reflection portions 23 do not overlap the LEDs 16. The second light reflection portion 23 overlapping with a part of the LED 16 is limited to a second light reflection portion 23 arranged close to the first light reflection portion 22 having a certain distance or more from the fixing portion 24.

Furthermore, at the first temperature, as illustrated in FIG. 4, in the outer circumferential end portion of the light control sheet 15A, a predetermined distance D2 is provided between an outer end portion (an upper end portion in FIGS. 4 and 5) on the long side located on the opposite side to the outer end portion on the long side to which the fixing portion 24 is fixed and the second side portion 14D of the chassis 14 opposed to the outer end portion. Regarding the distance D2 described above, "D2≥Aαx" is satisfied, where "x" is the shortest distance from the fixing portion 24 to the above-described outer end portion on the long side of the light control sheet 15A. When the light control sheet 15A thermally expands as the temperature increases from the first temperature to the second temperature, the displacement amount of the above-described outer end portion on the long side is "Aαx". Therefore, when the distance D2 between the above-described outer end portion on the long side of the light control sheet 15A and the second side portion 14D opposing the outer end portion is equal to or greater than "Aαx" at the first temperature, the above-described outer end portion on the long side of the light control sheet 15A can be prevented from interfering with the second side portion 14D opposing the outer end portion. Therefore, deformation such as deflection or wrinkling is less likely to occur in the light control sheet 15A that thermally expands.

Figure 7:
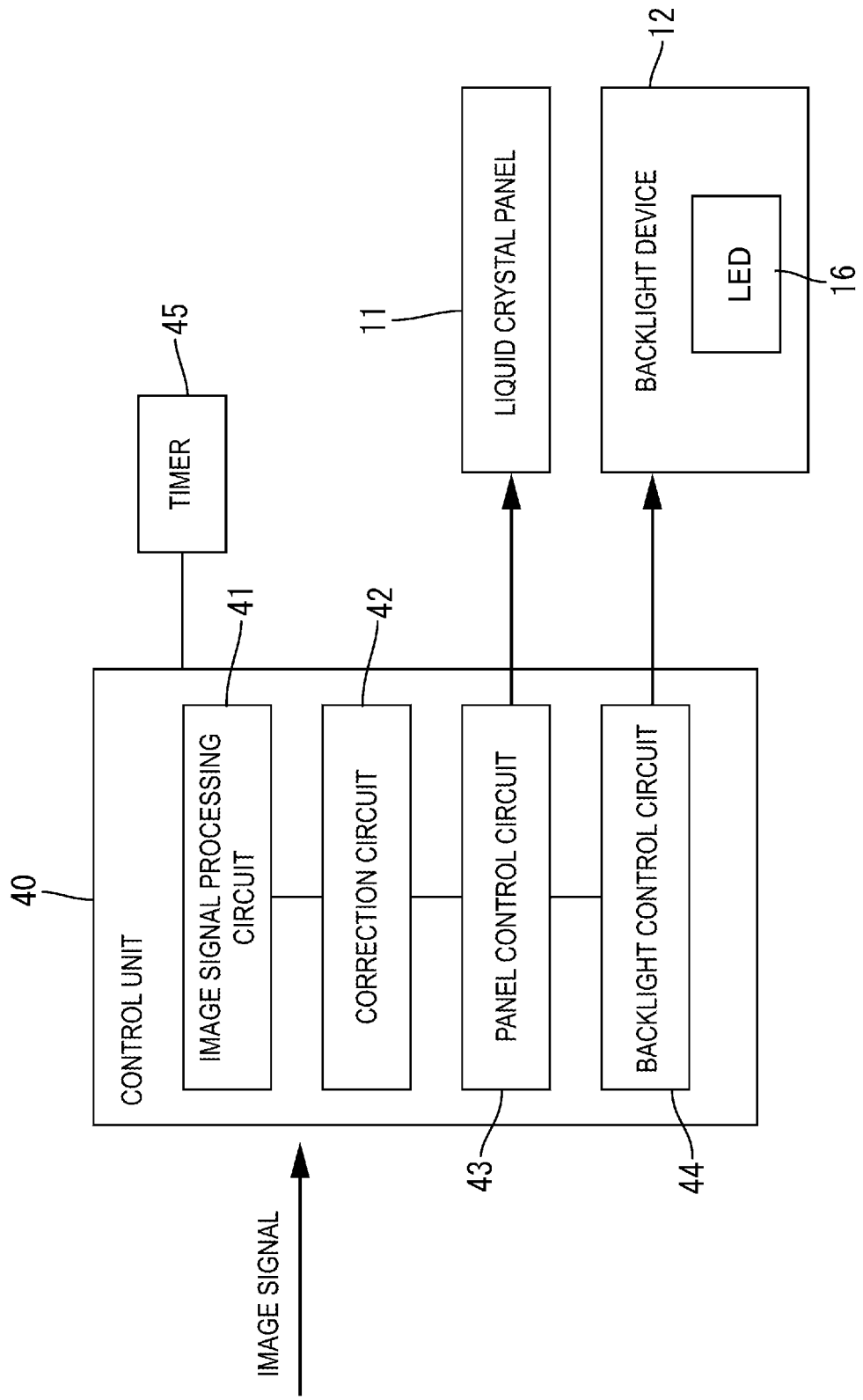
FIG. 7 is a block diagram illustrating an electrical configuration of a liquid crystal display device according to the first embodiment.

Next, a circuit configuration for controlling drive of the liquid crystal panel 11 and the backlight device 12 described above will be described with reference to the block diagram of FIG. 7. As illustrated in FIG. 7, the liquid crystal display device 10 includes a control unit 40 that controls drive of the liquid crystal panel 11 and the backlight device 12. The control unit 40 includes an image signal processing circuit 41, a correction circuit 42, a panel control circuit 43, and a backlight control circuit 44. The image signal processing circuit 41 processes an image signal supplied from an external host system and outputs a processed image signal. The correction circuit 42 outputs a correction signal generated by correcting the processed image signal output from the image signal processing circuit 41, or outputs the processed image signal without correction. The panel control circuit 43 writes an image based on the correction signal or the processed image signal to the liquid crystal panel 11. When the liquid crystal display device 10 includes a gate driver and a source driver for writing an image to the liquid crystal panel 11, the panel control circuit 43 controls drive of the gate driver and the source driver. The backlight control circuit 44 adjusts the amount of light emitted from each of the LEDs 16, and the like by controlling the LEDs 16. In order to control the LEDs 16, the backlight control circuit 44 can perform, for example, pulse width modulation (PWM) dimming. When the liquid crystal display device 10 includes an LED driver that drives the LEDs 16, the backlight control circuit 44 controls drive of the LED driver. The backlight control circuit 44 can control the brightness (the light emission amount) of the LEDs 16 by local dimming to illuminate the LEDs 16, based on the image signal output from the image signal processing circuit 41.

Figure 8:
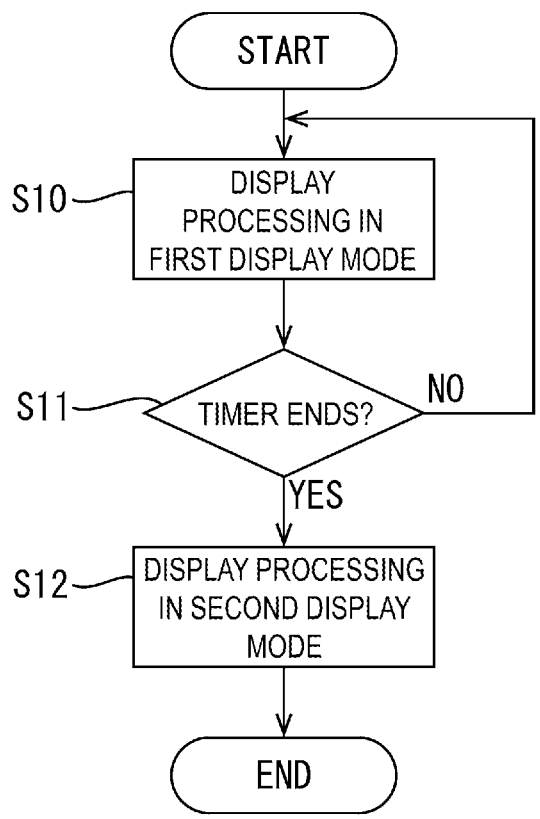
FIG. 8 is a flowchart illustrating a control operation related to switching from a display in a first display mode to a display in a second display mode according to the first embodiment.

The liquid crystal display device 10 includes, in addition to the control unit 40 mentioned above, a timer 45 that measures the time elapsed after the power source is turned on. As illustrated in FIG. 8, the control unit 40 can switch from display in a first display mode to display in a second display mode in accordance with the elapsed time measured by the timer 45. In the first display mode, the maximum light emission amount of the LEDs 16 is set to a value greater than that in the second display mode, and the gray scale related to the image displayed on the liquid crystal panel 11 is adjusted in accordance with the setting of the LEDs 16. In the second display mode, the light emission amount of the LEDs 16 is adjusted depending on whether or not a minimum gray scale region is included in the image displayed on the liquid crystal panel 11.

The control related to switching between display in the first display mode and display in the second display mode by the control unit 40 will be described. According to FIG. 8, when the power source of the liquid crystal display device 10 is turned on, the control unit 40 performs a display processing in the first display mode (step S10). Subsequently, the control unit 40 determines whether or not the elapsed time measured by the timer 45 reaches a threshold value (step S11). When the determination result in step S11 is NO, the processing returns to step S10, and the control unit 40 continues the display processing in the first display mode. When the determination result in step S11 is YES, the control unit 40 switches to a display processing in the second display mode (step S12).

Figure 9:
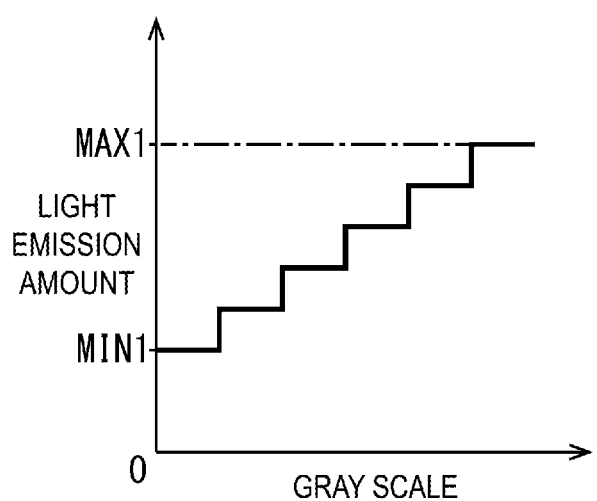
FIG. 9 is a graph showing a relationship between a gray scale related to an image and a light emission amount of the LEDs in the first display mode according to the first embodiment.

The display processing in the first display mode will be described with reference to FIG. 9. FIG. 9 is a graph illustrating a relationship between the gray scale related to an image and the light emission amount of the LEDs 16. In the graph of FIG. 9, the vertical axis represents the light emission amount of the LEDs 16, and the horizontal axis represents the gray scale of a region of the image irradiated with light from the LEDs 16 (hereinafter referred to as a "gray scale related to an image" or a "gray scale"). In FIG. 9, when the light emission amount on the vertical axis is 0, the LEDs 16 are not illuminated. In FIG. 9, when the gray scale on the horizontal axis is 0, the gray scale is a minimum gray scale, which means that black is displayed. In the first display mode, as illustrated in FIG. 9, the control unit 40 controls a maximum light emission amount MAX1 of the LEDs 16 so as to take a value greater than maximum light emission amounts MAX2 and MAX3 of the LEDs 16 in the second display mode (see FIGS. 11 and 12). Specifically, the backlight control circuit 44 included in the control unit 40 changes the light emission amount of the LEDs 16 in a stepwise manner in accordance with the gray scale related to the image, and realizes local dimming control by increasing the light emission amount of the LEDs 16 as the gray scale increases. In the first display mode, the backlight control circuit 44 sets the light emission amount of the LEDs 16 for each gray scale to a value substantially greater than the light emission amount of the LEDs 16 for each gray scale in the second display mode. In particular, in the first display mode, the backlight control circuit 44 controls the LEDs 16 to obtain a minimum light emission amount MIN1 when the gray scale related to the image is 0. The minimum light emission amount MIN1 is greater than 0. That is, even when the minimum gray scale region (black display portion) is included in at least a part of the image, in the first display mode, the backlight control circuit 44 intentionally causes the LEDs 16 having a relationship of irradiating the minimum gray scale region with light to emit light.

Here, immediately after the power source of the liquid crystal display device 10 is turned on, the internal temperature of the backlight device 12 is close to room temperature (first temperature), and the light control sheet 15A does not sufficiently thermally expand by heat generated from the LEDs 16. Therefore, the display processing in the first display mode is performed by the control unit 40 until the elapsed time measured by the timer 45 reaches the threshold value as described above, and thus, a large amount of heat is emitted from the LEDs 16 having a great light emission amount. The thermal expansion of the light control sheet 15A can be promoted by this heat, so that the time required for the temperature environment to reach the second temperature from the first temperature can be shortened. Therefore, in the light control sheet 15A, the first light reflection portion 22 can be displaced in a short time until the second center 22C reaches a position close to the first center 16C of each of the LEDs 16.

Furthermore, in the first display mode, the control unit 40 corrects the image signal to generate a correction signal having a gray scale lower than that of the image signal, and writes an image based on the correction signal to the liquid crystal panel 11. Specifically, in the first display mode, the correction circuit 42 included in the control unit 40 corrects the processed image signal output from the image signal processing circuit 41 to generate a correction signal having a gray scale lower than that of the original image signal. In the first display mode, the panel control circuit 43 included in the control unit 40 writes an image based on the correction signal output from the correction circuit 42 to the liquid crystal panel 11. Thus, even if the backlight control circuit 44 controls the light emission amount of the LEDs 16 so as to take a greater value in the first display mode than in the second display mode, the actually displayed gray scale can be approached to the gray scale based on the original image signal. Thus, the display quality can be maintained at a good level.

Figure 10:
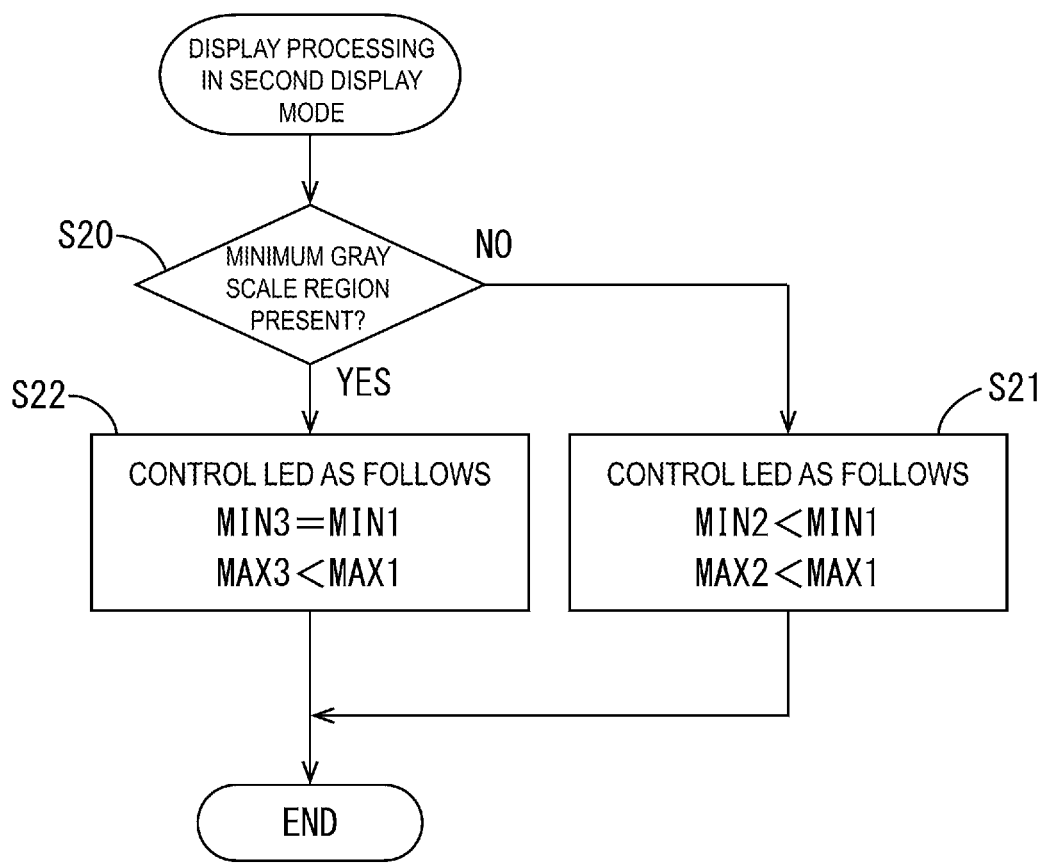
FIG. 10 is a flowchart illustrating a display processing in the second display mode according to the first embodiment.
Figure 11:
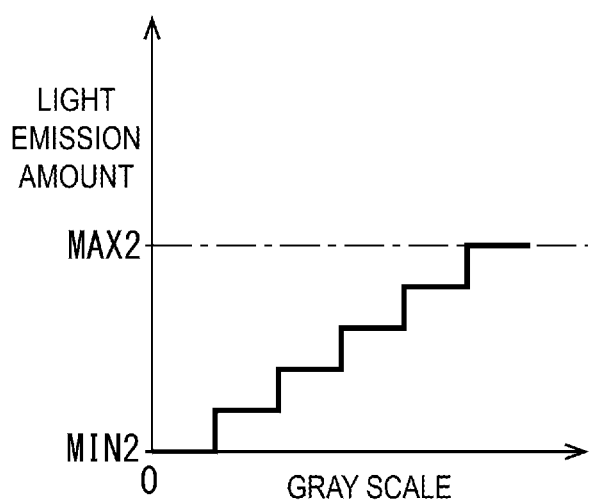
FIG. 11 is a graph showing a relationship between a gray scale related to an image and a light emission amount of the LEDs in a case where a minimum gray scale region is not included in an image in the second display mode according to the first embodiment.
Figure 12:
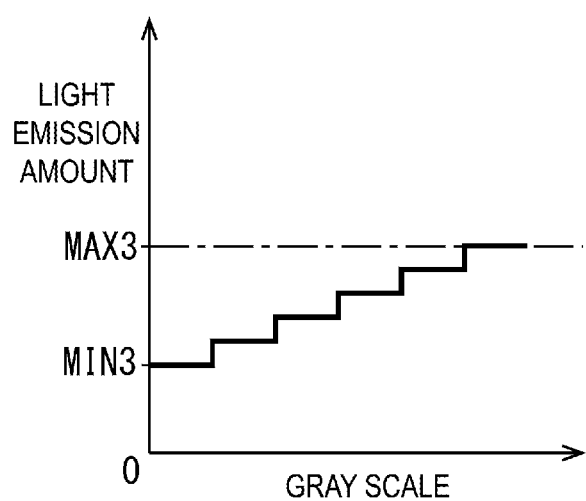
FIG. 12 is a graph showing a relationship between a gray scale related to an image and a light emission amount of the LEDs in a case where the minimum gray scale region is included in the image in the second display mode according to the first embodiment.

Next, a display processing in the second display mode will be described with reference to FIGS. 10 to 12. FIG. 10 illustrates a flowchart relating to the display processing in the second display mode. FIGS. 11 and 12 are graphs illustrating a relationship between the gray scale related to an image and the light emission amount of the LEDs 16. In the graphs of FIGS. 11 and 12, the horizontal axis represents the gray scale related to the image, and the vertical axis represents the light emission amount of the LEDs 16. In FIGS. 11 and 12, when the gray scale on the horizontal axis is 0, the gray scale is a minimum gray scale, which means that black is displayed. In FIGS. 11 and 12, when the light emission amount on the vertical axis is 0, the LEDs 16 are not illuminated.

In the second display mode, as illustrated in FIG. 10, the control unit 40 determines whether or not the minimum gray scale region is included in the image based on the image signal (step S20). When the determination result in step S20 is NO, the control unit 40 sets a minimum light emission amount MIN2 of the LEDs 16 to a value smaller than the minimum light emission amount MIN1 in the first display mode and sets the maximum light emission amount MAX2 of the LEDs 16 to a value smaller than the maximum light emission amount MAX1 in the first display mode (step S21). When the determination result in step S20 is YES, a minimum light emission amount MIN3 of the LEDs 16 is set to the same value as the minimum light emission amount MIN1 in the first display mode, and the maximum light emission amount MAX3 of the LEDs 16 is set to a value smaller than the maximum light emission amount MAX1 in the first display mode (step S22).

Specifically, in step S21, as illustrated in FIG. 11, the backlight control circuit 44 included in the control unit 40 controls the minimum light emission amount MIN2 of the LEDs 16 so as to take a value smaller than the minimum light emission amount MIN1 in the first display mode (see FIG. 9). At this time, the backlight control circuit 44 controls the minimum light emission amount MIN2 of the LEDs 16 so as to take a value of 0. In step S21, it is assumed that the minimum gray scale region is not included in the image, and thus, the following case seldom occurs: the light emission amount of the LEDs 16 is actually set to the minimum light emission amount MIN2, and the LEDs 16 are not illuminated. On the other hand, in step S21, the backlight control circuit 44 controls the maximum light emission amount MAX2 of the LEDs 16 so as to take a value smaller than the maximum light emission amount MAX1 of the LEDs 16 in the first display mode (see FIG. 9). At this time, the backlight control circuit 44 controls the maximum light emission amount MAX2 of the LEDs 16 so as to take the same value as the maximum light emission amount MAX3 of the LEDs 16 in step S22 (see FIG. 12). Furthermore, in step S21, the backlight control circuit 44 sets the difference between the minimum light emission amount MIN2 and the maximum light emission amount MAX2 equal to the difference between the minimum light emission amount MIN1 and the maximum light emission amount MAX1. Accordingly, in step S21, the backlight control circuit 44 sets a change amount and a change rate of the light emission amount associated with the change in the gray scale related to the image to the same values as the change amount and the change rate of the light emission amount in the first display mode (see FIG. 9). As described above, when the minimum gray scale region is not included in the image, the backlight control circuit 44 sets the minimum light emission amount MIN2 of the LEDs 16 to 0 and sets the maximum light emission amount MAX2 to a value smaller than the maximum light emission amount MAX1. Therefore, the panel control circuit 43 writes the image based on the image signal not subjected to a correction processing by the correction circuit 42. The backlight control circuit 44 controls the LEDs 16 by local dimming, based on the image signal.

In step S22, as illustrated in FIG. 12, the backlight control circuit 44 included in the control unit 40 controls the minimum light emission amount MIN3 of the LEDs 16 to take a value greater than the minimum light emission amount MIN2 (see FIG. 11) and to take a value equal to the minimum light emission amount MIN1 (see FIG. 9) in the first display mode. That is, when the minimum gray scale region is included in the image, in the second display mode, the backlight control circuit 44 intentionally causes the LEDs 16 having a relationship of irradiating the minimum gray scale region with light to emit light. On the other hand, in step S22, the backlight control circuit 44 controls the maximum light emission amount MAX3 of the LEDs 16 so as to take a value smaller than the maximum light emission amount MAX1 of the LEDs 16 in the first display mode (see FIG. 9). At this time, the backlight control circuit 44 controls the maximum light emission amount MAX3 of the LEDs 16 so as to take the same value as the maximum light emission amount MAX2 of the LEDs 16 in step S21 (see FIG. 11). Furthermore, in step S22, the backlight control circuit 44 sets the difference between the minimum light emission amount MIN3 and the maximum light emission amount MAX3 to a value smaller than the difference between the minimum light emission amount MIN1 and the maximum light emission amount MAX1. Accordingly, in step S22, the backlight control circuit 44 sets a change amount and a change rate of the light emission amount associated with the change in the gray scale related to the image to values smaller than the change amount and the change rate of the light emission amount in the first display mode (see FIG. 9).

Here, assuming that the LEDs 16 having a relationship of irradiating the minimum gray scale region with light are not illuminated in the second display mode, for example, when the minimum gray scale region is wide and included in the image for a long time, the amount of heat generated from the LEDs 16 is reduced, and as a result, the light control sheet 15A may not sufficiently thermally expand. In this regard, the backlight control circuit 44 sets the minimum light emission amount MIN3 of the LEDs 16 to a value greater than 0 as described above, and causes the LEDs 16 having a relationship of irradiating the minimum gray scale region with light to emit light in the second display mode. Therefore, even when the minimum gray scale region is wide and included in the image for a long time, the amount of heat generated from the LEDs 16 can be sufficiently secured. Therefore, a change in the temperature environment of the backlight device 12 is suppressed, so that the expansion and contraction of the light control sheet 15A can be suppressed.

As described above, the backlight device (illumination device) 12 of the present embodiment includes the LEDs (light sources) 16 each having the light-emitting face 16A, the light control sheet (first optical member) 15A having the main surface (first main surface) 19A facing the light-emitting face 16A of each of the LEDs 16, and the fixing portion 24 fixed to a part of the light control sheet 15A. The light control sheet 15A includes the first light reflection portion (light reflection portion) 22 that reflects light and of which at least a part overlaps the LED 16, and the light transmitting portion 21 that transmits light and is disposed so as not to overlap with the first light reflection portion 22. In the LED 16, a center viewed in a plan view is defined as the first center 16C. In the first light reflection portion 22, a center viewed in a plan view is defined as the second center 22C. In the first light reflection portion 22, the second center 22C is positioned between the fixing portion 24 and the first center 16C at the first temperature, and the position of the second center 22C at the second temperature that is higher than the first temperature is closer to the first center 16C than the position of the second center 22C at the first temperature.

The light emitted from the light-emitting face 16A of the LED 16 is reflected by the first light reflection portion 22 of the light control sheet 15A, but is transmitted through the light transmitting portion 21 and emitted. By disposing the first light reflection portion 22 so that at least a part of the first light reflection portion 22 overlaps the LED 16, most of the light from the light-emitting face 16A can be reflected, and the LED 16 is less likely to be directly visually recognized from the light emitting side. By disposing the light transmitting portion 21 so as not to overlap the LED 16, the emission of light is promoted. Thus, the distribution of the emission light amount is controlled by the first light reflection portion 22 and the light transmitting portion 21.

When the LED 16 is illuminated, the temperature of the backlight device 12 increases due to heat generated from the LED 16. At this time, the light control sheet 15A thermally expands and extends from a site fixed by the fixing portion 24 as a starting point. Accordingly, the first light reflection portion 22 is also displaced in a direction away from the fixing portion 24. For example, when the temperature increases from the first temperature to the second temperature as the LED 16 is illuminated, the first light reflection portion 22 is displaced such that the second center 22C is displaced from a position between the fixing portion 24 and the first center 16C of the LED 16 to a position close to the first center 16C. Thus, even if the light control sheet 15A thermally expands as the temperature increases and the first light reflection portion 22 is displaced in a direction away from the fixing portion 24, the positional relationship of the first light reflection portion 22 with respect to the LED 16 can be maintained in an appropriate state. Therefore, the LED 16 is less likely to be directly visually recognized from the light emitting side, and thus, the occurrence of brightness unevenness can be suppressed.

In the first light reflection portions 22, the second centers 22C overlap with the straight lines L10 to L16 connecting a position of the fixing portion 24 closest to the LED 16 and the first center 16C, and the distance between the first center 16C and the second center 22C at the first temperature is "A$\alpha$d", where "d" is the shortest distance from the fixing portion 24 to the first center 16C, "$\alpha$" is the linear expansion coefficient of the light control sheet 15A, and "A" is the difference between the first temperature and the second temperature. As the light control sheet 15A thermally expands, the first light reflection portions 22 are displaced along the straight lines L10 to L16 connecting a position of the fixing portion 24 closest to the LEDs 16 and the first centers 16C of the LEDs 16. The displacement amount of each of the first light reflection portions 22 when the light control sheet 15A thermally expands as the temperature increases from the first temperature to the second temperature is "A$\alpha$d", which is obtained by multiplying the shortest distance d from the fixing portion 24 to the first center 16C, the linear expansion coefficient $\alpha$ of the light control sheet 15A, and the difference A between the first temperature and the second temperature. The distance between the first center 16C of the LED 16 and the second center 22C of the first light reflection portion 22 at the first temperature is set to "A$\alpha$d". Therefore, as the temperature increases from the first temperature to the second temperature, the first light reflection portion 22 is displaced until the second center 22C reaches a position where the second center 22C coincides with the first center 16C of the LED 16. Accordingly, the LED 16 is even more unlikely to be directly visually recognized from the light emitting side at the second temperature.

Furthermore, the control unit 40 that controls the LEDs 16 and the timer 45 that measures the time elapsed after the power source is turned on are provided. The control unit 40 increases the light emission amount of the LEDs 16 until the elapsed time measured by the timer 45 reaches a threshold value, as compared with a case where the elapsed time exceeds the threshold value. Immediately after the power source is turned on, the light control sheet 15A is not sufficiently thermally expanded by the heat generated from the LEDs 16. Therefore, the control unit 40 increases the light emission amount of the LEDs 16 until the elapsed time after the power source is turned on reaches the threshold value, as compared with the case where the elapsed time exceeds the threshold value, and thus, the thermal expansion of the light control sheet 15A can be promoted. Thus, the time required for the temperature environment to reach the second temperature from the first temperature can be shortened, so that the first light reflection portion 22 can be displaced in a short time to a position where the second center 22C is close to the first center 16C of each of the LEDs 16.

The liquid crystal display device (display device) 10 according to the present embodiment includes the backlight device 12 described above, and the liquid crystal panel (display panel) 11 that displays an image by utilizing light emitted from the backlight device 12. According to the display device having such a configuration, brightness unevenness is unlikely to occur in light emitted from the backlight device 12, and thus, an image can be displayed with excellent display quality.

Furthermore, the control unit 40 that controls the LEDs 16 and the liquid crystal panel 11 is provided, and a plurality of the LEDs 16 are disposed side by side in the plane of the main surface 19A. The control unit 40 writes an image based on an image signal to the liquid crystal panel 11, controls the plurality of LEDs 16, based on the image signal, and causes LEDs 16 having a relationship of irradiating the minimum gray scale region with light, to emit light, when the minimum gray scale region having a minimum gray scale is included in the image. The control unit 40 causes the LEDs 16 having a relationship of irradiating the minimum gray scale region in the image with light, to emit light, and thus, a change in the temperature environment can be suppressed due to the heat generated from the LEDs 16 having a relationship of irradiating the minimum gray scale region with light.

Furthermore, the control unit 40 that controls the LEDs 16 and the liquid crystal panel 11, and the timer 45 that measures the time elapsed after the power source is turned on are provided. The control unit 40 increases the light emission amount of the LEDs 16 until the elapsed time measured by the timer 45 reaches a threshold value, as compared with a case where the elapsed time exceeds the threshold value, corrects the image signal to generate a correction signal having a gray scale lower than that of the image signal, and writes an image based on the correction signal to the liquid crystal panel 11. Immediately after the power source is turned on, the light control sheet 15A is not sufficiently thermally expanded by the heat generated from the LEDs 16. Therefore, the control unit 40 increases the light emission amount of the LEDs 16 until the elapsed time after the power source is turned on reaches the threshold value, as compared with the case where the elapsed time exceeds the threshold value, and thus, the thermal expansion of the light control sheet 15A can be promoted. In addition, the control unit 40 corrects the image signal to generate a correction signal having a gray scale lower than that of the image signal, and writes an image based on the correction signal to the liquid crystal panel 11, so that the gray scale of the actual display can be approached to the gray scale based on the original image signal, even when the light emission amount of the LEDs 16 increases. Thus, the display quality can be maintained at a good level.

Second Embodiment

A second embodiment will be described with reference to FIG. 13 to FIG. 15. In the second embodiment, a case where a configuration of a light reflection pattern 120 is changed will be described. Further, repetitive descriptions of structures, actions, and effects similar to those of the first embodiment described above will be omitted.

Figure 13:
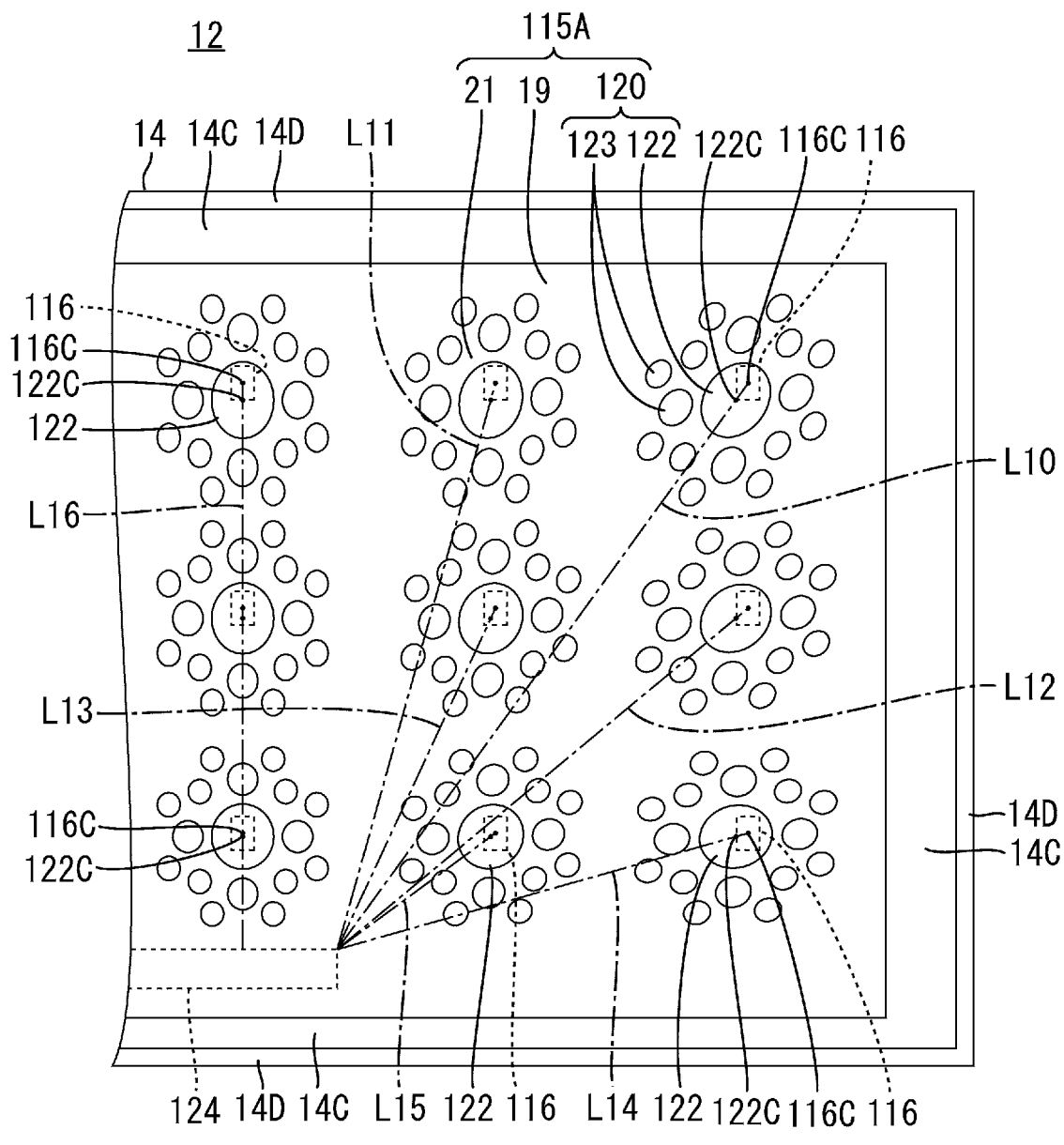
FIG. 13 is a plan view illustrating a positional relationship between a light reflection pattern and LEDs at the first temperature according to a second embodiment.
Figure 14:
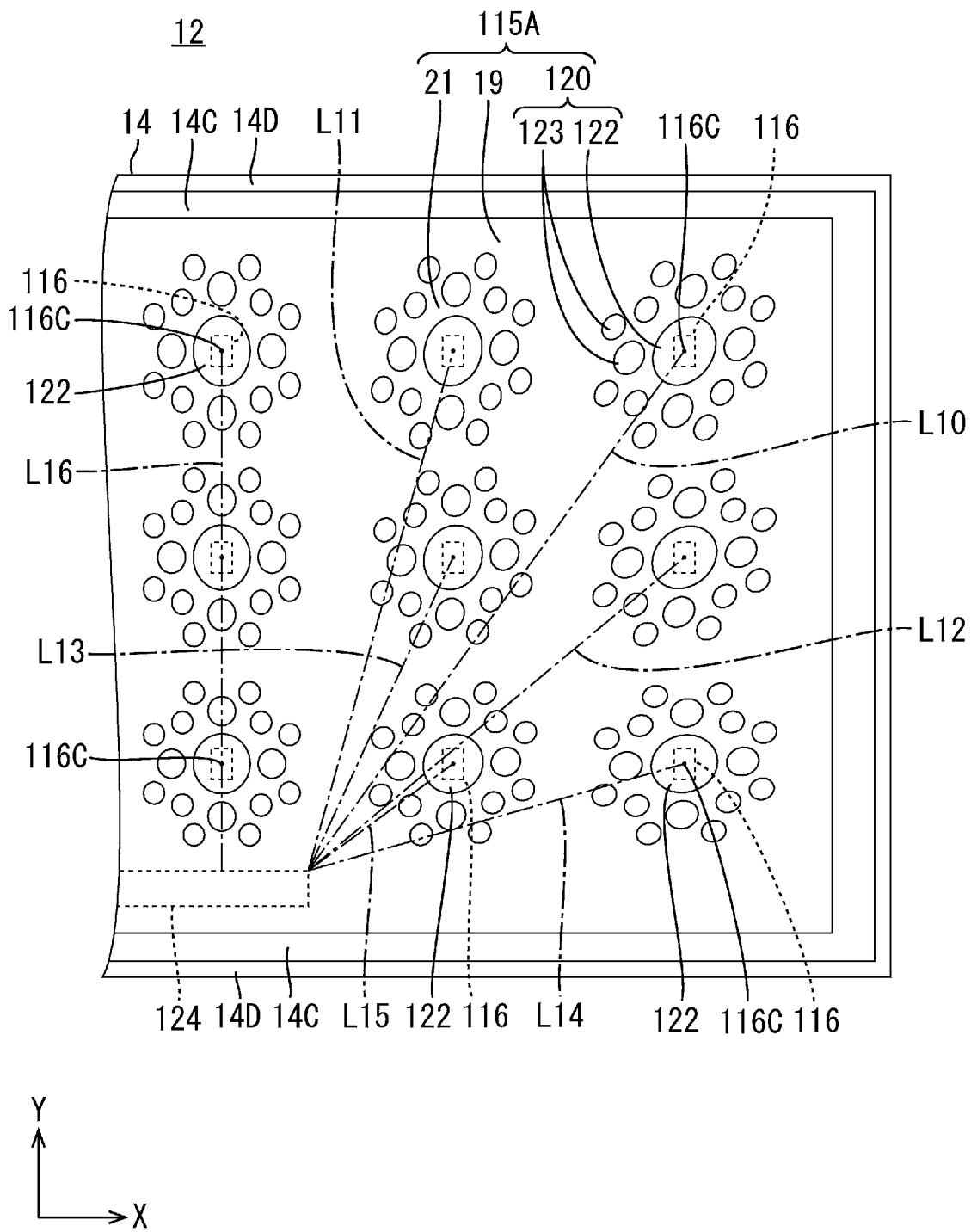
FIG. 14 is a plan view illustrating a positional relationship between a light reflection pattern and the LEDs at the second temperature according to the second embodiment.
Figure 15:
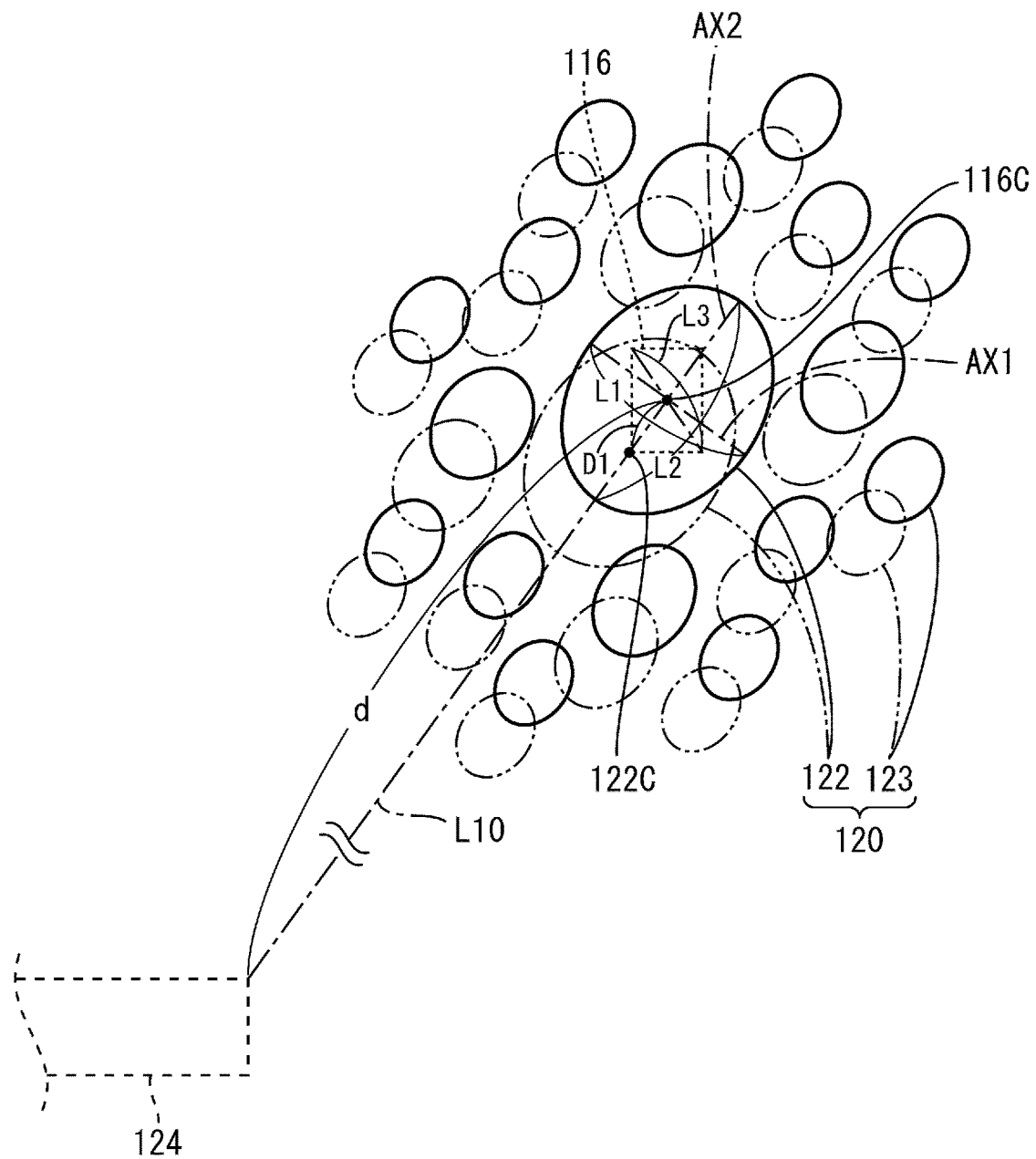
FIG. 15 is a plan view illustrating a positional relationship among a fixing portion, an LED farthest from the fixing portion, and a first light reflection portion overlapping the LED according to the second embodiment.

As illustrated in FIGS. 13 and 14, a planar shape of each dot included in a large number of dots constituting the light reflection pattern 120 according to the present embodiment is formed to have an elliptical shape. A first light reflection portion 122 constituting the light reflection pattern 120 has the largest major axis dimension, the largest minor axis dimension, and the largest area among the large number of dots constituting the light reflection pattern 120. A position where a minor axis AX1 and a major axis AX2 orthogonal to each other intersect in the first light reflection portion 122 forms a second center 122C. The first light reflection portion 122 is disposed such that the second center 122C overlaps the straight lines L10 to L16 connecting a position of a fixing portion 124 closest to LEDs 116 and a corresponding one of first centers 116C. The first light reflection portion 122 has an elongated planar shape including the major axis AX2 parallel to a corresponding one of the straight lines L10 to L16 described above, and is formed to have an elliptical shape. In the first light reflection portion 122, the second center 122C overlaps a corresponding one of the straight lines L10 to L16 connecting a position of the fixing portion 124 closest to the LEDs 116 and the first centers 116C of the LEDs 116. Second light reflection portions 123 each have a smaller major axis dimension, minor axis dimension, and area than the first light reflection portion 122.

According to such a configuration, even if the first light reflection portion 122 is displaced along a corresponding one of the straight lines L10 to L16 connecting the position of the fixing portion 124 closest to the LEDs 116 and the first centers 116C of the LEDs 116 due to thermal expansion of a light control sheet 115A, an area overlapping with the LEDs 116 is less likely to vary. Accordingly, the positional relationship of the first light reflection portions 122 with respect to the LEDs 116 can be maintained in an appropriate state. In the first light reflection portion 122, the second center 122C overlaps a corresponding one of the straight lines L10 to L16 described above, and thus, the minor axis AX1 orthogonal to the major axis AX2 is bisected by the straight lines L10 to L16. Accordingly, the positional relationship of the first light reflection portions 122 with respect to the LEDs 116 can be maintained in an appropriate state in a direction along the minor axis AX1 described above.

As illustrated in FIGS. 13 and 14, the plurality of first light reflection portions 122 having different distances from the fixing portion 124 have different planar shapes in accordance with the distance from the fixing portion 124. Specifically, the ratio of a length L2 of the major axis AX2 with respect to a length L1 of the minor axis AX1 of the plurality of first light reflection portions 122 increases as the distance from the fixing portion 124 increases. Here, the plurality of first light reflection portions 122 having different distances from the fixing portion 124 have different displacement amounts due to the thermal expansion of the light control sheet 115A, and the displacement amount tends to increase as the distance from the fixing portion 124 increases. The ratio of the length L2 of the major axis AX2 with respect to the length L1 of the minor axis AX1 is large in the first light reflection portion 122 having a greater distance from the fixing portion 124 as compared with the first light reflection portion 122 having a smaller distance from the fixing portion 124. Therefore, even if the displacement amount due to thermal expansion of the light control sheet 115A is large, it is easy to sufficiently secure an area overlapping the LEDs 116. Accordingly, the positional relationship of the first light reflection portions 122 with respect to the LEDs 116 can be maintained in an appropriate state.

The length L1 of the minor axis AX1 and the length L2 of the major axis AX2 of each of the first light reflection portions 122 can be generally described as follows. First, as illustrated in FIG. 15, the shortest distance from the fixing portion 124 to the first center 116C is defined as "d", the linear expansion coefficient of the light control sheet 115A is defined as "α", the difference between the second temperature and a third temperature higher than the second temperature is defined as "B", and the maximum length of a line segment passing through the first center 116C and intersecting the outer end of the LED 116 in a plan view is defined as "L3". In FIG. 15, the first light reflection portion 122 at the first temperature is indicated by a two-dot-dashed line, and the first light reflection portion 122 at the second temperature is indicated by a solid line. FIG. 15 illustrates the second center 122C of the first light reflection portion 122 at the first temperature. The second center 122C at the second temperature overlaps with the first center 116C. In the present embodiment, the third temperature that is higher than the second temperature is set to about an intermediate temperature between the second temperature (55° C.) described in the first embodiment and the assumed maximum temperature (80° C.). Specifically, the third temperature is set to 70° C. Accordingly, the difference B between the third temperature and the second temperature is 15° C. The planar shape of each of the LEDs 116 is rectangular, and thus, the maximum length L3 of the line segment described above coincides with the length of the diagonal line of the LEDs 116 in a plan view. A semi-minor axis of the minor axis AX1 is "L1/2", and a semi-major axis of the major axis AX2 is "L2/2". FIG. 15 illustrates the second center 122C of the first light reflection portion 122 at the first temperature. The second center 122C at the second temperature overlaps with the first center 116C. The first light reflection portion 122 is configured such that the length L1 of the minor axis AX1 and the length L2 of the major axis AX2 satisfy Expression (5) and Equation (6) below. According to Equation (6) below, the semi-major axis of the major axis AX2 is "L1/2+Bαd". That is, the semi-major axis of the major axis AX2 is obtained by adding "Bαd" to the semi-minor axis of the minor axis AX1. "Bαd" corresponds to the displacement amount of the first light reflection portion 122 accompanying the temperature increase from the second temperature to the third temperature. Similarly to the first embodiment, the distance D1 between the second center 122C of the first light reflection portion 122 and the first center 116C of the LED 116 at the first temperature is "Aαd", where "A" is the difference between the first temperature and the second temperature.

$$L1 > L3 \quad (5)$$

$$L2 = L1 + 2B\alpha d \quad (6)$$

The length L1 of the minor axis AX1 in the first light reflection portion 122 satisfies Expression (5) above and the length L2 of the major axis AX2 is greater than the length L1 of the minor axis AX1. Therefore, the first light reflection portion 122 may overlap the entire region of the LED 116 at least at the second temperature. Here, depending on conditions such as a drive state of the LED 116 accompanying local dimming control and the time elapsed after the power source is turned on, a state where the temperature environment of the light control sheet 115A exceeds the second temperature may continue, or a state where the temperature environment does not reach the second temperature may continue. For example, when the light control sheet 115A thermally expands as the temperature exceeds the second temperature and increases to the third temperature, the first light reflection portion 122 is displaced until the second center 122C reaches a position farther from the fixing portion 124 than the first center 116C of the LED 116. Even in this case, the length L2 of the major axis AX2 in the first light reflection portion 122 satisfies Equation (6) above, and has a size in which the displacement amount of the first light reflection portion 122 accompanying the temperature increase from the second temperature to the third temperature is taken into consideration. Therefore, even when the temperature increases and reaches the third temperature, the first light reflection portion 122 can overlap at least a part of the LED 116. In a case where the temperature environment does not reach the second temperature, even when the difference from the second temperature is equal to the difference B described above, the length L2 of the major axis AX2 of the first light reflection portion 122 satisfies Equation (6) above, so that the first light reflection portion 122 can overlap at least a part of the LED 116. Thus, the positional relationship of the first light reflection portion 122 with respect to the LED 116 can be maintained in an appropriate state.

As described above, according to the present embodiment, the first light reflection portion 122 has an elongated planar shape in which the second center 122C overlaps with a corresponding one of the straight lines L10 to L16 connecting the position of the fixing portion 124 closest to the LEDs 116 and the first centers 116C, and the planar shape includes the major axis AX2 that is parallel to the corresponding one of the straight lines L10 to L16. As the light control sheet 115A thermally expands, the first light reflection portion 122 is displaced along the corresponding one of the straight lines L10 to L16 connecting the position of the fixing portion 124 closest to the LEDs 116 and the first centers 116C of the LEDs 116. The first light reflection portion 122 has an elongated planar shape including the major axis AX2 parallel to the corresponding one of the straight lines L10 to L16, so that, even when the first light reflection portion 122 is displaced due to thermal expansion of the light control sheet 115A, an area overlapping with the LEDs 116 is less likely to vary. Accordingly, the positional relationship of the first light reflection portions 122 with respect to the LEDs 116 can be maintained in an appropriate state. In the first light reflection portion 122, the second center 122C overlaps the corresponding one of the straight lines L10 to L16 described above, and thus, the minor axis AX1 orthogonal to the major axis AX2 is bisected by the straight lines L10 to L16. Accordingly, the positional relationship of the first light reflection portions 122 with respect to the LEDs 116 can be maintained in an appropriate state in a direction along the minor axis AX1 described above.

A plurality of the LEDs 116 and a plurality of the first light reflection portions 122 are disposed side by side so as to have different distances from the fixing portion 124 in the plane of the main surface 19A. In the plurality of first light reflection portions 122, the ratio of the length L2 of the major axis AX2 with respect to the length L1 of the minor axis AX1 orthogonal to the major axis AX2 increases as the distance from the fixing portion 124 increases. The plurality of first light reflection portions 122 having different distances from the fixing portion 124 have different displacement amounts due to the thermal expansion of the light control sheet 115A, and the displacement amount tends to increase as the distance from the fixing portion 124 increases. The ratio of the length L2 of the major axis AX2 with respect to the length L1 of the minor axis AX1 is large in the first light reflection portion 122 having a greater distance from the fixing portion 124 as compared with the first light reflection portion 122 having a smaller distance from the fixing portion 124. Therefore, even if the displacement amount due to thermal expansion of the light control sheet 115A is large, it is easy to sufficiently secure an area overlapping the LEDs 116. Accordingly, the positional relationship of the first light reflection portions 122 with respect to the LEDs 116 can be maintained in an appropriate state.

In the first light reflection portion 122, the length L1 of the minor axis AX1 and the length L2 of the major axis AX2 satisfy Expression (5) and Equation (6) above, where "d" is the shortest distance from the fixing portion 124 to the first center 116C, "α" is the linear expansion coefficient of the light control sheet 115A, "B" is the difference between the second temperature and the third temperature that is higher than the second temperature, "L1" is the length of the minor axis AX1 orthogonal to the major axis AX2 in the first light reflection portion 122, "L2" is the length of the major axis AX2, and "L3" is the maximum length of the line segment passing through the first center 116C and intersecting the outer end of the LED 116 in a plan view.

First, the length L1 of the minor axis AX1 in the first light reflection portion 122 satisfies Expression (5) above, and thus, the first light reflection portion 122 may overlap the entire region of the LED 116 at least at the second temperature. When the light control sheet 115A thermally expands as the temperature increases to exceed the second temperature and reach the third temperature, the first light reflection portion 122 is displaced until the second center 122C reaches a position farther from the fixing portion 124 than the first center 116C of the LED 116. Also in this case, the length L2 of the major axis AX2 of the first light reflection portion 122 satisfies Equation (6) above, so that the first light reflection portion 122 can overlap at least a part of the LED 116. In a case where the temperature environment does not reach the second temperature, even when the difference from the second temperature is equal to the difference B described above, the length L2 of the major axis AX2 of the first light reflection portion 122 satisfies Equation (6) above, so that the first light reflection portion 122 can overlap at least a part of the LED 116. Thus, the positional relationship of the first light reflection portion 122 with respect to the LED 116 can be maintained in an appropriate state.

Third Embodiment

A third embodiment will be described with reference to FIGS. 16 to 18. In the third embodiment, a case where a configuration of a light reflection pattern 220 is changed from the configuration of the light reflection pattern in the second embodiment described above will be described. Further, repetitive descriptions of structures, actions, and effects similar to those of the second embodiment described above will be omitted.

Figure 16:
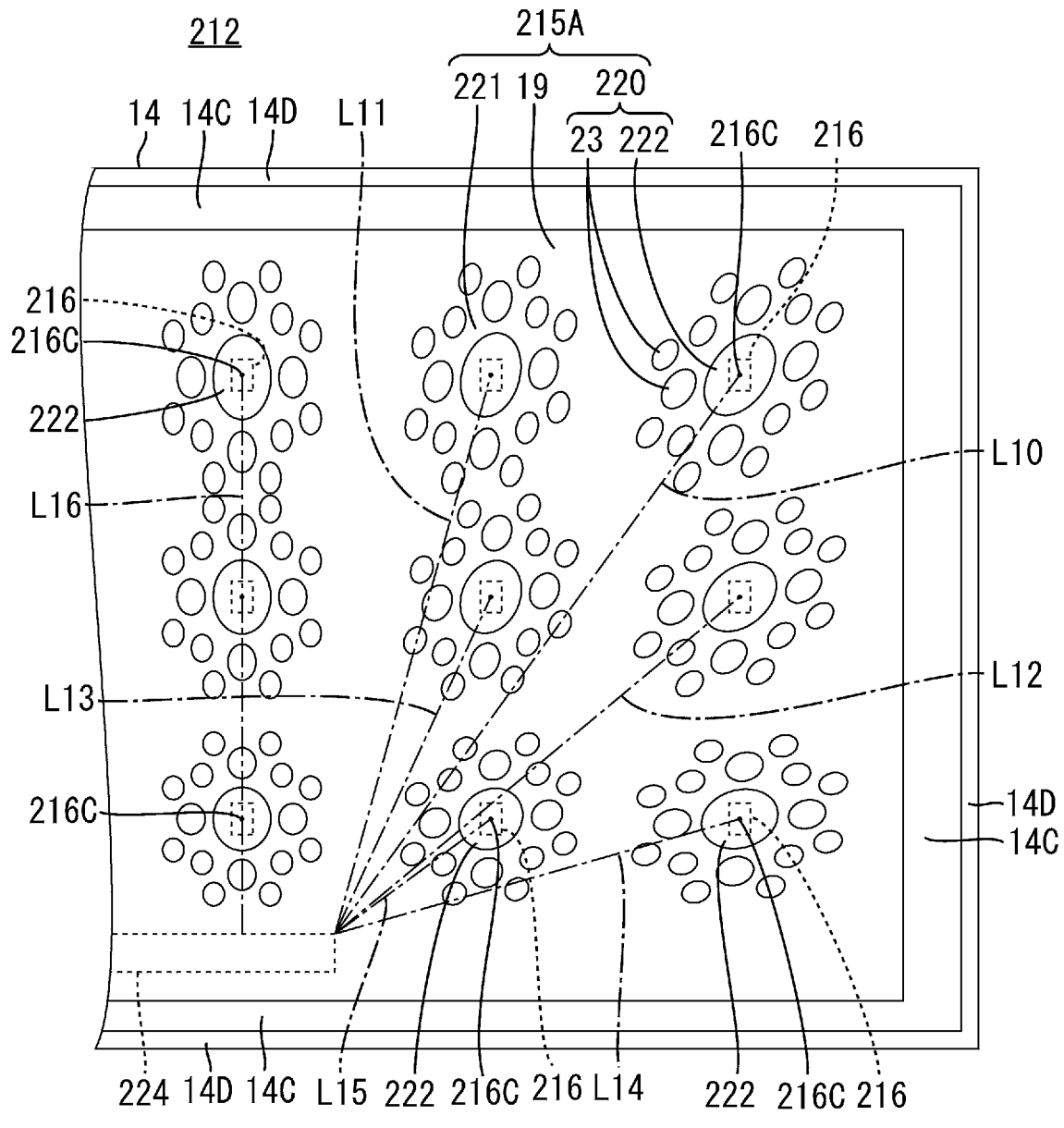
FIG. 16 is a plan view illustrating a positional relationship between a light reflection pattern and LEDs at the first temperature according to a third embodiment.
Figure 17:
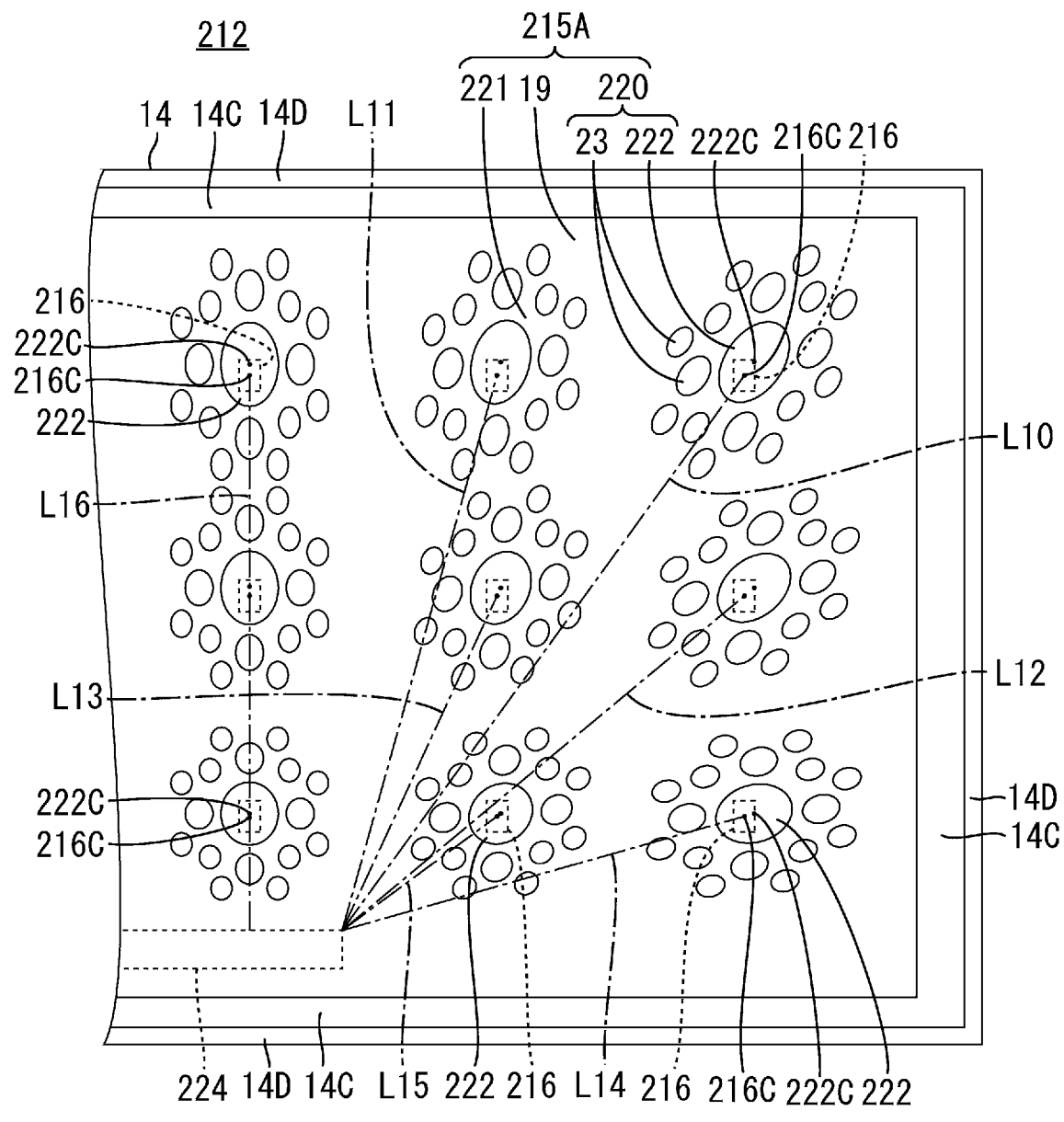
FIG. 17 is a plan view illustrating a positional relationship between the light reflection pattern and the LEDs at the second temperature according to the third embodiment.

As illustrated in FIGS. 16 and 17, first light reflection portions 222 included in the light reflection pattern 220 according to the present embodiment are disposed so as to overlap the straight lines L10 to L16 connecting first centers 216C and a position of a fixing portion 224 closest to LEDs 216. The first light reflection portions 222 each have an elongated planar shape including the major axis AX2 parallel to a corresponding one of the straight lines L10 to L16, and are formed to have an elliptical shape. Each of the first light reflection portions 222 is disposed such that a second center 222C overlaps a corresponding one of the straight lines L10 to L16.

With this configuration, when a light control sheet 215A thermally expands as the LEDs 216 are illuminated, the first light reflection portions 222 are displaced along the straight lines L10 to L16 connecting the position of the fixing portion 224 closest to the LEDs 216 and the first centers 216C of the LEDs 216. Each of the first light reflection portions 222 is disposed so as to overlap a corresponding one of the straight lines L10 to L16 and has an elongated planar shape including the major axis AX2 parallel to the corresponding one of the straight lines L10 to L16. Therefore, even when the first light reflection portion 222 is displaced due to thermal expansion of the light control sheet 215A, an area overlapping with the LEDs 216 is less likely to vary. Thus, even if the light control sheet 215A thermally expands as the temperature increases and the first light reflection portion 222 is displaced in a direction away from the fixing portion 224, the positional relationship of the first light reflection portion 222 with respect to the LEDs 216 can be maintained in an appropriate state. Therefore, the LEDs 216 are less likely to be directly visually recognized from the light emitting side, and thus, the occurrence of brightness unevenness can be suppressed. The first light reflection portion 222 is disposed such that the second center 222C overlaps a corresponding one of the straight lines L10 to L16, and thus, the minor axis AX1 of the first light reflection portion 222 is bisected by the corresponding one of the straight lines L10 to L16 described above. Accordingly, the positional relationship of the first light reflection portions 222 with respect to the LEDs 216 can be maintained in an appropriate state in a direction along the minor axis AX1 described above.

Figure 18:
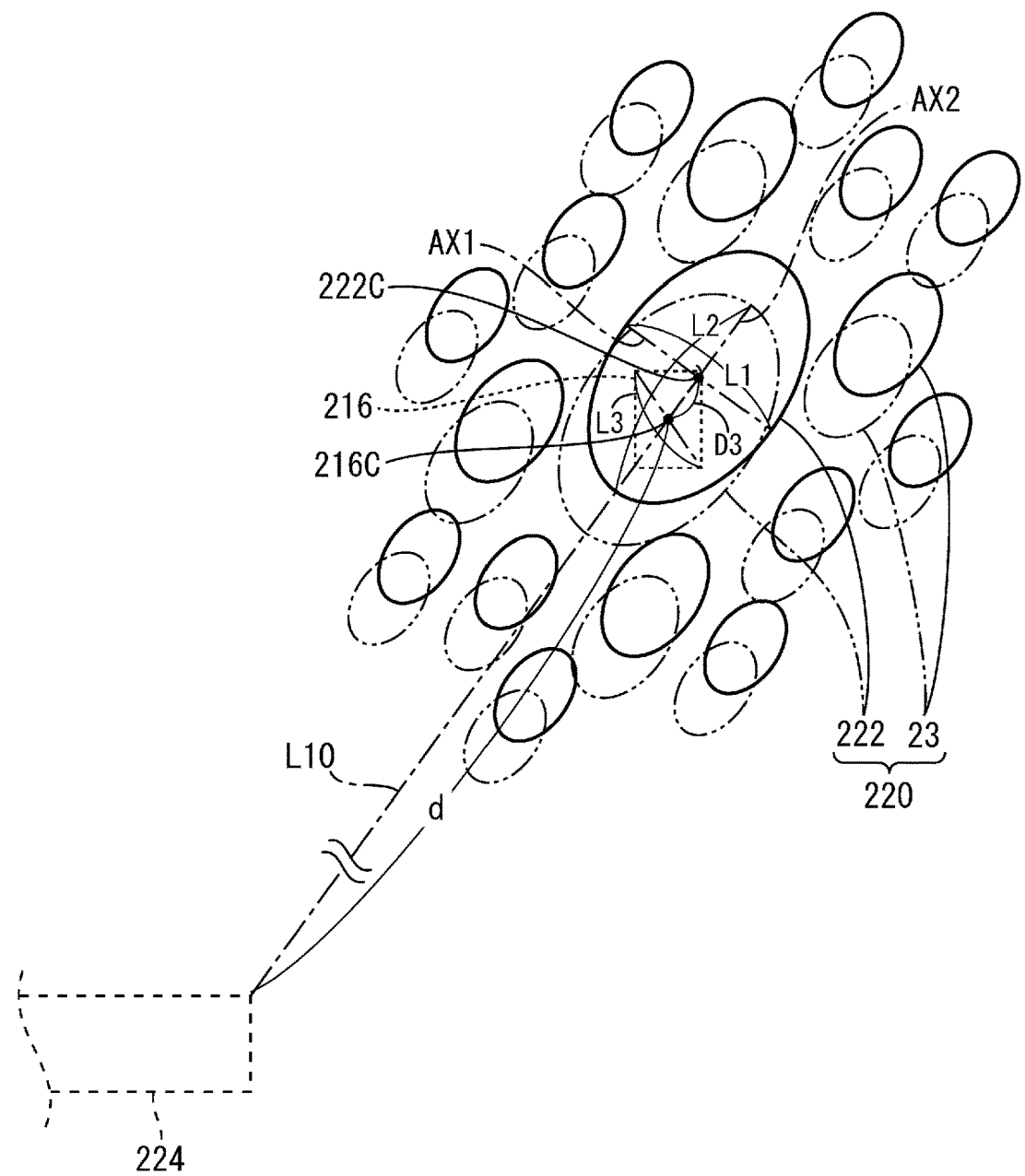
FIG. 18 is a plan view illustrating a positional relationship among a fixing portion, an LED farthest from the fixing portion, and a first light reflection portion overlapping the LED according to the third embodiment.

As illustrated in FIG. 18, in each of the first light reflection portions 222, the second center 222C coincides with the first center 216C at the first temperature, and the second center 222C is located farther from the fixing portion 224 than the first center 216C at the second temperature. In FIG. 18, the first light reflection portion 222 at the first temperature is indicated by a two-dot-dashed line, and the first light reflection portion 222 at the second temperature is indicated by a solid line. FIG. 18 illustrates the second center 222C of the first light reflection portion 222 at the first temperature. The second center 222C at the first temperature overlaps with the first center 216C. With this configuration, for example, when the temperature increases from the first temperature to the second temperature as the LEDs 216 are illuminated, the first light reflection portion 222 is displaced from a position where the second center 222C coincides with the first center 216C of a corresponding one of the LEDs 216 to a position farther from the fixing portion 224 than the first center 216C. The position of the second center 222C of the first light reflection portion 222 at the first temperature coincides with the first center 216C of a corresponding one of the LEDs 216, and thus, the positional relationship of the first light reflection portion 222 with respect to the LED 216 can be easily maintained in an appropriate state even in a low-temperature environment such as a state immediately after the power source is turned on, which is suitable for suppressing the occurrence of brightness unevenness.

The length L1 of the minor axis AX1 and the length L2 of the major axis AX2 of the first light reflection portions 222 can be generally described as follows. First, as illustrated in FIG. 18, the shortest distance from the fixing portion 224 to the first center 216C is defined as "d", the linear expansion coefficient of the light control sheet 215A is defined as "α", the difference between the first temperature and the second temperature is defined as "A", the length of the minor axis AX1 in the first light reflection portion 222 is defined as "L1", the length of the major axis AX2 is defined as "L2", and the maximum length of a line segment passing through the first center 216C and intersecting the outer end of the LED 216 in a plan view is defined as "L3". The planar shape of each of the LEDs 216 is rectangular, and thus, the maximum length L3 of the line segment described above coincides with the length of a diagonal line of the LED 216 in a plan view. A semi-minor axis of the minor axis AX1 is "L1/2", and a semi-major axis of the major axis AX2 is "L2/2". FIG. 18 illustrates the second center 222C of the first light reflection portion 222 at the second temperature. The second center 222C at the first temperature overlaps with the first center 216C. The first light reflection portion 222 is configured such that the length L1 of the minor axis AX1 and the length L2 of the major axis AX2 satisfy Expression (7) and Equation (8) below. According to Equation (8) below, the semi-major axis of the major axis AX2 is "L1/2+Aαd". That is, the semi-major axis of the major axis AX2 is obtained by adding "Aαd" to the semi-minor axis of the minor axis AX1. "Aαd" corresponds to the displacement amount of the first light reflection portion 222 accompanying the temperature increase from the first temperature to the second temperature. A distance D3 between the second center 222C of the first light reflection portion 222 and the first center 216C of the LED 216 at the second temperature is "Aαd".

$$L1 > L3 \qquad (7)$$

$$L2 = L1 + 2A\alpha d \qquad (8)$$

The length L1 of the minor axis AX1 in the first light reflection portion 222 satisfies Expression (7) above and the length L2 of the major axis AX2 is greater than the length L1 of the minor axis AX1. Therefore, the first light reflection portion 222 may overlap the entire region of the LED 216 at least at the first temperature. The length L2 of the major axis AX2 in the first light reflection portion 222 satisfies the Equation (8) above, so that the semi-major axis of the major axis AX2 is the sum of the semi-minor axis of the minor axis AX1 and the displacement amount of the first light reflection portion 222 accompanying the temperature increase from the first temperature to the second temperature. Therefore, as the temperature increases from the first temperature to the second temperature, even if the second center 222C of the first light reflection portion 222 is displaced from a position coinciding with the first center 216C to a position farther from the fixing portion 224, the first light reflection portion 222 can overlap the entire region of the LED 216 at the second temperature. Accordingly, while the temperature environment changes from the first temperature to the second temperature, the first light reflection portion 222 can continuously overlap the entire region of the LED 216, and the LED 216 is less likely to be directly visually recognized from the light emitting side.

As described above, a backlight device 212 of the present embodiment includes the LEDs 216 each having the light-emitting face 16A (see FIG. 1), the light control sheet 215A having the main surface 19A (see FIG. 1) facing the light-emitting face 16A of each of the LEDs 216, and the fixing portion 224 fixed to a part of the light control sheet 215A. The light control sheet 215A includes the first light reflection portion 222 that reflects light and of which at least a part overlaps the LED 216, and a light transmitting portion 221 that transmits light and is disposed so as not to overlap with the first light reflection portion 222. In the LED 216, a center viewed in a plan view is defined as the first center 216C. In the first light reflection portion 222, a center viewed in a plan view is defined as the second center 222C. The first light reflection portion 222 is disposed so as to overlap with a corresponding one of the straight lines L10 to L16 connecting the position of the fixing portion 224 closest to the LEDs 216 and the first centers 216C, and has an elongated planar shape including the major axis AX2 that is parallel to the corresponding one of the straight lines L10 to L16.

The light emitted from the light-emitting face 16A of the LED 216 is reflected by the first light reflection portion 222 of the light control sheet 215A, but is transmitted through the light transmitting portion 221 and emitted. By disposing the first light reflection portion 222 so that at least a part of the first light reflection portion 222 overlaps the LED 216, most of the light from the light-emitting face 16A can be reflected, and the LED 216 is less likely to be directly visually recognized from the light emitting side. By disposing the light transmitting portion 221 so as not to overlap the LED 216, the emission of light is promoted. Thus, the distribution of the emission light amount is controlled by the first light reflection portion 222 and the light transmitting portion 221.

When the LEDs 216 are illuminated, the temperature increases due to the heat generated from the LEDs 216. At this time, the light control sheet 215A thermally expands and extends from a site fixed by the fixing portion 224 as a starting point, and accordingly, the first light reflection portion 222 is also displaced in a direction away from the fixing portion 224. Here, the first light reflection portion 222 is displaced along a corresponding one of the straight lines L10 to L16 connecting the position of the fixing portion 224 closest to the LEDs 216 and the first centers 216C of the LEDs 216. Each of the first light reflection portions 222 is disposed so as to overlap a corresponding one of the straight lines L10 to L16 and has an elongated planar shape including the major axis AX2 parallel to the corresponding one of the straight lines L10 to L16. Therefore, even when the first light reflection portion 222 is displaced due to thermal expansion of the light control sheet 215A, an area overlapping with the LEDs 216 is less likely to vary. Thus, even if the light control sheet 215A thermally expands as the temperature increases and the first light reflection portion 222 is displaced in a direction away from the fixing portion 224, the positional relationship of the first light reflection portion 222 with respect to the LEDs 216 can be maintained in an appropriate state. Therefore, the LEDs 216 are less likely to be directly visually recognized from the light emitting side, and thus, the occurrence of brightness unevenness can be suppressed.

The first light reflection portion 222 is disposed such that the second center 222C overlaps a corresponding one of the straight lines L10 to L16. According to such a configuration, in the first light reflection portion 222, the minor axis AX1 orthogonal to the major axis AX2 is bisected by the corresponding one of the straight lines L10 to L16 described above. Accordingly, the positional relationship of the first light reflection portions 222 with respect to the LEDs 216 can be maintained in an appropriate state in a direction along the minor axis AX1 described above.

In the first light reflection portion 222, the length L1 of the minor axis AX1 and the length L2 of the major axis AX2 satisfy Expression (7) and Equation (8) above, where "d" is the shortest distance from the fixing portion 224 to the first center 216C, "α" is the linear expansion coefficient of the light control sheet 215A, "A" is the difference between the first temperature and the second temperature, "L1" is the length of the minor axis AX1 orthogonal to the major axis AX2 in the first light reflection portion 222, "L2" is the length of the major axis AX2, and "L3" is the maximum length of the line segment passing through the first center 216C and intersecting the outer end of the LED 216 in a plan view.

First, the length L1 of the minor axis AX1 in the first light reflection portion 222 satisfies Expression (7) above, and thus, the first light reflection portion 222 can overlap the entire region of the LED 216 at least at the first temperature. The displacement amount of the first light reflection portion 222 when the light control sheet 215A thermally expands as the temperature increases from the first temperature to the second temperature is "A$\alpha$d", which is obtained by multiplying the shortest distance d from the fixing portion 224 to the first center 216C, the linear expansion coefficient $\alpha$ of the light control sheet 215A, and the difference A between the first temperature and the second temperature. Therefore, the length L2 of the major axis AX2 in the first light reflection portion 222 satisfies Equation (8) above, and thus, the first light reflection portion 222 can overlap the entire region of the LED 216 at the second temperature. Accordingly, while the temperature environment changes from the first temperature to the second temperature, the first light reflection portion 222 can continuously overlap the entire region of the LED 216, and the LED 216 is less likely to be directly visually recognized from the light emitting side.

Furthermore, in the first light reflection portion 222, the second center 222C coincides with the first center 216C at the first temperature, and the second center 222C is located farther from the fixing portion 224 than the first center 216C at the second temperature that is higher than the first temperature. For example, when the temperature increases from the first temperature to the second temperature as the LEDs 216 are illuminated, the first light reflection portion 222 is displaced from a position where the second center 222C coincides with the first center 216C of a corresponding one of the LED 216 to a position farther from the fixing portion 224 than the first center 216C. The position of the second center 222C of the first light reflection portion 222 at the first temperature coincides with the first center 216C of a corresponding one of the LEDs 216, and thus, the positional relationship of the first light reflection portion 222 with respect to the LED 216 can be easily maintained in an appropriate state even in a low-temperature environment such as a state immediately after the power source is turned on, which is suitable for suppressing the occurrence of brightness unevenness.

Fourth Embodiment

A fourth embodiment will be described with reference to FIG. 19 or FIG. 20. The fourth embodiment describes a case where a fixing portion 324 is changed from the fixing portion in the first embodiment described above. Further, repetitive descriptions of structures, actions, and effects similar to those of the first embodiment described above will be omitted.

Figure 19:
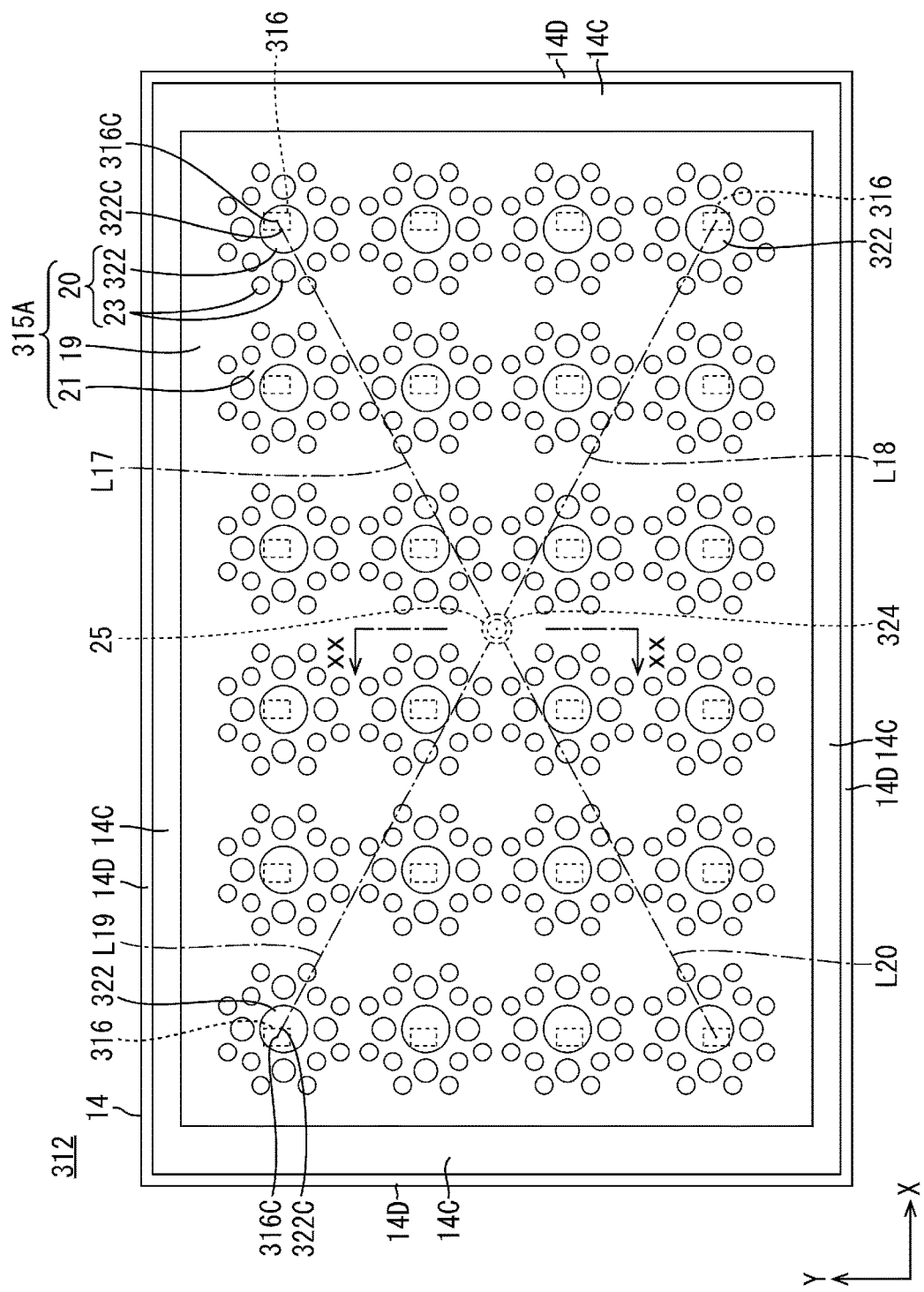
FIG. 19 is a plan view illustrating a chassis, a light control sheet, LEDs, a first support member, and the like constituting a backlight device at the first temperature according to a fourth embodiment.
Figure 20:
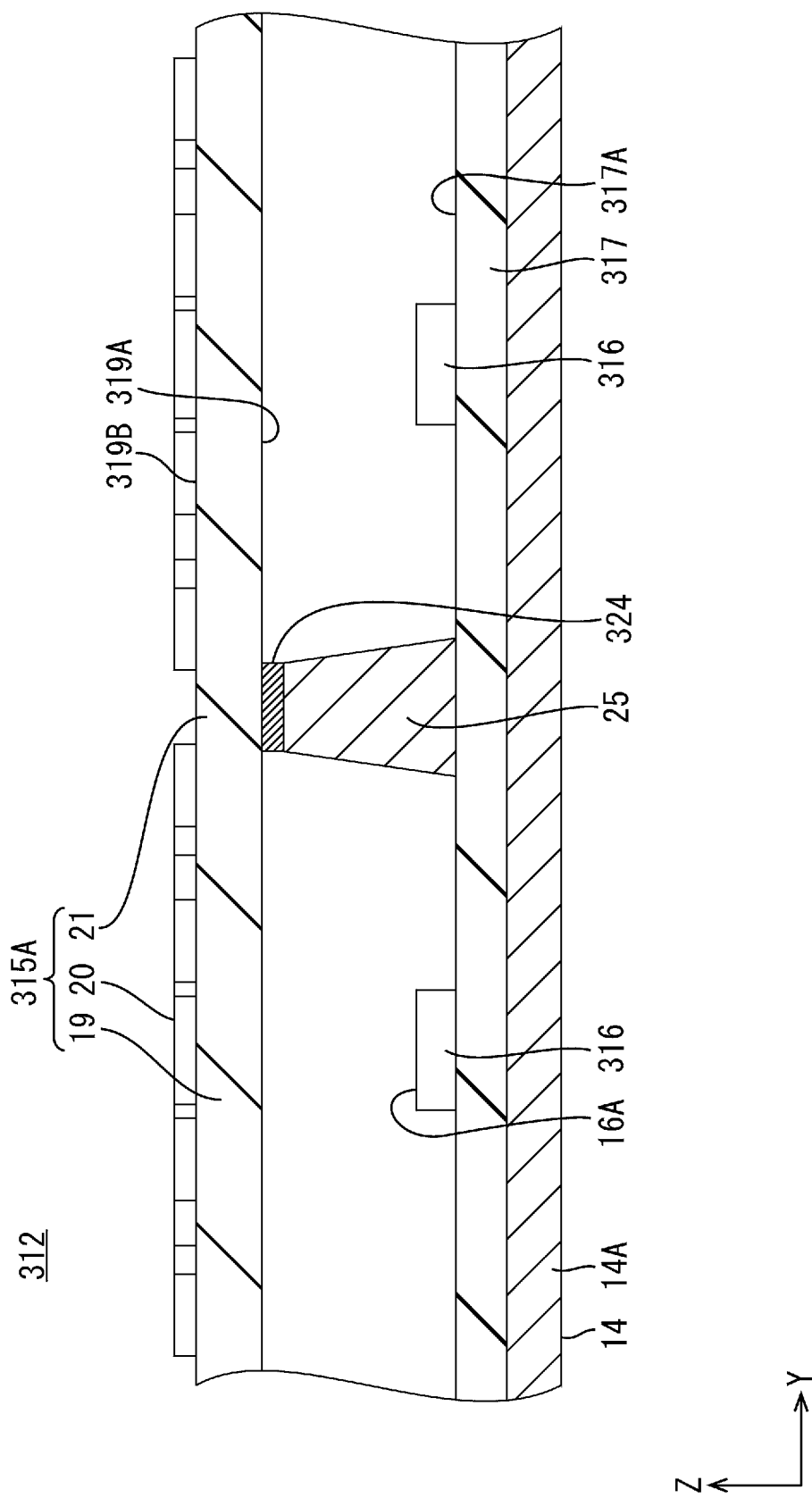
FIG. 20 is a cross-sectional view taken along line xx-xx in FIG. 19, illustrating the chassis, the light control sheet, the LEDs, an LED substrate, the first support member, and the like according to the fourth embodiment.

As illustrated in FIGS. 19 and 20, a backlight device 312 according to the present embodiment includes a first support member 25 that supports a light control sheet 315A from the back side. The first support member 25 is interposed between an LED substrate 317 and the light control sheet 315A, and has a columnar shape rising from a mounting surface 317A of the LED substrate 317 toward the front side. The fixing portion 324 is attached to a tip surface of the first support member 25. The fixing portion 324 attached to the tip surface of the first support member 25 is fixed to the light control sheet 315A. The first support member 25 and the fixing portion 324 are disposed at substantially central positions of a chassis 314 and the light control sheet 315A in the X-axis direction and the Y-axis direction.

The light control sheet 315A is supported by the first support member 25 at a substantially central portion in the X-axis direction and the Y-axis direction, and thus, the light control sheet 315A is less likely to deform such as in a deflection to the back side, and the flatness of each of main surfaces 319A and 319B is ensured. The light control sheet 315A is fixed by the fixing portion 324 at a substantially central portion in the X-axis direction and the Y-axis direction, so that the light control sheet 315A expands and contracts with the above-described substantially central portion as a starting point in accordance with a change in the temperature environment. That is, when the light control sheet 315A thermally expands or thermally contracts, an outer circumferential end portion is displaced in a radial direction around the substantially central portion. The fixing portion 324 is arranged as described above, so that straight lines L17 to L20 connecting the position of the fixing portion 324 closest to LEDs 316 and first centers 316C of the LEDs 316 form a radial shape passing through the center of the fixing portion 324 in a plan view. Note that, in FIG. 19, the straight lines L17 to L20 are illustrated by using representatively the four LEDs 316 farthest from the fixing portion 324 among the plurality of LEDs 316. However, straight lines related to the other LEDs 316 also form a radial shape passing through the center of the fixing portion 324 in a plan view.

At the first temperature, as illustrated in FIG. 19, each of a plurality of first light reflection portions 322 is located on the inner side of the first centers 316C of the plurality of LEDs 316 in the radial direction with the substantially central portion of the light control sheet 315A as a center. When the temperature increases from the first temperature to the second temperature and the light control sheet 315A thermally expands, the plurality of first light reflection portions 322 are displaced outward in the radial direction with the substantially central portion of the light control sheet 315A as the center, and each of second centers 322C coincides with a corresponding one of the first centers 316C of the plurality of LEDs 316. At this time, the second centers 322C move on the straight lines L17 to L20 described above.

According to the present embodiment, the maximum value related to the shortest distance d from the fixing portion 324 to the first centers 316C of the LEDs 316 can be reduced as compared with the first to third embodiments. Accordingly, it is possible to reduce the displacement amount A$\alpha$d of each of the first light reflection portions 322 due to the thermal expansion of the light control sheet 315A. Therefore, when the light control sheet 315A thermally expands, it is possible to reduce a variation range of an overlapping area of the first light reflection portion 322 with respect to a corresponding one of the LEDs 316, which is suitable for reducing brightness unevenness. Furthermore, the displacement amount of the outer circumferential end portion due to the thermal expansion of the light control sheet 315A is also reduced. Therefore, at the first temperature, the distance between the outer circumferential end portion of the light control sheet 315A and a second side portion 314D opposing the outer circumferential end portion can be set to a small value, which is suitable for achieving a narrow frame.

Fifth Embodiment

A fifth embodiment will be described with reference to FIGS. 21 to 23. The fifth embodiment describes a case where a second support member 26 is used instead of the first support member 25 in the fourth embodiment described above. Furthermore, repetitive descriptions of structures, actions, and effects similar to those of the fourth embodiment described above will be omitted.

Figure 21:
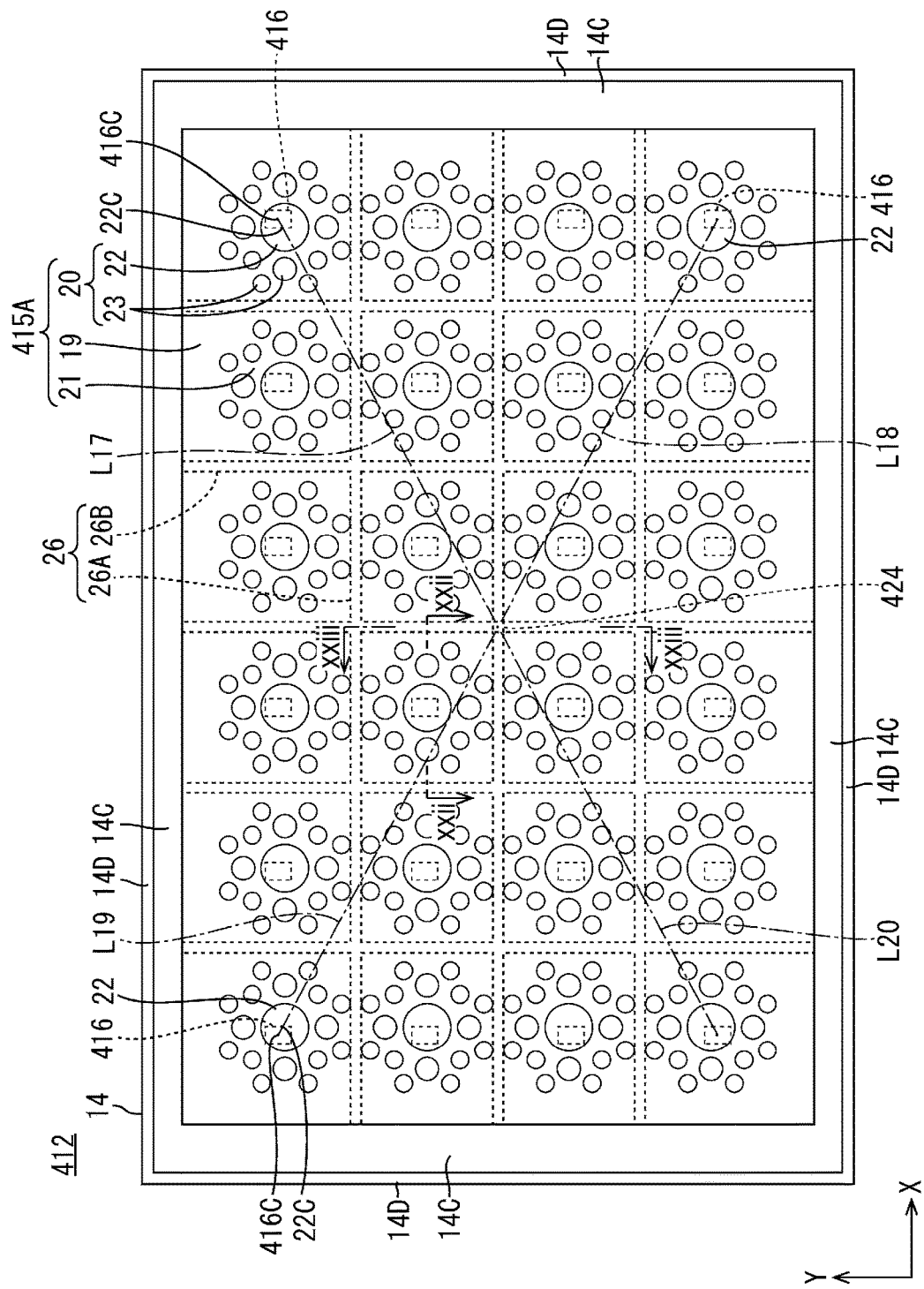
FIG. 21 is a plan view illustrating a chassis, a light control sheet, LEDs, a second support member, and the like constituting a backlight device at the first temperature according to a fifth embodiment.
Figure 22:
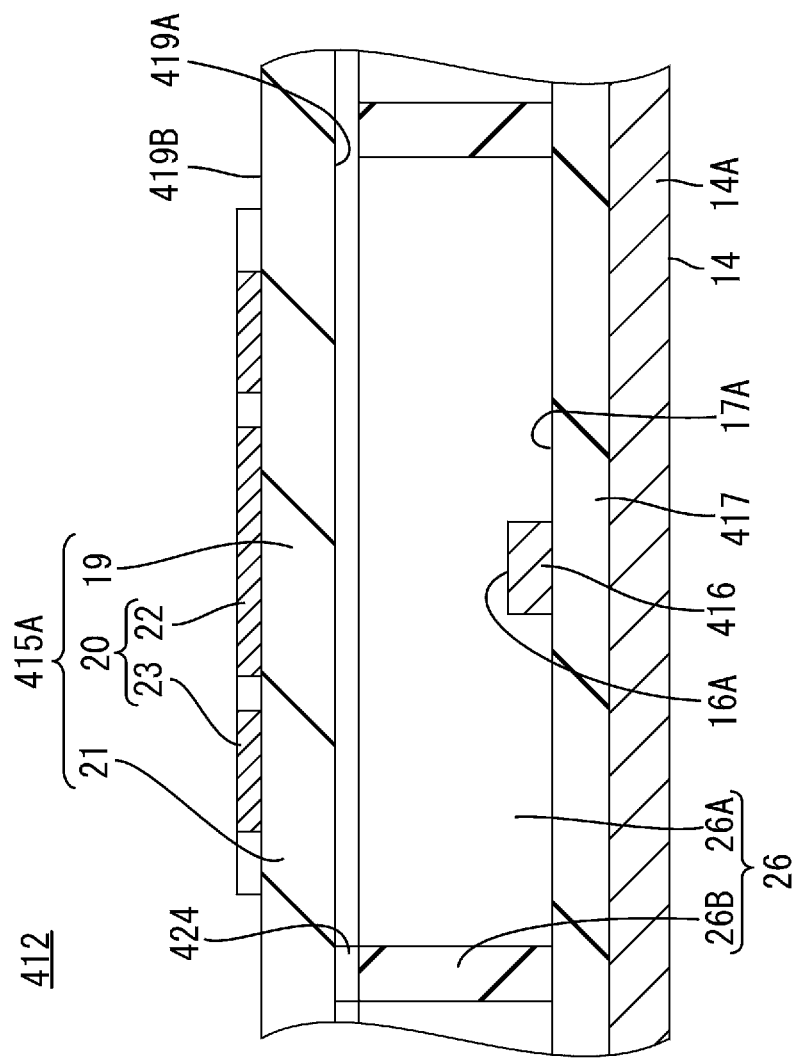
FIG. 22 is a cross-sectional view taken along line xxii-xxii in FIG. 21, illustrating the chassis, the light control sheet, one of the LEDs, an LED substrate, the second support member, and the like according to the fifth embodiment.

As illustrated in FIGS. 21 and 22, a backlight device 412 according to the present embodiment includes the second support member 26 that supports a light control sheet 415A from the back side. The second support member 26 is interposed between an LED substrate 417 and the light control sheet 415A, and has a lattice pattern in a plan view. The second support member 26 includes a plurality of first wall portions 26A extending along the X-axis direction and a plurality of second wall portions 26B extending along the Y-axis direction. Each of LEDs 416 is surrounded by two of the first wall portions 26A and two of the second wall portions 26B. The plurality of LEDs 416 are partitioned by the second support member 26. The light control sheet 415A is supported from the back side by the second support member 26 having a lattice pattern in a plan view, and thus, the light control sheet 415A is even more unlikely than in the fourth embodiment to deform such as in a deflection to the back side, and the flatness of each of main surfaces 419A and 419B is ensured.

Figure 23:
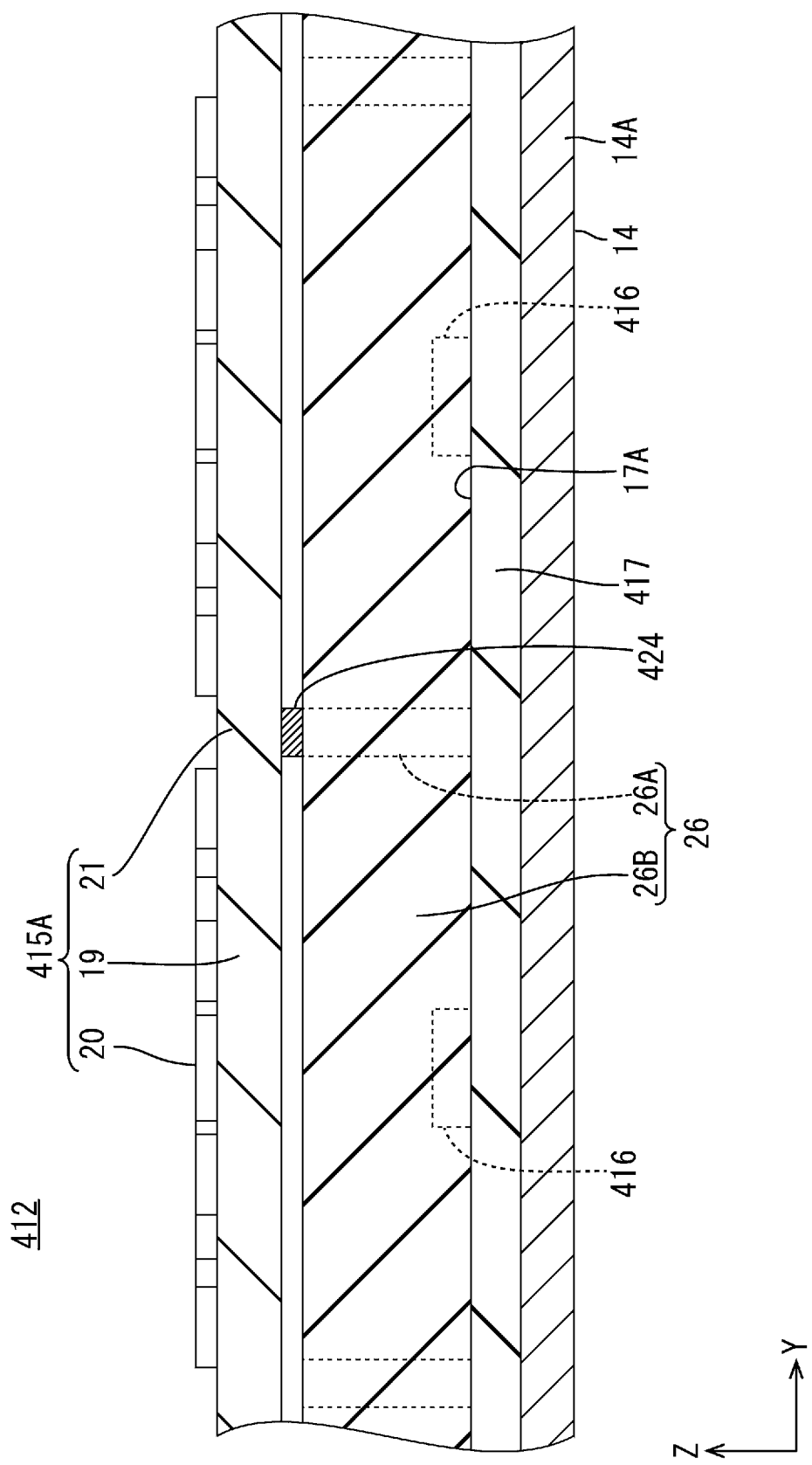
FIG. 23 is a cross-sectional view taken along line xxiii-xxiii in FIG. 21, illustrating the chassis, the light control sheet, the LEDs, the LED substrate, the second support member, and the like according to the fifth embodiment.

As illustrated in FIGS. 21 and 23, a fixing portion 424 is attached to the front end face of the second support member 26 at a substantially central position in a plan view. The fixing portion 424 is fixed to a substantially central position of the light control sheet 415A in the X-axis direction and the Y-axis direction. Thus, similarly to the fourth embodiment, the light control sheet 315A expands and contracts with the substantially central portion fixed by the fixing portion 424 as a starting point in accordance with a change in the temperature environment. The straight lines L17 to L20 connecting the position of the fixing portion 424 closest to the LEDs 416 and first centers 416C of the LEDs 416 form a radial shape passing through the center of the fixing portion 424 in a plan view. Note that, in FIG. 23, the straight lines L17 to L20 are illustrated by using representatively the four LEDs 416 farthest from the fixing portion 424 among the plurality of LEDs 416. However, straight lines related to the other LEDs 416 also form a radial shape passing through the center of the fixing portion 424 in a plan view. According to the above-described configuration, actions and effects similar to those of the fourth embodiment can be achieved.

Sixth Embodiment

A sixth embodiment will be described with reference to FIG. 24. The sixth embodiment describes a case where configurations of a light control sheet 515A and an LED substrate 517 are changed from the configurations of the light control sheet and the LED substrate in the first embodiment described above. Further, repetitive descriptions of structures, actions, and effects similar to those of the first embodiment described above will be omitted.

Figure 24:
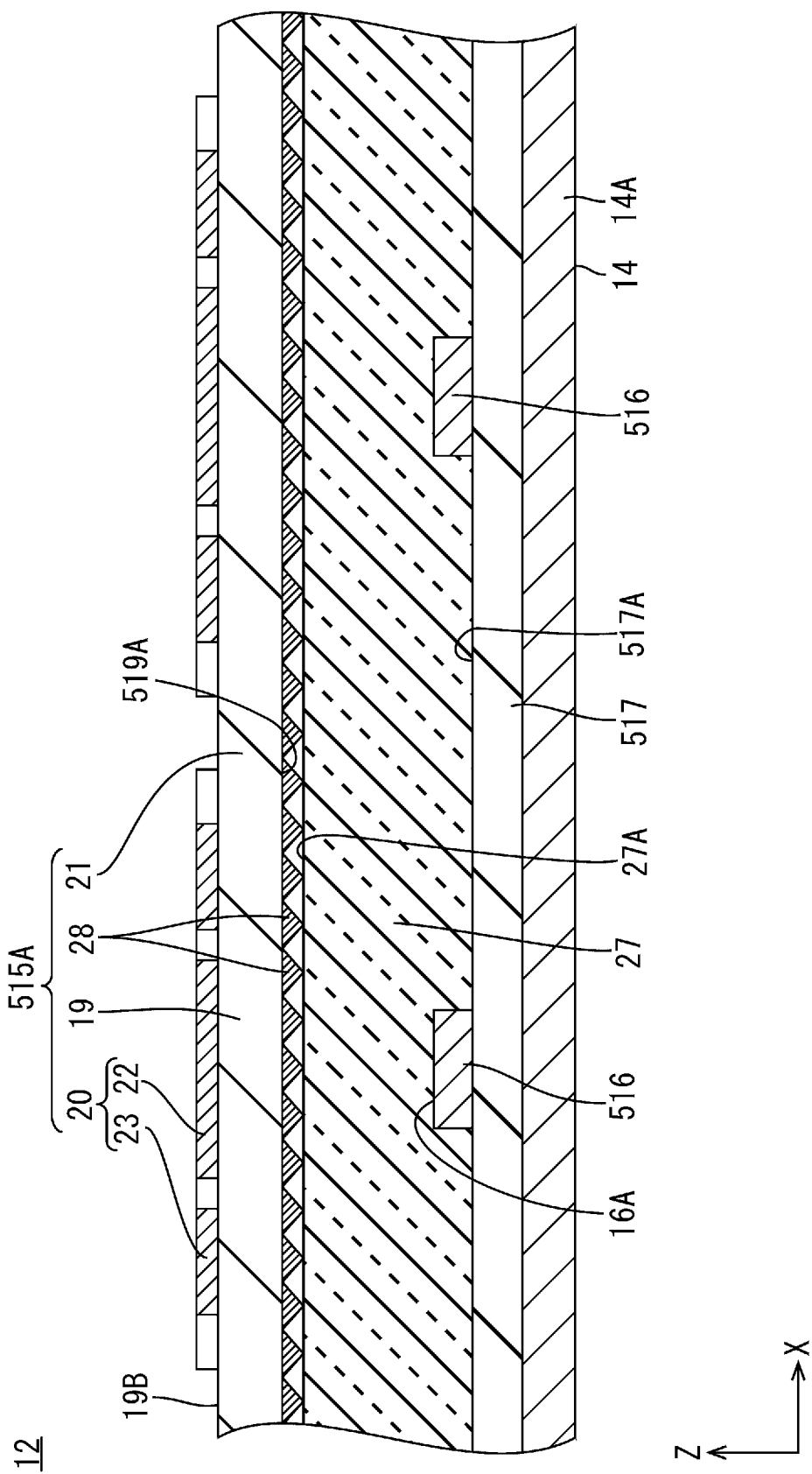
FIG. 24 is a cross-sectional view illustrating a chassis, a light control sheet, LEDs, an LED substrate, and the like constituting a backlight device according to a sixth embodiment.

As illustrated in FIG. 24, a protection layer (a second optical member) 27 is provided on the LED substrate 517 according to the present embodiment. The protection layer 27 is formed of a transparent synthetic resin material or the like, and is provided on a mounting surface 517A so as to cover all LEDs 516 from the front side. The protection layer 27 can protect the LEDs 516. The protection layer 27 is provided by mold-forming a silicone resin on the LED substrate, for example. In addition, the protection layer 27 is provided by bonding a transparent film formed of a synthetic resin such as PET to the mounting surface 517A of the LED substrate 517 using an optical clear adhesive (OCA). The protection layer 27 is interposed between the LEDs 516 and the light control sheet 515A, and a main surface (second main surface) 27A on the front side faces a main surface 519A on the back side of the light control sheet 515A. A plurality of the small protruding portions 28 are provided on the main surface 519A on the back side of the light control sheet 515A. The protruding portions 28 are formed of a transparent synthetic resin material or the like, and a plurality of the protruding portions 28 are disposed side by side along the X-axis direction and the Y-axis direction in the plane of the main surface 519A. The protruding portions 28 are in point contact with the main surface 27A on the front side of the protection layer 27. The protruding height of the protruding portions 28 from the main surface 519A is, for example, 100 μm or less, and the outer width of the protruding portions 28 is, for example, 200 μm or less. A contact area between the light control sheet 515A and the protection layer 27 is reduced by the plurality of protruding portions 28, and thus, the light control sheet 515A becomes difficult to be brought into close contact with the protection layer 27. Therefore, when the light control sheet 515A thermally expands, the light control sheet 515A is easily displaced with respect to the protection layer 27, so that deformation such as deflection hardly occurs in the light control sheet 515A.

As described above, according to the present embodiment, the protection layer (second optical member) 27 is interposed between the LEDs 516 and the light control sheet 515A and includes the main surface (second main surface) 27A facing the main surface 519A of the light control sheet 515A, and the plurality of protruding portions 28 are provided on at least one of the main surface 519A and the main surface 27A. The contact area between the light control sheet 515A and the protection layer 27 is reduced by the plurality of protruding portions 28, and thus, the light control sheet 515A becomes difficult to be brought into close contact with the protection layer 27. Therefore, when the light control sheet 515A thermally expands, the light control sheet 515A is easily displaced with respect to the protection layer 27, so that deformation such as deflection hardly occurs in the light control sheet 515A.

Seventh Embodiment

A seventh embodiment will be described with reference to FIG. 25. The seventh embodiment describes a case where the protruding portions 628 are changed from the protruding portions in the sixth embodiment described above. Furthermore, repetitive descriptions of structures, actions, and effects similar to those of the sixth embodiment described above will be omitted.

Figure 25:
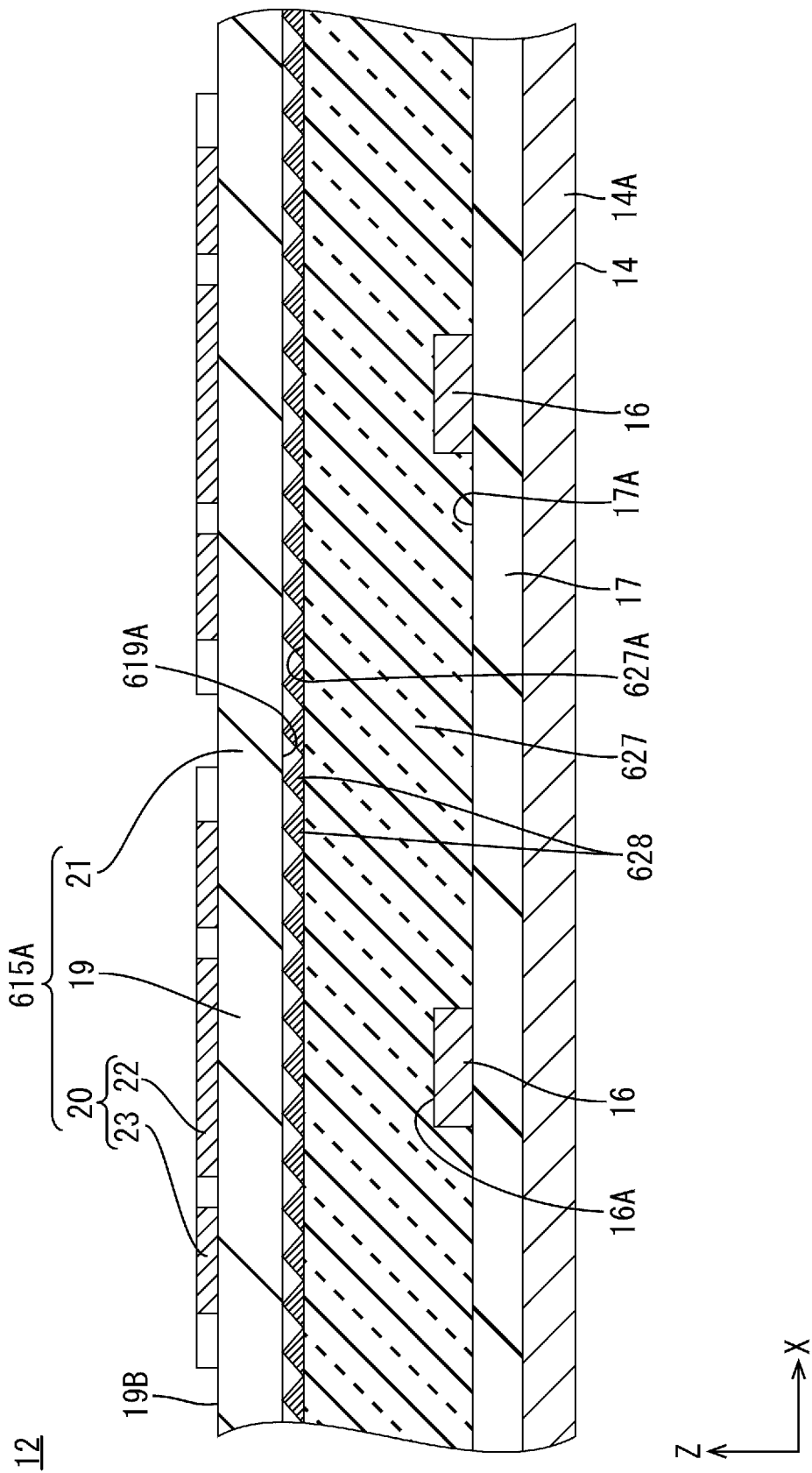
FIG. 25 is a cross-sectional view illustrating a chassis, a light control sheet, LEDs, an LED substrate, and the like constituting a backlight device according to a seventh embodiment.

As illustrated in FIG. 25, the protruding portions 628 according to the present embodiment are provided on a main surface 627A on the front side of a protection layer 627. A plurality of the protruding portions 628 are disposed side by side along the X-axis direction and the Y-axis direction in the plane of the main surface 627A. The protruding portions 628 are in point contact with a main surface 619A on the back side of a light control sheet 615A. Even with such a configuration, actions and effects similar to those in the above-described sixth embodiment can be obtained.

Eighth Embodiment

An eighth embodiment will be described with reference to FIG. 26. The eighth embodiment describes a case where spacers 29 are provided instead of the protruding portions 28 in the sixth embodiment described above. Furthermore, repetitive descriptions of structures, actions, and effects similar to those of the sixth embodiment described above will be omitted.

Figure 26:
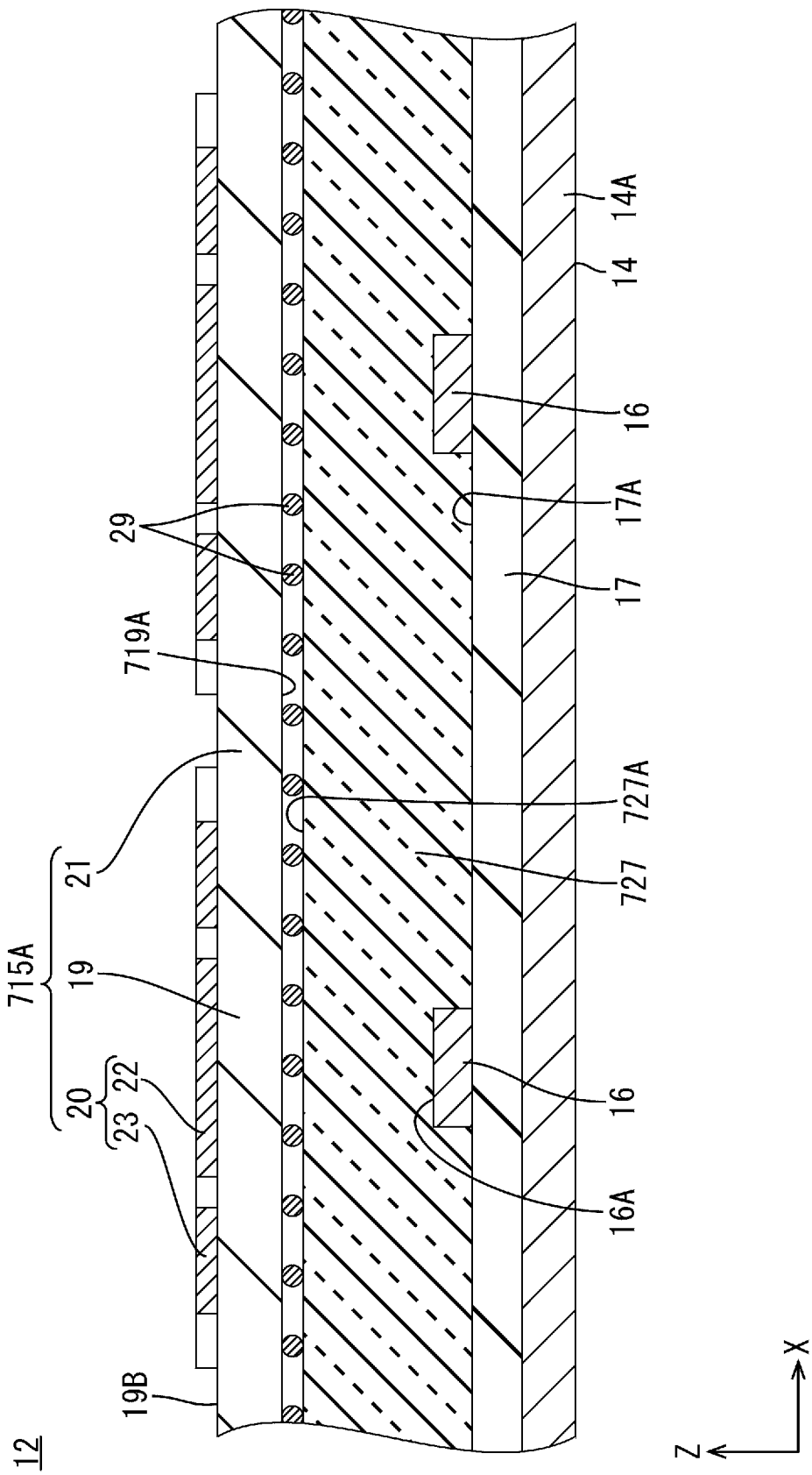
FIG. 26 is a cross-sectional view illustrating a chassis, a light control sheet, LEDs, an LED substrate, and the like constituting a backlight device according to an eighth embodiment.

As illustrated in FIG. 26, the spacers 29 are interposed between a main surface 719A on the back side of a light control sheet 715A according to the present embodiment and a main surface 727A on the front side of a protection layer 727. The spacers 29 are formed of a transparent synthetic resin material or the like, and a plurality of the spacers 29 are disposed side by side along the X-axis direction and the Y-axis direction in the planes of the main surfaces 719A and 727A. The spacers 29 are in point contact with each of the main surfaces 719A and 727A. The spacers 29 each have a diameter of 100 μm or less, for example. A contact area between the light control sheet 715A and the protection layer 727 is reduced by the plurality of spacers 29, and thus, the light control sheet 715A becomes difficult to be brought into close contact with the protection layer 727. Therefore, when the light control sheet 715A thermally expands, the light control sheet 715A is easily displaced with respect to the protection layer 727, so that deformation such as deflection hardly occurs in the light control sheet 715A.

Ninth Embodiment

A ninth embodiment will be described with reference to FIG. 27 or FIG. 28. In the ninth embodiment, a temperature sensor 46 is provided instead of the timer 45 in the first embodiment described above. Further, repetitive descriptions of structures, actions, and effects similar to those of the first embodiment described above will be omitted.

Figure 27:
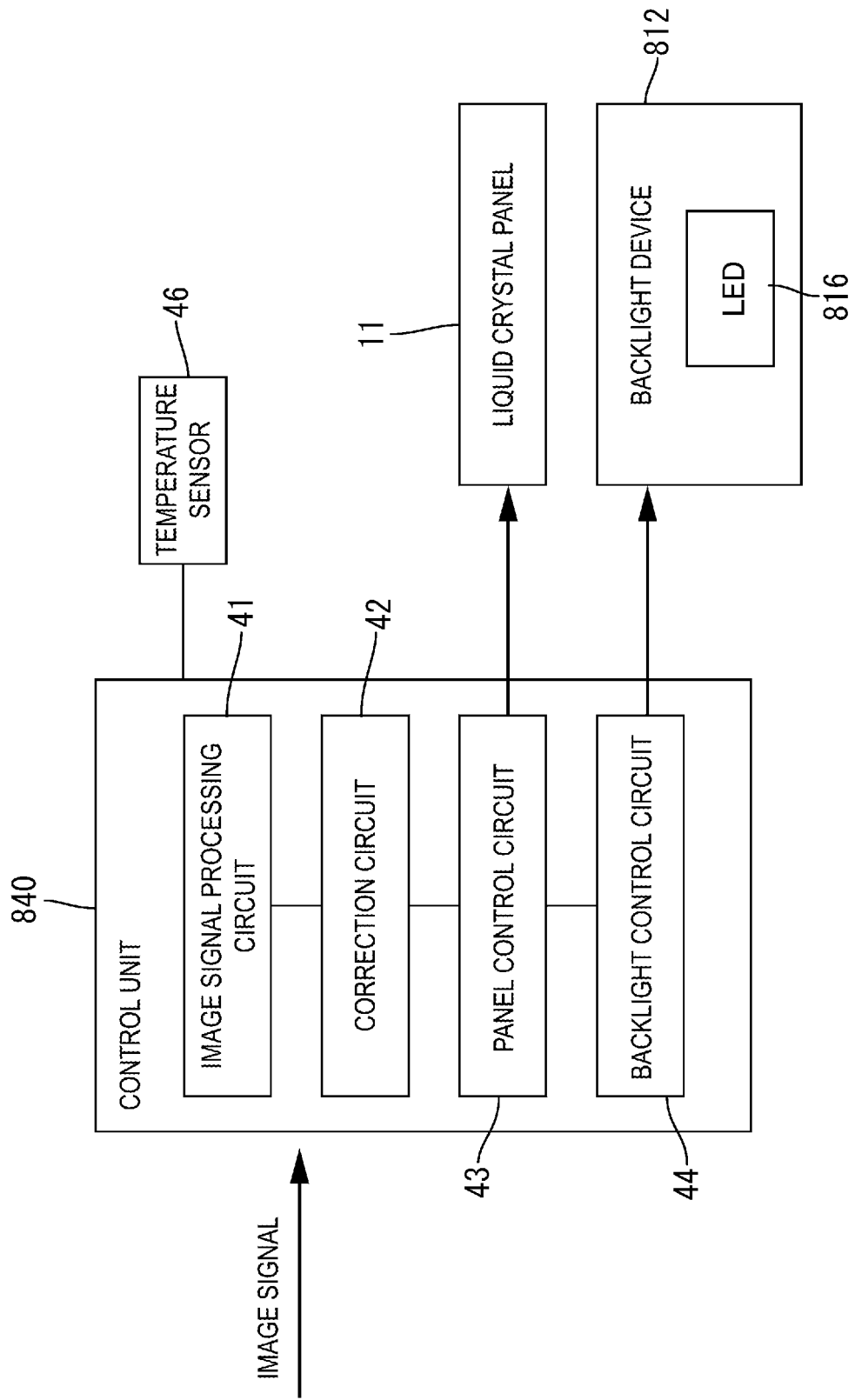
FIG. 27 is a block diagram illustrating an electrical configuration of a liquid crystal display device according to a ninth embodiment.

As illustrated in FIG. 27, a backlight device 812 according to the present embodiment includes the temperature sensor 46 that detects the temperature of the light control sheet 15A (see FIG. 2) or the temperature in the vicinity of the light control sheet 15A. The temperature sensor 46 is formed by a thermistor or the like. The temperature sensor 46 may be directly attached to the light control sheet 15A, or may be attached to the chassis 14 or the like, so as to be located near the light control sheet 15A, for example. The temperature sensor 46 is connected to a control unit 840 and can output a signal related to the detected temperature to the control unit 840. The control unit 840 can grasp the temperature of the light control sheet 15A or the temperature in the vicinity of the light control sheet 15A, based on the signal input by the temperature sensor 46.

Figure 28:
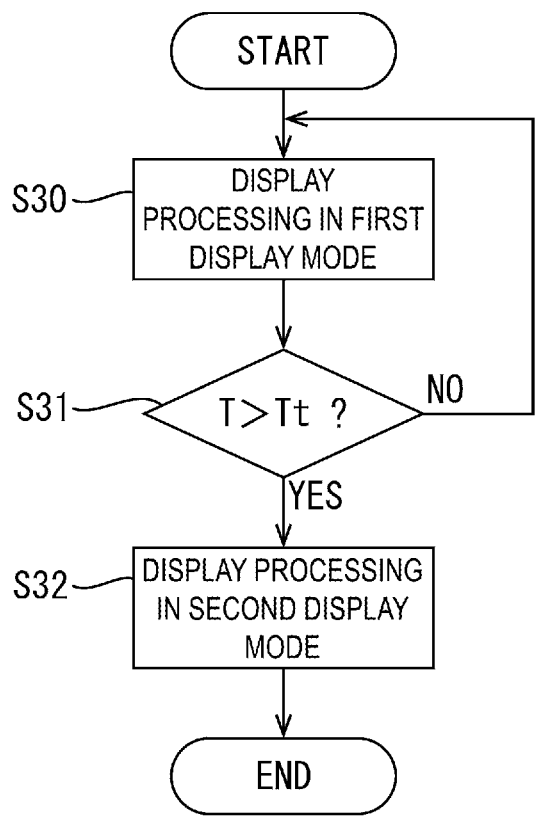
FIG. 28 is a flowchart illustrating a control operation related to switching from a display in a first display mode to a display in a second display mode according to the ninth embodiment.

As illustrated in FIG. 28, the control unit 840 can switch from display in a first display mode to display in a second display mode in accordance with the temperature detected by the temperature sensor 46. The first display mode and the second display mode are as described in the first embodiment. The control related to switching between display in the first display mode and display in the second display mode by the control unit 840 will be described. According to FIG. 28, when the power source of the liquid crystal display device 10 is turned on, the control unit 840 performs a display processing in the first display mode (step S30). Subsequently, the control unit 840 determines whether or not a temperature T detected by the temperature sensor 46 reaches a threshold value Tt (step S31). When the determination result in step S31 is NO, the processing returns to step S30, and the control unit 840 continues the display processing in the first display mode. When the determination result in step S31 is YES, the control unit 840 switches to a display processing in the second display mode (step S32). As described above, when the temperature T detected by the temperature sensor 46 is equal to or lower than the threshold value Tt, the control unit 840 performs the display processing in the first display mode and increases the light emission amount of LEDs 816 as compared with the display processing in the second display mode performed when the temperature T exceeds the threshold value Tt. Therefore, when the temperature T detected by the temperature sensor 46 is equal to or lower than the threshold value Tt, the temperature increase can be promoted by the heat generated from the LEDs 816, and the thermal expansion of the light control sheet 15A can be promoted. Thus, the time required for the temperature environment to reach the second temperature from the first temperature can be shortened, so that the first light reflection portion 22 (see FIG. 6) can be displaced in a short time to a position where the second center 22C is close to the first center 16C of each of the LEDs 816.

As described above, according to the present embodiment, the control unit 840 that controls the LEDs 816 and the temperature sensor 46 that detects the temperature of the light control sheet 15A or the temperature in the vicinity of the light control sheet 15A are provided. The control unit 840 increases the light emission amount of the LEDs 816 when the temperature detected by the temperature sensor 46 is equal to or lower than the threshold value, compared to a case where the temperature exceeds the threshold value. In a situation where the temperature of the light control sheet 15A or the temperature in the vicinity of the light control sheet 15A is low, the light control sheet 15A is not sufficiently thermally expanded. Therefore, when the temperature detected by the temperature sensor 46 is equal to or lower than the threshold value, the control unit 840 increases the light emission amount of the LEDs 816, as compared with the case where the temperature exceeds the threshold value, and thus, the thermal expansion of the light control sheet 15A can be promoted. Thus, the time required for the temperature environment to reach the second temperature from the first temperature can be shortened, so that the first light reflection portion 22 (see FIG. 6) can be displaced in a short time to a position where the second center 22C is close to the first center 16C of each of the LEDs 816.

Tenth Embodiment

A tenth embodiment will be described with reference to FIG. 29. The tenth embodiment describes a case where a configuration of a light control sheet 915A and an arrangement of a fixing portion 924 are changed from the configuration of the light control sheet and the arrangement of the fixing portion in the first embodiment described above. Further, repetitive descriptions of structures, actions, and effects similar to those of the first embodiment described above will be omitted.

Figure 29:
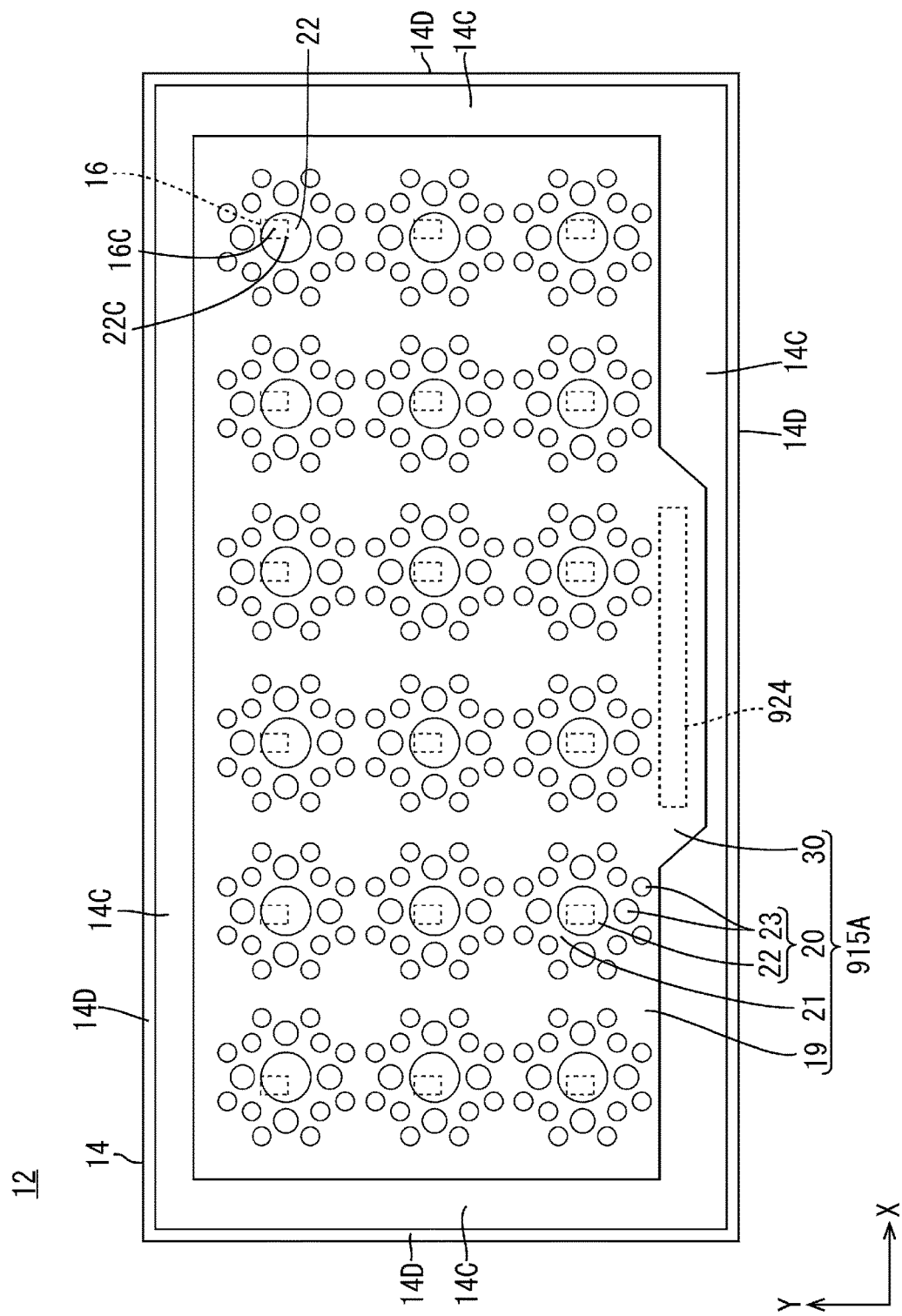
FIG. 29 is a plan view illustrating a chassis, a light control sheet, LEDs, and the like constituting a backlight device according to a tenth embodiment.

As illustrated in FIG. 29, the light control sheet 915A according to the present embodiment includes a piece portion 30 at an outer end portion on one long side of an outer circumferential end portion. The piece portion 30 protrudes along the Y-axis direction from the outer end portion of the one long side mentioned above. The fixing portion 924 is fixed to the piece portion 30. Even with such a configuration, actions and effects similar to those in the above-described first embodiment can be obtained.

Eleventh Embodiment

An eleventh embodiment will be described with reference to FIG. 30. In the eleventh embodiment, a case where a configuration of a light reflection pattern 1020 is changed from the configuration of the light reflection pattern in the second embodiment described above will be described. Further, repetitive descriptions of structures, actions, and effects similar to those of the second embodiment described above will be omitted.

Figure 30:
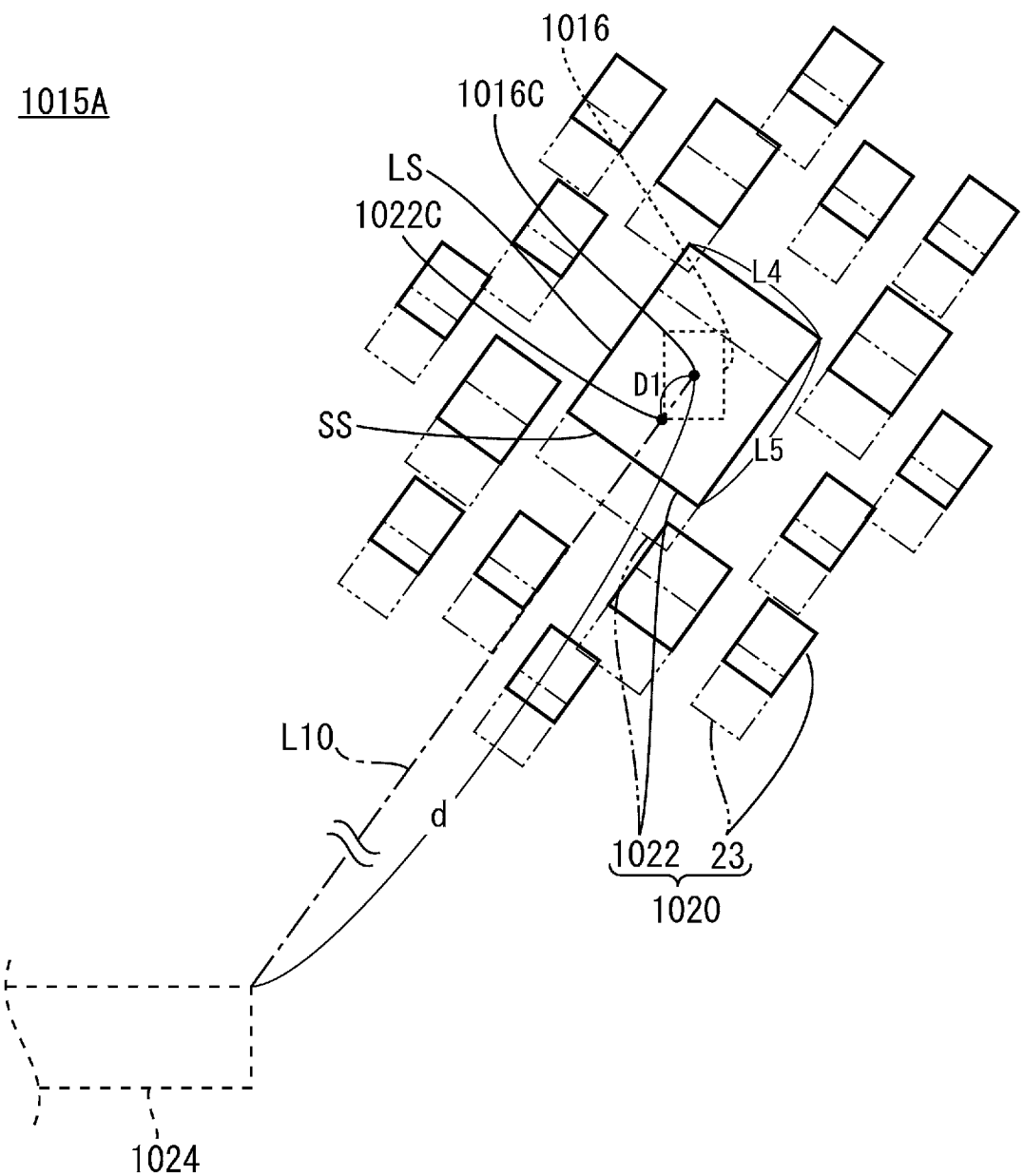
FIG. 30 is a plan view illustrating a positional relationship among a fixing portion, an LED farthest from the fixing portion, and a first light reflection portion overlapping the LED according to an eleventh embodiment.

As illustrated in FIG. 30, first light reflection portions 1022 of the light reflection pattern 1020 according to the present embodiment each have a rectangular planar shape. Specifically, the first light reflection portions 1022 each have an elongated planar shape in which a second center 1022C overlaps with the straight line L10 connecting the position of a fixing portion 1024 closest to LEDs 1016 and a first center 1016C, and the planar shape includes a long side LS that is parallel to the straight line L10. In the plurality of first light reflection portions 1022, the ratio of a length L5 of the long side LS with respect to a length L4 of a short side SS orthogonal to the long side LS increases as the distance from the fixing portion 1024 increases. The length L4 of the short side SS of each of the first light reflection portions 1022 can be substituted for "L1" in Expression (5) indicated in the second embodiment described above, and the length L5 of the long side LS can be substituted for "L2" in Equation (6) indicated in the second embodiment. Even with such a configuration, actions and effects that is the same as or similar to those in the above-described second embodiment can be obtained.

As described above, according to the present embodiment, the first light reflection portion 1022 has an elongated planar shape in which the second center 1022C overlaps with the straight line L10 connecting the position of the fixing portion 1024 closest to the LEDs 1016 and the first center 1016C, and the planar shape includes the long side LS that is parallel to the straight line L10. As a light control sheet 1015A thermally expands, the first light reflection portion 1022 is displaced along the straight line L10 connecting the position of the fixing portion 1024 closest to the LEDs 1016 and the first center 1016C of a corresponding one of the LEDs 1016. The first light reflection portion 1022 has an elongated planar shape including the long side LS parallel to the straight line L10, so that, even when the first light reflection portion 1022 is displaced due to thermal expansion of the light control sheet 1015A, an area overlapping with the LEDs 1016 is less likely to vary. Accordingly, the positional relationship of the first light reflection portion 1022 with respect to the LEDs 1016 can be maintained in an appropriate state. In the first light reflection portion 1022, the second center 1022C overlaps the straight line L10 described above, and thus, the short side SS orthogonal to the long side LS is bisected by the straight line L10. Accordingly, the positional relationship of the first light reflection portions 1022 with respect to the LEDs 1016 can be maintained in an appropriate state in a direction along the short side SS described above.

A plurality of the LEDs 1016 and a plurality of the first light reflection portions 1022 are disposed side by side so as to have different distances from the fixing portion 1024 in the plane of the main surface 19A. In the plurality of first light reflection portions 1022, the ratio of the length L5 of the long side LS with respect to the length L4 of the short side SS orthogonal to the long side LS increases as the distance from the fixing portion 1024 increases. The plurality of first light reflection portions 1022 having different distances from the fixing portion 1024 have different displacement amounts due to thermal expansion of the light control sheet 1015A, and the displacement amount tends to increase as the distance from the fixing portion 1024 increases. The ratio of the length L5 of the long side LS with respect to the length L4 of the short side SS is large in the first light reflection portion 1022 having a greater distance from the fixing portion 1024 as compared with the first light reflection portion 1022 having a smaller distance from the fixing portion 1024. Therefore, even if the displacement amount due to thermal expansion of the light control sheet 1015A is large, it is easy to sufficiently secure an area overlapping the LEDs 1016. Accordingly, the positional relationship of the first light reflection portion 1022 with respect to the LEDs 1016 can be maintained in an appropriate state.

Twelfth Embodiment

A twelfth embodiment will be described with reference to FIG. 31. The twelfth embodiment describes a case where a configuration of a light reflection pattern 1120 is changed from the configuration of the light reflection pattern in the third embodiment described above. Note that redundant descriptions of structures, actions, and effects similar to those of the third embodiment described above will be omitted.

Figure 31:
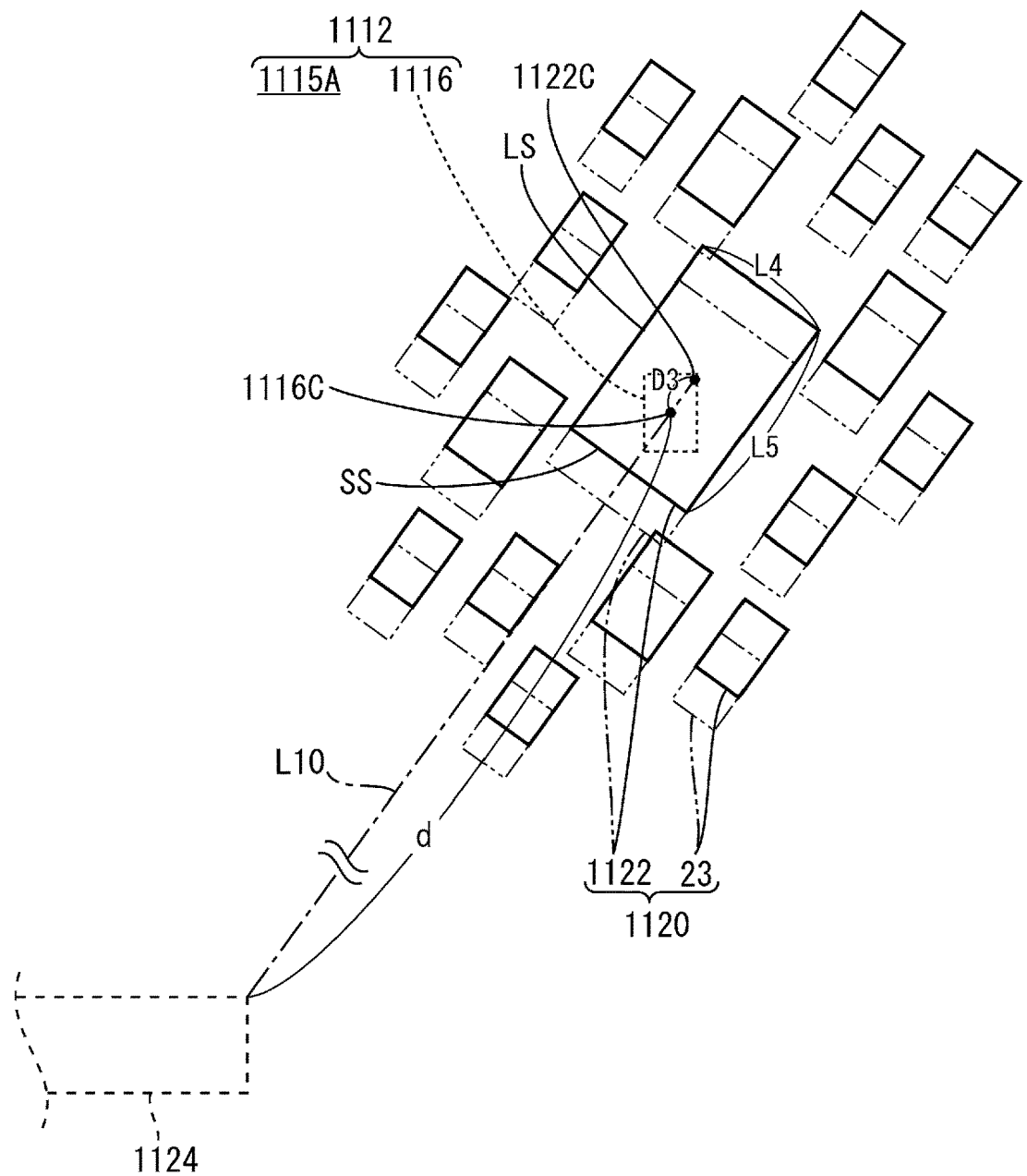
FIG. 31 is a plan view illustrating a positional relationship among a fixing portion, an LED farthest from the fixing portion, and a first light reflection portion overlapping the LED according to a twelfth embodiment.
Figure 31:
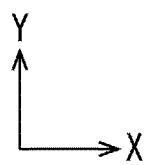

As illustrated in FIG. 31, first light reflection portions 1122 of the light reflection pattern 1120 according to the present embodiment each have a rectangular planar shape. Specifically, the first light reflection portions 1122 each have an elongated planar shape in which a second center 1122C overlaps with the straight line L10 connecting the position of a fixing portion 1124 closest to LEDs 1116 and a first center 1116C, and the planar shape includes the long side LS that is parallel to the straight line L10. In the plurality of first light reflection portions 1122, the ratio of the length L5 of the long side LS with respect to the length L4 of the short side SS orthogonal to the long side LS increases as the distance from the fixing portion 1124 increases. The length L4 of the short side SS of each of the first light reflection portions 1122 can be substituted for "L1" in Expression (7) indicated in the third embodiment described above, and the length L5 of the long side LS can be substituted for "L2" in Equation (8) indicated in the third embodiment. Even with such a configuration, actions and effects similar to those in the above-described third embodiment can be obtained.

As described above, a backlight device 1112 of the present embodiment includes the LEDs 1116 each having the light-emitting face 16A (see FIG. 1), a light control sheet 1115A having the main surface 19A (see FIG. 1) facing the light-emitting face 16A of each of the LEDs 1116, and the fixing portion 1124 fixed to a part of the light control sheet 1115A. The light control sheet 1115A includes the first light reflection portion 1122 that reflects light and of which at least a part overlaps the LED 1116, and a light transmitting portion 1121 that transmits light and is disposed so as not to overlap with the first light reflection portion 1122. In the LED 1116, a center viewed in a plan view is defined as the first center 1116C. In the first light reflection portion 1122, a center viewed in a plan view is defined as the second center 1122C. The first light reflection portion 1122 is disposed so as to overlap with the straight line L10 connecting the position of the fixing portion 1124 closest to the LEDs 1116 and the first center 1116C, and has an elongated planar shape including the long side LS that is parallel to the straight line L10.

The light emitted from the light-emitting face 16A of each of the LEDs 1116 is reflected by the first light reflection portion 1122 of the light control sheet 1115A, but is transmitted through the light transmitting portion 1121 and emitted. By disposing the first light reflection portion 1122 so that at least a part of the first light reflection portion 1122 overlaps the LED 1116, most of the light from the light-emitting face 16A can be reflected, and the LED 1116 is less likely to be directly visually recognized from the light emitting side. By disposing the light transmitting portion 1121 so as not to overlap the LED 1116, the emission of light is promoted. Thus, the distribution of the emission light amount is controlled by the first light reflection portion 1122 and the light transmitting portion 1121.

When the LED 1116 is illuminated, the temperature increases due to the heat generated from the LED 1116. At this time, the light control sheet 1115A thermally expands and extends from a site fixed by the fixing portion 1124 as a starting point, and accordingly, the first light reflection portion 1122 is also displaced in a direction away from the fixing portion 1124. Here, the first light reflection portion 1122 is displaced along the straight line L10 connecting the position of the fixing portion 1124 closest to the LED 1116 and the first center 1116C of the LED 1116. The first light reflection portion 1122 is disposed so as to overlap the straight line L10 and has an elongated planar shape including the long side LS parallel to the straight line L10. Therefore, even when the first light reflection portion 1122 is displaced due to thermal expansion of the light control sheet 1115A, an area overlapping with the LED 1116 is less likely to vary. Thus, even if the light control sheet 1115A thermally expands as the temperature increases and the first light reflection portion 1122 is displaced in a direction away from the fixing portion 1124, the positional relationship of the first light reflection portion 1122 with respect to the LED 1116 can be maintained in an appropriate state. Therefore, the LEDs 1116 are less likely to be directly visually recognized from the light emitting side, and thus, the occurrence of brightness unevenness can be suppressed.

The first light reflection portion 1122 is disposed such that the second center 1122C overlaps the straight line L10. According to such a configuration, in the first light reflection portion 1122, the short side SS orthogonal to the long side LS is bisected by the straight line L10 described above. Accordingly, the positional relationship of the first light reflection portions 1122 with respect to the LEDs 1116 can be maintained in an appropriate state in a direction along the short side SS described above.

Furthermore, in the first light reflection portions 1122, the second center 1122C coincides with the first center 1116C at the first temperature, and the second center 1122C is located farther from the fixing portion 1124 than the first center 1116C at the second temperature that is higher than the first temperature. For example, when the temperature increases from the first temperature to the second temperature as the LEDs 1116 are illuminated, the first light reflection portion 1122 is displaced from a position where the second center 1122C coincides with the first center 1116C of a corresponding one of the LEDs 1116 to a position farther from the fixing portion 1124 than the first center 1116C. The position of the second center 1122C of the first light reflection portion 1122 at the first temperature coincides with the first center 1116C of a corresponding one of the LEDs 1116, and thus, the positional relationship of the first light reflection portion 1122 with respect to the LED 1116 can be easily maintained in an appropriate state even in a low-temperature environment such as a state immediately after the power source is turned on, which is suitable for suppressing the occurrence of brightness unevenness.

Other Embodiments

The techniques disclosed in the present specification are not limited to the embodiments described above and illustrated in the drawings, and the following embodiments, for example, are also included within the technical scope.

(1) In the configurations described in the first embodiment, the second embodiment, and the fourth to eleventh embodiments, the distance D1 between the second centers 22C, 122C, 322C, and 1022C of the first light reflection portions 22, 122, 322, and 1022 and the first centers 16C, 116C, 316C, 416C, and 1016C of the LEDs 16, 116, 316, 416, 516, 816, and 1016 at the first temperature may be greater than "A$\alpha$d" or may be smaller than "A$\alpha$d".

(2) In the configuration described in the third embodiment and the twelfth embodiment, the distance D3 between the second centers 222C and 1122C of the first light reflection portions 222 and 1122 and the first centers 216C and 1116C of the LEDs 216 and 1116 at the second temperature may be greater than "A$\alpha$d" or may be smaller than "A$\alpha$d".

(3) In the configurations described in the first embodiment and the fourth to tenth embodiments, the planar shape of the first light reflection portions 22 and 322 may have, in addition to the circular shape, a regular polygon shape such as a square or an equilateral triangle.

(4) In the configurations described in the second embodiment, the third embodiment, the eleventh embodiment, and the twelfth embodiment, the planar shape of the first light reflection portions 122, 222, 1022, and 1122 may be, in addition to the elliptical shape and the rectangular shape, an oval shape, a parallelogram, a rhombus, a trapezoid, or the like.

(5) In the configurations described in the first embodiment, the second embodiment, and the fourth to eleventh embodiments, at the second temperature, the second centers 22C, 122C, 322C, and 1022C of the first light reflection portions 22, 122, 322, and 1022 may be arranged so as not to coincide with the first centers 16C, 116C, 316C, 416C, and 1016C of the LEDs 16, 116, 316, 416, 516, 816, and 1016. At the second temperature, the second centers 22C, 122C, 322C, and 1022C of the first light reflection portions 22, 122, 322, and 1022 may be located on a side closer to the fixing portions 24, 124, 324, 424, 924, and 1024 with respect to the first centers 16C, 116C, 316C, 416C, and 1016C of the LEDs 16, 116, 316, 416, 516, 816, and 1016, but may be located on a side farther from the fixing portions 24, 124, 324, 424, 924, and 1024 with respect to the first centers 16C, 116C, 316C, 416C, and 1016C.

(6) In the configurations described in the third embodiment and the twelfth embodiment, at the first temperature, the second centers 222C and 1122C of the first light reflection portions 222 and 1122 may be arranged so as not to coincide with the first centers 216C and 1116C of the LEDs 216 and 1116. At the first temperature, the second centers 222C and 1122C of the first light reflection portions 222 and 1122 may be located on a side closer to the fixing portions 224 and 1124 with respect to the first centers 216C and 1116C of the LEDs 216 and 1116, but may be located on a side farther from the fixing portions 224 and 1124 with respect to the first centers 216C and 1116C.

(7) The second centers 22C, 122C, 222C, 322C, 1022C, and 1122C of the first light reflection portions 22, 122, 222, 322, 1022, and 1122 may be arranged so as not to overlap the straight lines L10 to L20 connecting the positions of the fixing portions 24, 124, 224, 324, 424, 924, 1024, and 1124 closest to the LEDs 16, 116, 216, 316, 416, 516, 816, 1016, and 1116 and the first centers 16C, 116C, 216C, 316C, 416C, 1016C, and 1116C. Even in this case, a part of the first light reflection portions 22, 122, 222, 322, 1022, and 1122 preferably overlaps the straight lines L10 to L20 connecting the positions of the fixing portions 24, 124, 224, 324, 424, 924, 1024, and 1124 closest to the LEDs 16, 116, 216, 316, 416, 516, 816, 1016, and 1116 and the first centers 16C, 116C, 216C, 316C, 416C, 1016C, and 1116C.

(8) The specific numerical value of the difference A between the first temperature and the second temperature may be appropriately changed to a value other than 30° C.

(9) The specific numerical value of the difference B between the second temperature and the third temperature may be appropriately changed to a value other than 15° C.

(10) The number, arrangement, size in a plan view, and the like of the second light reflection portions 23 and 123 can be appropriately changed to others than those illustrated in the drawings. For example, the areas of the second light reflection portions 23 and 123 having the same distance from the first light reflection portions 22, 122, 222, 322, 1022, and 1122 may be the same or may be different from each other. For example, the plurality of second light reflection portions 23 and 123 may be disposed so as to be not point symmetrical with respect to the second centers 22C, 122C, 222C, 322C, 1022C, and 1122C of the first light reflection portions 22, 122, 222, 322, 1022, and 1122.

(11) The light reflection patterns 20, 120, 220, 1020, and 1120 may be provided on the main surfaces 19B, 319B, and 419B on the front side of the transmission substrate 19.

(12) The light control sheets 15A, 115A, 215A, 315A, 415A, 515A, 615A, 715A, 915A, 1015A, and 1115A may include, instead of the transmission substrate 19, a reflective substrate that reflects light. The reflective substrate may be formed of a white synthetic resin, or may be formed of a metal exhibiting silver color. The reflective substrate may be formed of a dielectric multilayer film. A light transmission pattern can be provided by patterning openings in the reflective substrate. In the reflective substrate, a portion where the light transmission pattern is formed constitutes the light transmitting portions 21, 221, and 1121. A portion of the reflective substrate where the light transmission pattern is not formed constitutes the light reflection patterns 20, 120, 220, 1020, and 1120.

(13) The fixing portions 24, 124, 224, 324, 424, 924, 1024, and 1124 may each be a projection that protrudes from the receiving portion 14C of the chassis 14 to the front side. Each of the light control sheets 15A, 115A, 215A, 315A, 415A, 515A, 615A, 715A, 915A, 1015A, and 1115A is provided with a fixing hole through which the projection serving as a corresponding one of the fixing portions 24, 124, 224, 324, 424, 924, 1024, and 1124 is passed, and it is possible to bring the fixing portions 24, 124, 224, 324, 424, 924, 1024, and 1124 into contact with a hole edge of the fixing hole, to fix the light control sheets 15A, 115A, 215A, 315A, 415A, 515A, 615A, 715A, 915A, 1015A, and 1115A.

(14) The fixing portions 24, 124, 224, 324, 424, 924, 1024, and 1124 may be provided on the second panel support member 18. For example, it is possible to arrange the light control sheets 15A, 115A, 215A, 315A, 415A, 515A, 615A, 715A, 915A, 1015A, and 1115A on the frontmost side of the optical member 15, and fix the fixing portions 24, 124, 224, 324, 424, 924, 1024, and 1124 attached to the surface on the back side of the second panel support portion 18A of the second panel support member 18 to the main surfaces 19B, 319B, and 419B on the front side of the light control sheets 15A, 115A, 215A, 315A, 415A, 515A, 615A, 715A, 915A, 1015A, and 1115A. Furthermore, a projection protruding from the second panel support portion 18A of the second panel support member 18 toward the back side may be used as the fixing portions 24, 124, 224, 324, 424, 924, 1024, and 1124, and the fixing portions 24, 124, 224, 324, 424, 924, 1024, and 1124 may be inserted into the fixing hole provided in the light control sheets 15A, 115A, 215A, 315A, 415A, 515A, 615A, 715A, 915A, 1015A, and 1115A to fix the light control sheets 15A, 115A, 215A, 315A, 415A, 515A, 615A, 715A, 915A, 1015A, and 1115A.

(15) In the configuration described in the fifth embodiment, the second support member 26 may be configured so as to surround a plurality of the LEDs 416. Specifically, it is also possible to adopt a configuration in which a plurality of the LEDs 416 are disposed in a region surrounded by two of the first wall portions 26A and two of the second wall portions 26B.

(16) In the configuration described in the sixth to eighth embodiments, the protection layers 27, 627, and 727 may be partially provided in the surface of the mounting surface 517A of the LED substrate 517. In this case, the protection layers 27, 627, and 727 can be provided by potting a transparent synthetic resin material on the LED substrate 517.

(17) In the configurations described in the sixth to eighth embodiments, an optical sheet may be used instead of the protection layers 27, 627, and 727.

(18) The correction circuit 42 may generate a correction signal by performing a correction processing for local dimming on the processed image signal output from the image signal processing circuit 41.

(19) A white LED that emits white light may be used as the LEDs 16, 116, 216, 316, 416, 516, 816, 1016, and 1116. In this case, the optical member 15 may not include the wavelength conversion sheet 15C.

(20) The number, type, layering order, and the like of the optical members 15 can be changed as appropriate.

(21) The specific arrangement of the plurality of LEDs 16, 116, 216, 316, 416, 516, 816, 1016, and 1116 on the mounting surfaces 17A, 317A, and 517A of the LED substrates 17, 317, 417, and 517 can be changed as appropriate. For example, the plurality of LEDs 16, 116, 216, 316, 416, 516, 816, 1016, and 1116 may be arranged in a zig-zag shape.

(22) A light source such as an organic electro luminescence (EL) light source may be used instead of the LEDs 16, 116, 216, 316, 416, 516, 816, 1016, and 1116.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An illumination device, comprising:
a light source including a light-emitting face;
a first optical member including a first main surface facing the light-emitting face of the light source; and
a fixing portion fixed to a part of the first optical member,
wherein the first optical member includes
a light reflection portion configured to reflect light, at least a part of the light reflection portion overlapping with the light source, and
a light transmitting portion configured to transmit light, the light transmitting portion not overlapping the light reflection portion,
a center of the light source in a plan view is defined as a first center, and a center of the light reflection portion in a plan view is defined as a second center,
in the light reflection portion, the second center is located between the fixing portion and the first center at a first temperature, and at a second temperature higher than the first temperature, a position of the second center is closer to the first center than a position of the second center at the first temperature.

2. The illumination device according to claim 1, wherein, in the light reflection portion, the second center overlaps with a straight line connecting a position of the fixing portion closest to the light source and the first center, and a distance between the first center and the second center at the first temperature is "A$\alpha$d", where "d" is a shortest distance from the fixing portion to the first center, "$\alpha$" is a linear expansion coefficient of the first optical member, and "A" is a difference between the first temperature and the second temperature.

3. The illumination device according to claim 1, wherein the light reflection portion has an elongated planar shape in which the second center overlaps a straight line connecting a position of the fixing portion closest to the light source and the first center, the elongated planar shape including a major axis or a long side parallel to the straight line.

4. The illumination device according to claim 3, wherein a plurality of the light sources and a plurality of the light reflection portions are disposed side by side in a plane of the first main surface at different distances from the fixing portion, and a ratio of a length of the major axis or the long side to a length of a minor axis or a short side orthogonal to the major axis or the long side increases as a distance of the plurality of light reflection portions from the fixing portion increases.

5. The illumination device according to claim 3, wherein, in the light reflection portion, the second center coincides with the first center at the second temperature, and a length L1 of a minor axis or a short side and a length L2 of the major axis or the long side satisfy Expression (1) and Equation (2) below $$L1 > L3 \quad (1)$$

$$L2 = L1 + 2B\alpha d \quad (2),$$

where "d" is a shortest distance from the fixing portion to the first center, "$\alpha$" is a linear expansion coefficient of the first optical member, "B" is a difference between a third temperature higher than the second temperature and the second temperature, "L1" is a length of the minor axis or the short side orthogonal to the major axis or the long side in the light reflection portion, "L2" is a length of the major axis or the long side, and "L3" is a maximum length of a line segment passing through the first center and intersecting an outer end of the light source in a plan view.

6. The illumination device according to claim 1, further comprising:
a control unit configured to control the light source; and
a timer configured to measure an elapsed time after a power source is turned on,
wherein the control unit increases a light emission amount of the light source until the elapsed time measured by the timer is at or higher than a threshold value, compared to a case where the elapsed time exceeds the threshold value.

7. The illumination device according to claim 1, further comprising:
a control unit configured to control the light source; and
a temperature sensor configured to detect a temperature of the first optical member or a temperature near the first optical member,
wherein the control unit increases a light emission amount of the light source when the temperature detected by the temperature sensor is equal to or lower than a threshold value, compared to a case where the temperature exceeds the threshold value.

8. The illumination device according to claim 1, further comprising:
a second optical member interposed between the light source and the first optical member, the second optical member including a second main surface facing the first main surface of the first optical member,
wherein at least one of the first main surface and the second main surface includes a plurality of protruding portions.

9. An illumination device, comprising:
a light source including a light-emitting face;
a first optical member including a first main surface facing the light-emitting face of the light source; and
a fixing portion fixed to a part of the first optical member, wherein the first optical member includes
a light reflection portion configured to reflect light, at least a part of the light reflection portion overlapping with the light source, and
a light transmitting portion configured to transmit light, the light transmitting portion not overlapping the light reflection portion,
a center of the light source in a plan view is defined as a first center, and a center of the light reflection portion in a plan view is defined as a second center,
the light reflection portion overlaps a straight line connecting a position of the fixing portion closest to the light source and the first center, and has an elongated planar shape including a major axis or a long side parallel to the straight line.

10. The illumination device according to claim 9, wherein, in the light reflection portion, the second center overlaps the straight line.

11. The illumination device according to claim 10, wherein, in the light reflection portion, a length L1 of a minor axis or a short side and a length L2 of the major axis or the long side satisfy Expression (3) and Equation (4) below $$L1 > L3 \quad (3)$$

$$L2 = L1 + 2A\alpha d \quad (4),$$

where "d" is a shortest distance from the fixing portion to the first center, "$\alpha$" is a linear expansion coefficient of the first optical member, "A" is a difference between a first temperature and a second temperature, "L1" is a length of the minor axis or the short side orthogonal to the major axis or the long side in the light reflection portion, "L2" is a length of the major axis or the long side, and "L3" is a maximum length of a line segment passing through the first center and intersecting an outer end of the light source in a plan view.

12. The illumination device according to claim 10, wherein,
in the light reflection portion, the second center coincides with the first center at a first temperature, and the second center is located farther from the fixing portion than the first center, at a second temperature higher than the first temperature.

13. A display device, comprising:
the illumination device according to claim 1; and
a display panel configured to display an image by utilizing light emitted from the illumination device.

14. The display device according to claim 13, further comprising:
a control unit configured to control the light source and the display panel,
wherein a plurality of the light sources are disposed side by side in a plane of the first main surface, and
the control unit writes an image based on an image signal to the display panel, controls the plurality of light sources, based on the image signal, and causes a light source among the plurality of light sources that is in a relationship of irradiating a minimum gray scale region with light, to emit light, when the minimum gray scale region having a minimum gray scale is included in the image.

15. The display device according to claim 13, further comprising:
a control unit configured to control the light source and the display panel; and
a timer configured to measure an elapsed time after a power source is turned on,
wherein until the elapsed time measured by the timer is at or higher than a threshold value, the control unit increases a light emission amount of the light source, as compared with a case where the elapsed time exceeds the threshold value, corrects an image signal to generate a correction signal having a lower gray scale than the image signal, and writes an image based on the correction signal to the display panel.

\* \* \* \* \*